United States Patent
Isono

(10) Patent No.: US 9,388,832 B2
(45) Date of Patent: Jul. 12, 2016

(54) MASTER CYLINDER DEVICE AND HYDRAULIC BRAKE SYSTEM USING THE SAME

(71) Applicant: Hiroshi Isono, Mishima (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 13/914,846

(22) Filed: Jun. 11, 2013

(65) Prior Publication Data

US 2013/0269338 A1 Oct. 17, 2013

Related U.S. Application Data

(63) Continuation of application No. 13/993,090, filed as application No. PCT/JP2011/054326 on Feb. 25, 2011.

(51) Int. Cl.

| B60T 13/14 | (2006.01) |
|---|---|
| F15B 15/00 | (2006.01) |
| B60T 1/10 | (2006.01) |
| B60T 7/04 | (2006.01) |
| B60T 13/66 | (2006.01) |
| B60T 8/32 | (2006.01) |
| B60T 8/40 | (2006.01) |

(52) U.S. Cl.
CPC . *F15B 15/00* (2013.01); *B60T 1/10* (2013.01); *B60T 7/042* (2013.01); *B60T 8/3265* (2013.01); *B60T 8/4077* (2013.01); *B60T 13/146* (2013.01); *B60T 13/662* (2013.01)

(58) Field of Classification Search
CPC ..... B60T 8/3265; B60T 8/4077; B60T 8/441; B60T 13/146
See application file for complete search history.

(56) References Cited

U.S. PATENT DOCUMENTS

| 4,354,714 A | * | 10/1982 | Belart ..................... 303/114.1 |
|---|---|---|---|
| 2008/0210499 A1 | | 9/2008 | Isono et al. |
| 2008/0236962 A1 | | 10/2008 | Suzuki et al. |
| 2012/0144822 A1 | | 6/2012 | Isono |

FOREIGN PATENT DOCUMENTS

| JP | A-2010-929 | 1/2010 |
|---|---|---|
| JP | A-2011-51400 | 3/2011 |
| KR | 10-2008-0026202 | 3/2008 |

OTHER PUBLICATIONS

Aug. 10, 2015 Office Action issued in U.S. Appl. No. 13/993,090.

* cited by examiner

*Primary Examiner* — F. Daniel Lopez

(74) *Attorney, Agent, or Firm* — Oliff PLC

(57) ABSTRACT

A master cylinder device includes a housing whose front side end is closed and which includes a third housing member separating an interior of the housing into a front side chamber and a rear side chamber and having an opening through the third housing member, a first pressurizing piston which includes a main body portion disposed in the front side chamber and which is moved forward by receiving a force for pressurizing the brake fluid to be supplied to a brake devices, and an input piston. In the master cylinder device, an input chamber into which a brake fluid is introduced is defined between a rear end of the main body portion of the first pressurizing piston and the third housing member. The input piston is fitted in the housing with seals, whereby, an inter-piston chamber across which the input piston and the pressure receiving piston face to each other.

10 Claims, 13 Drawing Sheets

MASTER CYLINDER DEVICE AND HYDRAULIC BRAKE SYSTEM USING THE SAME

This is a Continuation of application Ser. No. 13/993,090 filed Jun. 11, 2013, which in turn is a National Stage Application of PCT/JP2011/054326 filed Feb. 25, 2011. The disclosure of the prior applications is hereby incorporated by reference herein in its entirety.

TECHNICAL FIELD

This invention relates to a master cylinder device for pressurizing a brake fluid and supplying the pressurized brake fluid to a brake device provided in a wheel, and a hydraulic brake system using the master cylinder device.

BACKGROUND ART

Some master cylinder devices, such as a master cylinder device disclosed in the following patent literature, can pressurize a brake fluid depending on a pressure of a brake fluid introduced from a high pressure source irrespective of an operation force for operating a brake operation member by a driver. This master cylinder device includes a pressure receiving piston which moves forward by a pressure of a brake fluid in an input chamber, that is, a fluid chamber into which the brake fluid is introduced and which then pressurizes a brake fluid, and an input piston which is fitted in the pressure receiving piston at a blind hole thereof being open rearward and which moves forward by a brake operation. Between a bottom portion of the blind hole and a front end face of the input piston, there is generally formed a fluid chamber filled with a brake fluid (hereinafter, referred to as an "inter-piston chamber", where appropriate). Therefore, the pressure receiving piston and the input piston can move independently from each other.
Patent Literature 1: JP-A-2010-929 (P. 20, FIG. 3)

DISCLOSURE OF THE INVENTION

(A) Summary of the Invention

In the master cylinder device disclosed in the above patent literature, when the pressure receiving piston and the input piston move relative to each other in the master cylinder device, a seal between the pistons generates a friction force. Therefore, when the pressure receiving piston is moved by the brake fluid of a high pressure, a force causing a movement of the input piston acts on the input piston due to the friction force, whereby operational feeling in a brake operation is deteriorated. In addition, the above seal defines the inter-piston chamber and the input chamber. The pressure of the brake fluid in the input chamber becomes considerably high when a hydraulic brake force generated in the brake device is comparatively large. Therefore, a high-pressure seal is employed as the above seal. Commonly, the high-pressure seal generates the friction force to be comparatively large. Consequently, a problem of the above deterioration of operational feeling appears more significantly. In addition, as the friction force becomes large, a resistance upon a movement of the input piston by the operation force becomes large. This also deteriorates operational feeling in a brake operation. In the master cylinder device, there are left many rooms for improvements including an improvement for coping with the deterioration of operational feeling. So, if any improvement is carried out, it is possible to improve utility of the master cylinder device. The present invention is developed in the light of the current situation described above. It is therefore an object of the present invention to improve utility of a master cylinder device and a hydraulic brake system using the device.

To solve the described object, a master cylinder device according to the present invention comprises a housing whose front side end is closed and which includes a partition portion separating an interior of the housing into a front side chamber and a rear side chamber and having an opening through the partition portion, a pressure receiving piston which includes a main body portion disposed in the front side chamber and which is moved forward by receiving a force for pressurizing a brake fluid to be supplied to a brake device, and an input piston which can move forward by an operation force applied to a brake operation member. In the master cylinder device, an input chamber into which a brake fluid from a high pressure source is introduced is defined between a rear end of the main body portion of the pressure receiving piston and the partition portion of the housing. Additionally, the input piston is fitted in the housing with a seal, whereby, between the input piston and the pressure receiving piston, there is defined an inter-piston chamber across which the input piston and the pressure receiving piston face to each other by utilizing the opening formed in the partition portion though the input piston and the pressure receiving piston are not fitted to each other with any seal.

In the master cylinder device according to the present invention, the input piston is not fitted to the pressure receiving piston with a seal. Consequently, when the pressure receiving piston moves, no force causing any movement of the input piston, that is, no force resulting from any friction force of any seal acts on the input piston. Therefore, operational feeling in a brake operation is improved. In addition, since the pressure of the brake fluid in the input chamber does not act on a seal between the input piston and the housing, the seal is not required to be a high-pressure seal. Consequently, it is possible to make a friction force resulting from the seal upon a movement of the input piston be comparatively small. Therefore, operational feeling in a brake operation is improved. Owing to these improvements, the master cylinder device according to the present invention and a hydraulic brake system using the device have excellent utility.

(B) Forms of Invention

There will be exemplified and described various forms according to an invention which is considered claimable (hereinafter referred to as "claimable invention" where appropriate). Each of the forms according to the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered one form of the claimable invention. Some of the forms according to the claimable invention correspond to claims.

Specifically, in the following forms, the form (1) from which features regarding a communication passage and pressurized areas of the pressure receiving piston are excluded corresponds to claim 1, the form (2) corresponds to claim 2, the form (3) corresponds to claim 3, the form (4) corresponds to claim 4, the form (5) corresponds to claim 5, the form (6) corresponds to claim 6, the form (7) corresponds to claim 7, the form (9) corresponds to claim 8, the form (10) corresponds to claim 9, the form (11) corresponds to claim 10, the form (12) corresponds to claim 11, the form (13) corresponds to claim 12, and the form (15) corresponds to claim 13, respectively.

The master cylinder device according to the claimable invention, as described herein, are generally categorized into three types, more specifically, an "Input Piston Free Type Master Cylinder Device", a "Master-Cut System Adoptable Type Master Cylinder Device", and a "Pressure Receiving Piston Lock Type Master Cylinder Device". Herein, forms according to the invention are described in detail for each type as follows.

<<Input Piston Free Type Master Cylinder Device>>

(1) A master cylinder device for supplying a pressurized brake fluid to a brake device provided in a wheel, comprising:

a housing whose front side end is closed and which includes a partition portion separating an interior of the housing into a front side chamber and a rear side chamber and having an opening through the partition portion;

a pressure receiving piston which includes a main body portion having a flange on a rear end thereof and disposed in the front side chamber, and which is moved forward by receiving a force for pressurizing the brake fluid to be supplied to the brake device; and an input piston which is disposed in the rear side chamber, which is connected to a brake operation member disposed behind the housing, and which can move forward by an operation force applied to the brake operation member, wherein the main body portion of the pressure receiving piston is fitted, at the flange and a portion in front of the flange, in the housing with respective seals and the pressure receiving piston is fitted in the partition portion of the housing with a seal, whereby: a pressurizing chamber in which the brake fluid to be supplied to the brake device is pressurized by a forward movement of the pressure receiving piston is defined in front of the main body portion of the pressure receiving piston; an input chamber into which a brake fluid from a high pressure source is introduced is defined between a rear end of the main body portion and the partition portion; and an opposing chamber which opposes the input chamber with the flange being interposed between the opposing chamber and the input chamber is defined around the main body portion, wherein the input piston is fitted in the housing with a seal, whereby, between the input piston and the pressure receiving piston, there is defined an inter-piston chamber across which the input piston and the pressure receiving piston face to each other by utilizing the opening formed in the partition portion though the input piston and the pressure receiving piston are not fitted to each other with any seal, wherein an inter-chamber communication passage which allows a communication between the opposing chamber and the inter-piston chamber is provided, and a pressurized area of the pressure receiving piston on which a pressure of a brake fluid in the opposing chamber acts and a pressurized area of the pressure receiving piston on which a pressure of a brake fluid in the inter-piston chamber acts are equal, and wherein the master cylinder device further comprises a reaction force applying mechanism which allows a forward movement of the input piston relative to the housing by the operation force, and which applies, to the input piston, a reaction force against the forward movement and with a magnitude according to an amount of the forward movement, as an operation reaction force against an operation of the brake operation member.

According to the master cylinder device of this form, when a driver operates the brake operation member, the driver can feel the operation reaction force by the reaction force applying mechanism while the input piston moves forward. On the other hand, when the brake fluid is introduced from the high pressure source to the input chamber, the pressure receiving piston moves forward, thereby pressurizing the brake fluid in the pressurizing chamber so as to supply the pressurized brake fluid to the brake device. Such movements of the input piston and the pressure receiving piston change respective volumes of the inter-piston chamber and the opposing chamber inside the master cylinder device. On the volume changes, according to the master cylinder device, since the inter-piston chamber and the opposing chamber communicate with each other through the inter-chamber communication passage, a pressure of the brake fluid in the inter-piston chamber and a pressure of the brake fluid in the opposing chamber become equal. Moreover, since the pressurized area of the pressure receiving piston on which the brake fluid in the opposing chamber acts and the pressurized area of the pressure receiving piston on which the brake fluid in the inter-piston chamber acts are equal, a forward bias force acting on the pressure receiving piston by the pressure of the brake fluid in the inter-piston chamber and a rearward bias force acting on the pressure receiving piston by the pressure of the brake fluid in the opposing chamber become equal. In other words, the master cylinder device is configured such that, for example, even when the input piston is moved by a brake operation and thus the pressure of the brake fluid in the inter-piston chamber is changed, this pressure change does not cause any movement of the pressure receiving piston. From another point of view, the master cylinder device is configured such that, when the pressure receiving piston is moved, a volume decrease amount of one of the opposing and the inter-piston chambers and a volume increase amount of the other of them become equal, in other words, a decrease amount of the brake fluid in one of them and an increase amount of the brake fluid in the other of them become equal. Accordingly, when the pressure receiving piston moves, a volume of each of the opposing chamber and the inter-piston chamber changes while the brake fluid flows between the chambers. Therefore, the master cylinder device is configured such that, for example, even when the pressure receiving piston is moved by the brake fluid introduced from the high pressure source, this movement does not cause any movement of the input piston. That is, the master cylinder device is configured such that the pressure receiving piston and the input piston can move independently from each other. Consequently, the master cylinder device can realize a "high-pressure-source-pressure dependent pressurizing state", that is, a state in which the brake fluid to be supplied to the brake device is pressurized depending on not the operation force for operating the brake operation member but only a pressure of the brake fluid introduced from the high pressure source. This pressure is hereinafter referred to as a "high-pressure-source pressure", where appropriate. So to say, the master cylinder device can realize the high-pressure-source-pressure dependent pressurizing state with the input piston being able to move freely relative to the pressure receiving piston, therefore the master cylinder device is called an "Input Piston Free Type Master Cylinder Device".

In addition, where the operation force is transmitted to the pressure receiving piston in a realization of the high-pressure-source-pressure dependent pressurizing state, the master cylinder device can realize an "operation-force/high-pressuresource-pressure dependent pressurizing state", that is, a state in which the brake fluid to be supplied to the brake device is pressurized depending on not only the high-pressure-source pressure but also the operation force. In this state, the brake device can generate a hydraulic brake force with a magnitude dependent on the high-pressure-source pressure plus a hydraulic brake force with a magnitude dependent on the operation force. In order to transmit the operation force to the pressure receiving piston, for example, the input piston may be allowed to come into an abutting contact with the pressure receiving piston, or alternatively, the inter-piston chamber may be hermetically closed. More specifically, where the input piston is allowed to come into an abutting contact with the pressure receiving piston, the operation force is transmitted, owing to the abutting contact, from the input piston to the pressure receiving piston. On the other hand, where the inter-piston chamber is hermetically closed, the operation force is transmitted, via the brake fluid in the inter-piston chamber, to the pressure receiving piston.

When the operation-force/high-pressure-source-pressure dependent pressurizing state is realized, the brake device can be actuated depending on not only the high-pressure-source pressure but also the operation force. Thus, the hydraulic brake force generated by the brake device can be comparatively large. Therefore, where the operation-force/high-pressure-source-pressure dependent pressurizing state is realized in a condition in which a large hydraulic brake force is required, such as a condition of an emergency brake, the brake device can generate a large hydraulic brake force. In order to determine whether the large hydraulic brake force is required or not, for example, the master cylinder device may include a sensor for detecting the hydraulic brake force and a controller for executing the determination based on a detected value of the sensor. The sensor for detecting the hydraulic brake force may be, for example, a sensor for detecting a pressure of the brake fluid in the pressurizing chamber, a pressure of the brake fluid in the input chamber, the brake operation force, or the like.

By the way, in order to generate a large hydraulic brake force depending on only the high-pressure-source pressure, the pressure of the brake fluid introduced into the input chamber must be intensified considerably high. Therefore, the high pressure source having a comparatively large output capability, such as a large hydraulic pump, is necessary. That causes an increase of a mounting space for the master cylinder device, and an increase of cost as well. Since the master cylinder device may realize the operation-force/high-pressure-source-pressure dependent pressurizing state, a large hydraulic brake force can be generated by using the high pressure source having a comparatively small output capability.

In addition, even when the brake fluid is not introduced from the high pressure source, as in the operation-force/high-pressure-source-pressure dependent pressurizing state, an allowance of the input piston to come into an abutting contact with the pressure receiving piston, or alternatively, a hermetical closing of the inter-piston chamber can realize an "operation-force dependent pressurizing state", that is, a state in which the brake fluid supplied to the brake device is pressurized depending on only the operation force. Therefore, for example, even in a condition in which the high pressure source cannot work due to an electric failure etc., the brake device can be actuated depending on the operation force.

In the master cylinder device of this form, the input piston and the pressure receiving piston are not fitted to each other with any seal. Therefore, a movement of the pressure receiving piston by an introduction of the brake fluid from the high pressure source to the input chamber causes no friction force resulting from any seal to generate between the pressure receiving piston and the input piston. Accordingly, a movement of the pressure receiving piston causes no force causing any movement of the input piston, that is, no force resulting from any friction force of any seal to act on the input piston. In other words, a movement of the pressure receiving piston does not pull the input piston and the operation member. Therefore, operational feeling in a brake operation is excellent.

In the master cylinder device of this form, the pressure receiving piston is fitted, at the flange formed in the rear end of the main body portion, in the housing with the seal, and is fitted in the partition portion of the housing with the seal, whereby the input chamber is defined. For example, in the high-pressure-source-pressure dependent pressurizing state and the operation-force/high-pressure-source-pressure dependent pressurizing state, the brake fluid in the input chamber may have a considerably high pressure. Therefore, high-pressure seals are employed as the seals between the pressure receiving piston and the housing, each of which generates a comparatively large friction force when the pressure receiving piston is moved. On the other hand, in the master cylinder device of this form, since the pressure of the brake fluid in the input chamber does not act on the seal between the input piston and the housing, the seal is not required to be a high-pressure seal. Consequently, it is possible to make a friction force resulting from the seal upon a movement of the input piston be comparatively small. That is, a resistance upon a movement of the input piston is comparatively small, whereby operational feeling in a brake operation is excellent. Especially in the operation-force dependent pressurizing state, it is possible to provide excellent operational feeling.

It is noted that, in the master cylinder device herein, the "forward movement of the input piston" means not only a movement of a whole of the input piston but also a movement of a part of the input piston. For example, in the input piston capable of shrinking as described later, a forward movement of a part of the input piston to which the brake operation member is connected is considered the forward movement of the input piston in the master cylinder device of this form.

Additionally, in the master cylinder device, for example, when the high-pressure-source-pressure dependent pressurizing state is realized, a force by the pressure of the brake fluid in the pressurizing chamber is not transmitted to the brake operation member. However, in the master cylinder device of this form, owing to the reaction force applying mechanism, the operation reaction force is applied to the input piston while the forward movement of the input piston is allowed. Therefore, a driver can feel like pressurizing the brake fluid in the pressurizing chamber by the driver's operation force, that is, operating the brake device. That is, in the master cylinder device of this form, a so-called stroke simulator is constituted by the reaction force applying mechanism.

(2) The master cylinder device according to the form (1), wherein the pressure receiving piston includes an extension portion extending from the main body portion through the opening of the partition portion into the rear side chamber, and is fitted, at the extension portion, in the partition portion with the seal, whereby the input chamber is defined, and the inter-piston chamber is defined such that a rear end of the extension portion and the input piston face to each other.

In the master cylinder device of this form, the input chamber is defined to have an annular shape in a space around the extension portion. Also, since the extension portion extends beyond the partition portion into the rear side chamber, the inter-piston chamber is defined including a space across which a rear end face of the extension portion and a front end face of the input piston face to each other.

(3) The master cylinder device according to the form (2),
wherein one of a front side portion of the input piston and a rear side portion of the extension portion of the pressure receiving piston is formed into a hollow cylindrical shape, and the other of them is inserted in the one of them.

In the master cylinder device of this form, one of a rear side part of the pressure receiving piston and a front side part of the input piston is located inside the other of them. Since the pressure receiving piston and the input piston are arranged thus, a part of the pressure receiving piston and a part of the input piston overlap with each other in a front-back direction, whereby the total length of the master cylinder device can be shortened while respective necessary lengths of those pistons are secured. In the master cylinder device of this form, even in either a construction in which the front side portion of the input piston is formed into a hollow cylindrical shape or a construction in which the rear side portion of the extension portion of the pressure receiving piston is formed into a hollow cylindrical shape, the inter-piston chamber is defined including a space present inside the portion having the hollow cylindrical shape.

(4) The master cylinder device according to the form (1),
wherein the partition portion of the housing includes an annular separation wall portion projecting to inside the housing in a radial direction and an inner cylindrical portion having a hollow cylindrical shape and extending forward from an inner periphery of the separation wall portion, a front end of the inner cylindrical portion functions as the opening, and an interior of the inner cylindrical portion serves as a part of the rear side chamber,
wherein the main body portion of the pressure receiving piston includes a blind hole which is open rearward, whereby a rear side portion of the main body portion is a cylindrical portion having a hollow cylindrical shape, and the main body portion has the flange at a rear end of the cylindrical portion,
wherein the pressure receiving piston is disposed such that the inner cylindrical portion of the partition portion is inserted in the cylindrical portion of the pressure receiving piston, and the pressure receiving piston and the partition portion are fitted at an inner circumferential face of the cylindrical portion and an outer circumferential face of the inner cylindrical portion to each other with the seal, whereby the input chamber is defined between a rear end of the cylindrical portion and the separation wall portion of the partition portion, and
wherein the inter-piston chamber is defined such that a bottom portion of the blind hole of the pressure receiving piston and the input piston face to each other with the opening formed in the partition portion being interposed between the bottom portion and the input piston.

In the master cylinder device of this form, the housing can be considered to have a double-cylindrical structure. That is, the housing has a portion outside the inner cylindrical portion which can be called an outer cylindrical portion, therefore the cylindrical portion of the pressure receiving piston can be considered to be interposed between the inner cylindrical portion and the outer cylindrical portion. In addition, the input chamber can be considered to be a fluid chamber surrounded at a rear end of the cylindrical portion by the flange, the outer cylindrical portion, the separation wall portion, and the inner cylindrical portion.

(5) The master cylinder device according to the form (4),
wherein the input piston is disposed such that at least a part of the input piston including a front end thereof is inserted in the inner cylindrical portion.

In the master cylinder device of this form, a part of the input piston can be positioned in the cylindrical portion of the pressure receiving piston. Therefore, a part of the pressure receiving piston and a part of the input piston overlap with each other in the front-back direction, whereby the total length of the master cylinder device can be shortened while respective necessary lengths of those pistons are secured. In addition, in the master cylinder device of this form, the inter-piston chamber is defined including a space across which a bottom face of the cylindrical portion and the front end face of the input piston face to each other.

(6) The master cylinder device according to the form (5),
wherein the input piston is fitted, at the at least a part of the input piston, in the inner cylindrical portion with a seal.

In the master cylinder device of this form, since the input piston is fitted, at a part inserted in the inner cylindrical portion, in the housing with a seal, the inter-piston chamber is defined in the inner cylindrical portion.

(7) The master cylinder device according to any one of the forms (1)-(6),
wherein the reaction force applying mechanism includes a fluid storage chamber communicating with the opposing chamber and the inter-piston chamber, and an elastic-reaction-force applying mechanism for the fluid storage chamber which allows an increase of a volume of the fluid storage chamber according to a decrease of a total volume of the opposing chamber and the inter-piston chamber, and which applies an elastic reaction force with a magnitude according to an amount of the increase of the volume to a brake fluid in the fluid storage chamber.

In the master cylinder device of this form, the elastic reaction force by the elastic-reaction-force applying mechanism for the fluid storage chamber also acts on the brake fluid in each of the opposing chamber and the inter-piston chamber so as to change the pressure of the brake fluid in each of those chambers. More specifically, when the input piston moves forward, that is, a brake operation amount increases, the total volume of the opposing chamber and the inter-piston chamber decreases, and the volume of the fluid storage chamber increases by a volume of the brake fluids decreased in the above chambers, whereby the elastic reaction force increases. Consequently, the pressure of the brake fluid in each of the opposing chamber and the inter-piston chamber increases, whereby a bias force acting on the input piston to move the input piston rearward increases. Therefore, a driver can feel the increase of the bias force as an increase of the operation reaction force against the increase of the brake operation amount by the driver.

(8) The master cylinder device according to the form (7),
wherein the reaction force applying mechanism includes a reaction force applying device disposed outside the housing and having the fluid storage chamber and the elastic-reaction-force applying mechanism for the fluid storage chamber.

In the master cylinder device of this form, at least a part of the reaction force applying mechanism, in other words, a main part of the stroke simulator is provided outside the housing, whereby a structure inside the housing can be made comparatively simple.

(9) The master cylinder device according to any one of the forms (1)-(8),
wherein the reaction force applying mechanism includes an elastic-reaction-force applying mechanism for the input piston which allows a front end portion of the input piston defining the inter-piston chamber to recede relative to another portion connected to the brake operation member, thereby allowing the input piston to shrink, and which applies an elastic reaction force with a magnitude according to an amount of the shrink of the input piston.

In the master cylinder device of this form, a movement of the input piston relative to the pressure receiving piston is allowed by the shrink of the input piston. More specifically, even when the total volume of the opposing chamber and the inter-piston chamber is fixed, the forward movement of the input piston relative to the pressure receiving piston is allowed by that another portion of the input piston moves forward relative to the front end portion. Additionally, in the shrink of the input piston, a rearward bias force by the elastic-reaction-force applying mechanism for the input piston acts on another portion connected to the brake operation member. Therefore, a driver can feel the bias force as the operation reaction force against a brake operation by the driver. By the way, the reaction force applying mechanism of the master cylinder device may have two elastic-reaction-force-applying mechanisms, that is, the elastic-reaction-force applying mechanism for the input piston and the elastic-reaction-force applying mechanism for the fluid storage chamber.

(10) The master cylinder device according to any one of the forms (1)-(9), wherein a front end portion of the input piston defining the inter-piston chamber is allowed to recede relative to another portion connected to the brake operation member, whereby the input piston is allowed to shrink, and wherein the master cylinder device further comprises an input-piston-shrink prohibiting mechanism which prohibits the shrink of the input piston.

For example, in the master cylinder device equipped with the elastic-reaction-force applying mechanism for the input piston, when the shrink of the input piston is allowed, the operation force is transmitted to the pressure receiving piston while shrinking the input piston. However, the shrink of the input piston would cause the brake operation amount to ineffectively become large. The master cylinder device of this form may prohibit the shrink of the input piston, when pressurizing the brake fluid depending on the operation force, so as to transmit the operation force to the pressure receiving piston without generating an ineffective brake operation amount. This feature is advantageous in the operation-force dependent pressurizing state in particular.

(11) The master cylinder device according to any one of the forms (1)-(10), wherein the master cylinder device comprises a low-pressure-source communication mechanism for the opposing and inter-piston chambers which allows the opposing chamber and the inter-piston chamber to communicate with a low pressure source.

In the master cylinder device of this form, when the low-pressure-source communication mechanism for the opposing and inter-piston chambers functions, the input piston can move forward relative to the pressure receiving piston with the brake fluids in the opposing and inter-piston chambers being flowed into the low pressure source. Therefore, the input piston can come into an abutting contact with the pressure receiving piston, thereby transmitting the operation force to the pressure receiving piston. That is, since it is possible to move the pressure receiving piston forward depending on the operation force, the low-pressure-source communication mechanism for the opposing and inter-piston chambers can be considered a mechanism for realizing the operation-force dependent pressurizing state and the operation-force/high-pressure-source-pressure dependent pressurizing state. It is noted that, even where the master cylinder device includes the elastic-reaction-force applying mechanism for the fluid storage chamber or the elastic-reaction-force applying mechanism for the input piston, the operation reaction force by the elastic-reaction-force applying mechanism does not generate when the opposing chamber and the inter-piston chamber communicate with the low pressure source by the low-pressure-source communication mechanism for the opposing and inter-piston chambers. Consequently, the input piston can easily come into an abutting contact with the pressure receiving piston by the operation force.

For example, a mechanism having a normally-opened electromagnetic valve as a main component may be employed as the low-pressure-source communication mechanism for the opposing and inter-piston chambers. That is, in a case in which the master cylinder device is configured to make the opposing chamber and the inter-piston chamber communicate with the low pressure source by opening an electromagnetic valve, a normally-opened valve opens simultaneously at a moment when an electric failure occurs, and then the opposing chamber and the inter-piston chamber communicate with the low pressure source. In other words, such a low-pressure-source communication mechanism for the opposing and inter-piston chambers can allow the master cylinder device to be automatically actuated in the operation-force dependent pressurizing state in an electric failure condition.

(12) The master cylinder device according to any one of the forms (1)-(10), wherein the master cylinder device comprises a low-pressure-source communication mechanism for the opposing chamber which allows the opposing chamber to communicate with a low pressure source, and an inter-piston-chamber hermetically closing mechanism which hermetically closes the inter-piston chamber by shutting off the inter-chamber communication passage.

In the master cylinder device of this form, when the inter-piston-chamber hermetically closing mechanism functions, the operation force can be transmitted to the pressure receiving piston via the brake fluid in the inter-piston chamber. Accordingly, in a case in which the forward movement of the pressure receiving piston is allowed, it is possible to move the pressure receiving piston forward depending on the operation force. Therefore, the inter-piston-chamber hermetically closing mechanism may be considered a mechanism for realizing the operation-force dependent pressurizing state and the operation-force/high-pressure-source-pressure dependent pressurizing state. In addition, when the low-pressure-source communication mechanism for the opposing chamber functions, the brake fluid in the opposing chamber never causes the rearward bias force to act on the pressure receiving piston. That is, when the both mechanisms function, the pressure receiving piston can be moved forward while the rearward bias force being a resistance force against the forward movement of the pressure receiving piston is not generated.

For example, a mechanism having a normally-closed electromagnetic valve as a main component may be employed as the inter-piston-chamber hermetically closing mechanism. That is, in case in which the master cylinder device is configured to hermetically close the inter-piston chamber by closing an electromagnetic valve, a normally-closed valve closes simultaneously at a moment when an electric failure occurs, and then the inter-piston chamber is hermetically closed. On the other hand, a mechanism having a normally-opened electromagnetic valve as a main component may be employed as the low-pressure-source communication mechanism for the opposing chamber. That is, in case in which the master cylinder device is configured to make the opposing chamber communicate with the low pressure source by opening an electromagnetic valve, a normally-opened valve opens simultaneously at a moment when an electric failure occurs, and then the opposing chamber communicates with the low pressure source. In other words, such an inter-piston-chamber hermetically closing mechanism and a low-pressure-source communication mechanism for the opposing chamber can allow the master cylinder device to be automatically actuated in the operation-force dependent pressurizing state in an electric failure condition.

(13) A hydraulic brake system, comprising:
the master cylinder device according to any one of the forms (1)-(12);
a high pressure source device, as the high pressure source, which intensifies a pressure of a brake fluid; and
a pressure adjusting device which adjusts a pressure of a brake fluid to be introduced from the high pressure source device to the input chambers of the master cylinder device.

In the hydraulic brake system of this form, the brake fluid from the high pressure source device is introduced into the master cylinder device via the pressure adjusting device. Therefore, In the high-pressure-source-pressure dependent pressurizing state and the operation-force/high-pressure-source-pressure dependent pressurizing state, the pressure of the brake fluid is adjusted by the pressure adjusting device, whereby the pressure of the brake fluid in the pressurizing chamber can be adjusted to a pressure according to a pressure of the pressure-adjusted brake fluid. In other words, the hydraulic brake force by the brake device can be adjusted.

The hydraulic brake system of this form is favorable for a brake system provided in a hybrid vehicle etc. That is, it is favorable for a vehicle having a brake system which is also capable of braking the vehicle by using a regenerative brake force generated by an electric motor. Therefore, in a vehicle employing the system of this form, when a necessary brake force is small, the pressure of the brake fluid in the pressurizing chamber may be adjusted not to generate the hydraulic brake force and the vehicle may be braked depending on only the regenerative brake force. When the necessary brake force is large, the pressure of the brake fluid in the pressurizing chamber may be adjusted to generate the hydraulic brake force with a magnitude obtained by subtracting the regenerative brake force from the necessary brake force and the vehicle may be braked depending on the regenerative brake force plus the hydraulic brake force.

In order to control an activation of the pressure adjusting device as described above, the hydraulic brake system may have a sensor for detecting the brake operation amount, and a controller for outputting a command to the pressure adjusting device based on the detected value of the sensor. In addition, where the hydraulic brake system has a sensor for detecting the adjusted pressure, a pressure detected by the sensor is fed back to the controller, and then the adjusted pressure may be confirmed to have a degree according to the command.

(14) The hydraulic brake system according to the form (13),
wherein the high pressure source device includes a hydraulic pump which intensifies the pressure of the brake fluid, and an accumulator which stores the pressure-intensified brake fluid.

The high pressure source device of the hydraulic brake system of this form may introduce the highly-pressurized brake fluid stored in the accumulator into the input chamber. Accordingly, for example, where the accumulator is configured to store a certain amount of the brake fluid, the hydraulic pump need not be worked at all times but may be worked only in a time when a pressure of the brake fluid in the accumulator is below a predetermined pressure.

(15) The hydraulic brake system according to the form (13) or (14),
wherein the pressure adjusting device is configured to be controlled to reduce the pressure of the brake fluid supplied from the high pressure source device to a pressure according to the control, and configured to supply the pressure-reduced brake fluid to the master cylinder device, and
wherein the pressure adjusting device includes a pilot-pressure-dependent pressure reducing mechanism which utilizes, as a pilot pressure, any one of a pressure of the brake fluid in the pressurizing chamber, a pressure of the brake fluid in the opposing chamber, and a pressure of the brake fluid in the inter-piston chamber, and which reduces the pressure of the brake fluid supplied from the high pressure source device to a pressure according to the pilot pressure.

In order to reduce the pressure of the brake fluid, the pressure adjusting device of the hydraulic brake system of this form is considered, from a constitution described in the former part of this form, to be provided with a pressure reducing mechanism, that is, a mechanism for reducing the pressure of the brake fluid supplied from the high pressure source device. This pressure reducing mechanism may be, for example, a valve device etc. which can communicate with the low pressure source and can electrically adjust a valve opening pressure. Such a valve device can adjust the valve opening pressure according to the control, and may open at the valve opening pressure, thereby allowing the brake fluid from the high pressure source device to outflow to the low pressure source. That is, the pressure of the brake fluid from the high pressure source device can be reduced to a pressure according to the control. Where the valve device constitutes the pressure reducing mechanism, for example, the pressure reducing mechanism may be utilized as a main pressure reducing mechanism of the pressure adjusting device, and the pilot-pressure-dependent pressure reducing mechanism described in the latter part of this form may be utilized as an auxiliary pressure reducing mechanism. More specifically, for example, the pressure adjusting device may be configured such that the pilot-pressure-dependent pressure reducing mechanism can reduce the pressure of the brake fluid supplied from the high pressure source device in a condition in which the valve device cannot work due to a failure etc. Alternatively, the pressure adjusting device may be configured such that the pilot-pressure-dependent pressure reducing mechanism can reduce the pressure of the brake fluid supplied from the high pressure source device as long as the accumulator of the high pressure source device stores the highly-pressurized brake fluid even in a condition in which the whole of the brake system or the whole of the vehicle undergoes an electric failure.

By the way, the pilot-pressure-dependent pressure reducing mechanism may use, as a pilot pressure, not only a pressure of any one of the pressurizing chamber, the opposing chamber, and the inter-piston chamber but also a pressure of another fluid chamber indicating the pressure of any one of these chambers. For example, in a master cylinder device in which a fluid chamber is defined inside the input piston allowed to shrink and which includes an input-piston-shrink prohibiting mechanism prohibiting the shrink of the input piston by hermetically closing the inside fluid chamber, when a front end of the input piston comes into an abutting contact with the pressure receiving piston with the shrink of the input piston being prohibited, a force by the pressure of the brake fluid in the inside fluid chamber has a magnitude to be equal to a force by the pressure of the brake fluid in the pressurizing chamber via the pressure receiving piston. Therefore, the pressure of the fluid chamber inside the input piston is a pressure indicative of the pressure of the pressurizing chamber and may be utilized as the pilot pressure.

(16) The hydraulic brake system according to the form (15), wherein the pilot-pressure-dependent pressure reducing mechanism is configured to utilize the pressure of the brake fluid in the pressurizing chamber of the master cylinder device as the pilot pressure.

In the hydraulic brake system of this form, the pressure adjusting device can reduce, by the pilot-pressure-dependent pressure reducing mechanism, the pressure of the brake fluid supplied from the high pressure source device according to the pressure of the brake fluid in the pressurizing chamber. That is, for example, even in a condition in which an electric failure etc. occurs, when the pressure of the brake fluid in the pressurizing chamber is changed by the operation force, the pressure adjusting device can be activated by utilizing the pressure as the pilot pressure.

(17) The hydraulic brake system according to the form (15), wherein the pilot-pressure-dependent pressure reducing mechanism is configured to utilize the pressure of the brake fluid in the inter-piston chamber of the master cylinder device as the pilot pressure.

The pilot-pressure-dependent pressure reducing mechanism of the hydraulic brake system of this form is favorable for the master cylinder device which is configured to hermetically close the inter-piston chamber in a condition in which an electric failure etc. occurs. That is, in such a master cylinder device, the pressure of the brake fluid in the inter-piston chamber changes according to a brake operation, and the pressure adjusting device can reduce the pressure of the brake fluid from the high pressure source device according to the change of the pressure of the inter-piston chamber. It is noted that, since the pressure change of the brake fluid in the inter-piston chamber is caused by a movement of the input piston, the pressure change can follow a change of a brake operation comparatively well. That is, in the above described hydraulic brake system utilizing the pressure of the brake fluid in the pressurizing chamber as the pilot pressure, a pressure change of the brake fluid in the pressurizing chamber is affected by a friction force etc. upon a movement of the pressure receiving piston. In the hydraulic brake system of this form, since the pressure change of the brake fluid in the inter-piston chamber is not affected by the friction force etc., it follows a change of a brake operation comparatively well. Therefore, operational feeling in a brake operation is excellent when the pressure of the brake fluid from the high pressure source device is reduced by the pilot-pressure-dependent pressure reducing mechanism.

<<Master-Cut System Adoptable Type Master Cylinder Device>>

(21) A master cylinder device for supplying a pressurized brake fluid to a brake device provided in a wheel, comprising:

a housing whose front side end is closed and which includes a partition portion separating an interior of the housing into a front side chamber and a rear side chamber and having an opening through the partition portion;

a pressure receiving piston which includes a main body portion disposed in the front side chamber, and which is moved forward by receiving a force for pressurizing the brake fluid to be supplied to the brake device; and an input piston which is disposed in the rear side chamber, which is connected to a brake operation member disposed behind the housing, and which is moved forward by an operation force applied to the brake operation member, wherein the pressure receiving piston is fitted, at the main body portion, in the housing with a seal and fitted in the partition portion with a seal, whereby an input chamber into which a brake fluid from a high pressure source is introduced is defined between a rear end of the main body portion and the partition portion, wherein the input piston is fitted in the housing with a seal, whereby, between the input piston and the pressure receiving piston, there is defined an inter-piston chamber across which the input piston and the pressure receiving piston face to each other by utilizing the opening formed in the partition portion though the input piston and the pressure receiving piston are not fitted to each other with any seal, and wherein the master cylinder device further comprises a reaction force applying mechanism which is configured to allow a relative forward movement of the input piston relative to the pressure receiving piston by the operation force in a state in which a decrease of a volume of the inter-piston chamber is allowed, and which is configured to apply to the pressure receiving piston and the input piston a reaction force against the relative forward movement and with a magnitude according to an amount of the relative forward movement such that the reaction force acts as an operation reaction force against an operation of the brake operation member.

In the master cylinder device of this form, when a driver operates the brake operation member and the input piston moves forward relative to the pressure receiving piston, the driver can feel the reaction force applied to the input piston by the reaction force applying mechanism as the operation reaction force. The reaction force by the reaction force applying mechanism also acts on the pressure receiving piston, and thus the operation force is considered to be transmitted to the pressure receiving piston. Consequently, the pressure receiving piston can be moved forward by the operation force so as to pressurize the brake fluid to be supplied to the brake device. On the other hand, when the brake fluid from the high pressure source is introduced into the input chamber, a pressure of the brake fluid causes a forward bias force to act on the pressure receiving piston. Therefore, the pressure receiving piston can be moved forward by the bias force too. In other words, the pressure receiving piston can be also moved forward depending on the high-pressure-source pressure so as to pressurize the brake fluid to be supplied to the brake device. Consequently, in the master cylinder device of this form, the operation-force/high-pressure-source-pressure dependent pressurizing state is realized at all times.

In a case in which the supply of the pressurized brake fluid from this master cylinder device to the brake device is shut off, the brake device is never actuated by the supply of the brake fluid from the master cylinder device. Even in this case, where a hydraulic brake system equipped with the master cylinder device is configured to introduce, directly into the brake device, the brake fluid whose pressure is intensified by the high pressure source, the brake device can generate the hydraulic brake force depending on the pressure of the brake fluid, namely, the high-pressure-source pressure. For example, where the hydraulic brake system which includes a communication passage for supplying the brake fluid pressurized by the master cylinder device to the brake device and in which an electromagnetic valve is provided in the communication passage, it is possible to shut off the supply of the pressurized brake fluid from the master cylinder device to the brake device by closing the electromagnetic valve. In addition, where the hydraulic brake system includes a communication passage for supplying the brake fluid from the high pressure source to the brake device and an electromagnetic valve provided in the communication passage, it is possible to supply the pressurized brake fluid from the high pressure source to the brake device by opening the electromagnetic valve. Accordingly, where, in a normal condition, the supply of the brake fluid from the master cylinder device to the brake device is shut off and the brake fluid is supplied from the high pressure source to the brake device, a state in which the hydraulic brake force with a magnitude dependent on not the operation force for operating the brake operation member but the high-pressure-source pressure is generated is realized in the brake device. So to say, in the hydraulic brake system equipped with the master cylinder device of this form, the brake fluid is supplied from the high pressure source to the brake device and the communication between the master cylinder device and the brake device is shut (cut) off, whereby a state is realized in which the hydraulic brake force with a magnitude dependent on only the high-pressure-source pressure is generated, therefore the master cylinder device is called a "Master-Cut System Adoptable Type Master Cylinder Device".

In addition, when the supply of the brake fluid from the high pressure source to the brake device is shut off and the brake fluid is supplied from the master cylinder device to the brake device, the forward movement of the pressure receiving piston is allowed. Therefore, the brake device generates the hydraulic brake force by the supply of the brake fluid from the master cylinder device. In this state, the brake device generates the hydraulic brake force with a magnitude according to the pressure of the brake fluid pressurized in the master cylinder device depending on the operation force and the high-pressure-source pressure. Therefore, for example, where the supply of the brake fluid from the high pressure source to the brake device is shut off and the brake fluid is supplied from the master cylinder device to the brake device in a condition in which a large hydraulic brake force is required, such as a condition of an emergency brake, the brake device can generate a comparatively large hydraulic brake force. In other words, the master cylinder device in which the "operation-force/high-pressure-source-pressure dependent pressurizing state" is realized is made to communicate with the brake device, whereby the brake device is put into a state in which the hydraulic brake force with a magnitude dependent on the high-pressure-source pressure plus the hydraulic brake force with a magnitude dependent on the operation force generates.

It is desirable that a switch of a supply source of the brake fluid to the brake device, that is, the switch of the supply of the brake fluid from the high pressure source to the brake device and the shut-off of the supply as well as the switch of the supply of the brake fluid from the master cylinder device to the brake device and the shut-off of the supply are carried out at a moment when the pressure of the brake fluid supplied from the high pressure source to the brake device is approximately equal to the pressure of the brake fluid supplied from the master cylinder device to the brake device. That is, where the switches are carried out at a moment when both pressures are approximately equal, the hydraulic brake force does not change considerably at the switches, whereby the switches can be carried out without giving a driver unfavorable feeling. Therefore, in the pressure receiving piston, a pressurized area thereof on which a pressure of the input chamber acts and a pressurized area thereof on which a pressure of the pressurizing chamber acts may be determined such that the pressure of the brake fluid supplied from the high pressure source and the pressure of the brake fluid supplied from the master cylinder device become almost equal to each other. In other words, the pressurized area in the input chamber side may be determined smaller than the pressurized area in the pressurizing chamber side by a degree corresponding to the considered operation force.

Additionally, even in a condition in which the brake fluid is not introduced from the high pressure source, where the switch is carried out so that the master cylinder device becomes the supply source of the brake fluid to the brake device, the brake device can be actuated by the brake fluid pressurized depending on only the operation force. Accordingly, for example, in a condition in which the high pressure source cannot work due to an electric failure etc., a "operation-force dependent pressurizing state", that is, a state in which the brake fluid is pressurized depending on only the operation force is realized in the master cylinder device, and the hydraulic brake force with a magnitude dependent on the operation force generates in the brake device. Therefore, for example, where the shut-off of the supply of the brake fluid from the master cylinder device to the brake device is carried out by the above electromagnetic valve, it is desirable that this electromagnetic valve is a normally-opened valve. More specifically, where the electromagnetic valve is a normally-opened valve, it opens at a moment when an electric failure etc. occurs, whereby the brake fluid can be automatically supplied from the master cylinder device to the brake device. In addition, where the supply of the brake fluid from the high pressure source to the brake device is carried out by the above electromagnetic valve, it is desirable that this electromagnetic valve is a normally-closed valve. More specifically, where the electromagnetic valve is a normally-closed valve, it closes at a moment when an electric failure etc. occurs, whereby the supply of the brake fluid to the brake device can be automatically shut off.

In the master cylinder device of this form, like the above described Input Piston Free Type Master Cylinder Device, the input piston is not fitted to the pressure receiving piston with any seal. Therefore, a movement of the pressure receiving piston generates no force causing any movement of the input piston, that is, no force resulting from any friction force of any seal to act on the input piston. In other words, a movement of the pressure receiving piston does not pull the input piston and the operation member. Therefore, operational feeling in a brake operation is excellent. In addition, since the input chamber is defined by that the pressure receiving piston is fitted at the main body portion in the housing with the seal and fitted in the partition portion of the housing with the seal, the seal between the input piston and the housing is not required to be a high-pressure seal. Consequently, a friction force resulting from the seal upon a movement of the input piston can be comparatively reduced. That is, a resistance upon a movement of the input piston is comparatively small, whereby operational feeling in a brake operation is excellent. Especially in the state in which the hydraulic brake force is generated depending on the operation force, it is possible to provide excellent operational feeling.

It is noted that, even in the condition in which the supply source of the brake fluid to the brake device is the high pressure source, in other words, even in the condition of master-cut, a driver can move the input piston forward by a brake operation, and, owing to the operation reaction force by the reaction force applying mechanism, the driver can feel like that the driver's operation force pressurizes the brake fluid in the pressurizing chamber, that is, the driver operates the brake device by the driver's operation force. That is, in the master cylinder device, a so-called stroke simulator is constituted by the reaction force applying mechanism.

(22) The master cylinder device according to the form (21), wherein the pressure receiving piston includes an extension portion extending from the main body portion through the opening of the partition portion into the rear side chamber, and is fitted, at the extension portion, in the partition portion with the seal, whereby the input chamber is defined, and the inter-piston chamber is defined such that a rear end of the extension portion and the input piston face to each other.

In the master cylinder device of this form, like the above described Input Piston Free Type Master Cylinder Device having the extension portion, the inter-piston chamber is defined including a space across which a rear end face of the extension portion and a front end face of the input piston face to each other.

(23) The master cylinder device according to the form (22), wherein the pressure receiving piston includes a blind hole which is formed inside the main body portion and the extension portion and which is open rearward, and the inter-piston chamber is defined so as to include an interior of the blind hole.

In the master cylinder device of this form, since the inter-piston chamber is defined utilizing the blind hole, the size of the inter-piston chamber can be comparatively large in the front-back direction. Therefore, for example, where the master cylinder device includes a mechanism having a spring as the reaction force applying mechanism, and the spring is housed in the inter-piston chamber, and an elastic reaction force of the spring is applied to the input piston and the pressure receiving piston, the length of the spring can be set to be comparatively long. Consequently, the constant of the spring can be set comparatively small.

(24) The master cylinder device according to the form (21), wherein the partition portion of the housing includes an annular separation wall portion projecting to inside the housing in a radial direction and an inner cylindrical portion having a hollow cylindrical shape and extending forward from an inner periphery of the separation wall portion, a front end of the inner cylindrical portion functions as the opening, and an interior of the inner cylindrical portion serves as a part of the rear side chamber, wherein the main body portion of the pressure receiving piston includes a blind hole which is open rearward, whereby a rear side portion of the main body portion is a cylindrical portion having a hollow cylindrical shape, wherein the pressure receiving piston is disposed such that the inner cylindrical portion of the partition portion is inserted in the cylindrical portion of the pressure receiving piston, and the pressure receiving piston and the partition portion are fitted at an inner circumferential face of the cylindrical portion and an outer circumferential face of the inner cylindrical portion to each other with the seal, whereby the input chamber is defined between a rear end of the cylindrical portion and the separation wall portion of the partition portion, and wherein the inter-piston chamber is defined such that a bottom portion of the blind hole of the pressure receiving piston and the input piston face to each other with the opening formed in the partition portion being interposed between the bottom portion and the input piston.

In the master cylinder device of this form, like the above described Input Piston Free Type Master Cylinder Device constructed to have a double-cylindrical structure, the housing has a portion outside the inner cylindrical portion, which may be referred to as an outer cylindrical portion. In addition, the cylindrical portion of the pressure receiving piston can be considered to be interposed between the inner cylindrical portion and the outer cylindrical portion. Moreover, the input chamber can be considered to be a fluid chamber surrounded at a rear end of the cylindrical portion by the outer cylindrical portion, the separation wall portion, and the inner cylindrical portion.

(25) The master cylinder device according to the form (24), wherein the input piston is disposed such that at least a part of the input piston including a front end thereof is inserted in the inner cylindrical portion.

(26) The master cylinder device according to the form (25), wherein the input piston is fitted, at the at least a part of the input piston, in the inner cylindrical portion with a seal.

In the master cylinder devices of the above two forms, like the above described master cylinder device, specifically, the Input Piston Free Type Master Cylinder Device in which at least a part of the input piston including the front end thereof is inserted in the inner cylindrical portion, a part of the pressure receiving piston and a part of the input piston overlap with each other in the front-back direction, whereby the total length of the master cylinder device can be shortened while respective necessary lengths of those pistons are secured. Additionally, in the master cylinder device described in the latter form, where the input piston is fitted, at a part inserted in the inner cylindrical portion, in the housing with a seal, the inter-piston chamber is defined in the inner cylindrical portion.

(27) The master cylinder device according to any one of the forms (21)-(26), wherein the reaction force applying mechanism includes a fluid storage chamber communicating with the inter-piston chamber, and an elastic-reaction-force applying mechanism for the fluid storage chamber which allows an increase of a volume of the fluid storage chamber according to a decrease of a volume of the inter-piston chamber, and which applies an elastic reaction force with a magnitude according to an amount of the increase of the volume of the fluid storage chamber to a brake fluid in the fluid storage chamber.

In the master cylinder device of this form, like the Input Piston Free Type Master Cylinder Device having the fluid storage chamber and the elastic-reaction-force applying mechanism for the fluid storage chamber, the elastic reaction force by the elastic-reaction-force applying mechanism for the fluid storage chamber also acts on the brake fluid in the inter-piston chamber so as to change the pressure of the brake fluid in the chamber. More specifically, when the input piston moves forward relative to the pressure receiving piston, the volume of the inter-piston chamber decreases, and the volume of the fluid storage chamber increases by a volume of the brake fluid decreased in the inter-piston chamber, whereby the elastic reaction force increases. Consequently, the pressure of the brake fluid in the inter-piston chamber increases, whereby a bias force acting on the input piston to move the input piston rearward increases. In addition, the increase of the pressure of the brake fluid in the inter-piston chamber also increases a bias force acting on the pressure receiving piston to move the pressure receiving piston forward.

(28) The master cylinder device according to the form (27), wherein the reaction force applying mechanism includes a reaction force applying device disposed outside the housing and having the fluid storage chamber and the elastic-reaction-force applying mechanism for the fluid storage chamber.

In the master cylinder device of this form, like the above described Input Piston Free Type Master Cylinder Device having the reaction force applying mechanism, at least a part of the reaction force applying mechanism is provided outside the housing, whereby a structure inside the housing can be made comparatively simple.

(29) The master cylinder device according to any one of the forms (21)-(28), wherein the reaction force applying mechanism is disposed in the inter-piston chamber and includes an elastic member generating an elastic reaction force against the relative forward movement of the input piston relative to the pressure receiving piston.

For example, a compression coil spring may be employed as the elastic member. For example, where such a spring is disposed between a face of the pressure receiving piston which faces rearward and a face of the input piston which faces forward, a rearward bias force by the elastic reaction force acts on the input piston upon the forward movement of the input piston relative to the pressure receiving piston. Therefore, a driver can feel the rearward bias force as the operation reaction force. In addition, a forward bias force acts on the pressure receiving piston by the elastic reaction force of the spring.

(30) The master cylinder device according to any one of the forms (21)-(29), wherein the master cylinder device further comprises an input-piston-relative-forward-movement prohibiting mechanism which prohibits the relative forward movement of the input piston relative to the pressure receiving piston.

In the master cylinder device of this form, the operation force can be transmitted to the pressure receiving piston by prohibiting the relative forward movement of the input piston to the pressure receiving piston. For example, in the master cylinder device in which the elastic member such as the spring described above is provided in the inter-piston chamber, the operation force is transmitted to the pressure receiving piston while the input piston moves forward relative to the pressure receiving piston. However, the relative forward movement would cause the brake operation amount to ineffectively become large. The master cylinder device of this form may prohibit the relative forward movement of the input piston, when pressurizing the brake fluid depending on the operation force, so as to transmit the operation force to the pressure receiving piston without generating an ineffective brake operation amount. This is advantageous particularly in the state in which the hydraulic brake force is generated depending on the operation force.

(31) The master cylinder device according to the form (30), wherein the input-piston-relative-forward-movement prohibiting mechanism includes an inter-piston-chamber hermetically closing mechanism which hermetically closes the inter-piston chamber.

In the master cylinder device of this form, like the above described Input Piston Free Type Master Cylinder Device having the inter-piston-chamber hermetically closing mechanism, the operation force can be transmitted to the pressure receiving piston via the brake fluid in the inter-piston chamber by the inter-piston-chamber hermetically closing mechanism.

(32) The master cylinder device according to any one of the forms (21)-(31), wherein, in front of the main body portion of the pressure receiving piston in the front side chamber, there is defined a pressurizing chamber in which the brake fluid to be supplied to the brake device is pressurized by a forward movement of the pressure receiving piston.

The pressurizing chamber of the master cylinder device of this form may be defined by the pressure receiving piston. Alternatively, for example, another piston etc. may be disposed in front of the pressure receiving piston, and the pressurizing chamber may be defined by said another piston etc. In other words, the master cylinder device may be configured such that the pressure receiving piston moves forward to push said another piston etc. forward. In this master cylinder device, the forward movement of the pressure receiving piston can pressurize the brake fluid in the pressurizing chamber.

(33) The master cylinder device according to the form (32), wherein the master cylinder device further comprises a pressurizing piston disposed in front of the pressure receiving piston in the front side chamber, wherein the pressurizing piston is fitted in the housing with a seal, whereby a pressurizing chamber in which a brake fluid to be supplied to the brake device is pressurized is defined in front of the pressurizing piston, and wherein the master cylinder device is configured such that the forward movement of the pressure receiving piston moves forward the pressurizing piston with the pressure receiving piston abutting on the pressurizing piston, whereby the brake fluid in the pressurizing chamber is pressurized.

In the master cylinder device of this form, the pressurizing piston is pushed forward by the pressure receiving piston so as to be moved forward, that is, the forward movement of the pressure receiving piston can pressurize the brake fluid in the pressurizing chamber. The master cylinder device of this form is, so to speak, an embodiment in which the pressure receiving piston indirectly pressurizes the brake fluid via the pressurizing piston.

(34) A hydraulic brake system, comprising:

the master cylinder device according to any one of the forms (21)-(33);

a high pressure source device, as the high pressure source, which intensifies a pressure of a brake fluid; and a pressure adjusting device which adjusts a pressure of a brake fluid to be introduced from the high pressure source device to the input chambers of the master cylinder device.

In the hydraulic brake system of this form, the brake fluid from the high pressure source device is introduced into the master cylinder device via the pressure adjusting device. Alternatively, the brake fluid introduced into the brake device may be introduced via the pressure adjusting device. In this hydraulic brake system, the hydraulic brake force generated in the brake device has a magnitude according to a pressure of the pressure-adjusted brake fluid. That is, in the state in which the hydraulic brake force is generated depending on the high-pressure-source pressure, or in the state in which the hydraulic brake force is generated depending on the operation force and the high-pressure-source pressure, the hydraulic brake force generated in the brake device can be adjusted by adjusting the pressure of the brake fluid by the pressure adjusting device.

In addition, for the switch described above, that is, the switch of the supply source of the brake fluid to the brake device between the high pressure source and the master cylinder device, the hydraulic brake system may include a switching mechanism. For example, in the hydraulic brake system described above, that is, in the hydraulic brake system which has a communication passage for supplying the brake fluid from the master cylinder device to the brake device and an electromagnetic valve provided in the communication passage as well as a communication passage for supplying the brake fluid from the high pressure source to the brake device and an electromagnetic valve provided in the communication passage, the switching mechanism may be constituted by a mechanism having those electromagnetic valves as main components.

(35) The hydraulic brake system according to the form (34), wherein the high pressure source device includes a hydraulic pump which intensifies the pressure of the brake fluid, and an accumulator which stores the pressure-intensified brake fluid.

In the hydraulic brake system of this form, like the above described hydraulic brake system having the hydraulic pump and the accumulator, where the accumulator is configured to store a certain amount of the brake fluid, the hydraulic pump may be worked only in a time when a pressure of the brake fluid in the accumulator is below a predetermined pressure.

(36) The hydraulic brake system according to the form (34) or (35), wherein, in front of the main body portion of the pressure receiving piston in the front side chamber, there is defined a pressurizing chamber in which the brake fluid to be supplied to the brake device is pressurized by a forward movement of the pressure receiving piston, wherein the pressure adjusting device is configured to be controlled to reduce the pressure of the brake fluid supplied from the high pressure source device to a pressure according to the control, and configured to supply the pressure-reduced brake fluid to the master cylinder device, and wherein the pressure adjusting device includes a pilot-pressure-dependent pressure reducing mechanism which utilizes, as a pilot pressure, any one of a pressure of the brake fluid in the pressurizing chamber and a pressure of the brake fluid in the inter-piston chamber, and which reduces the pressure of the brake fluid supplied from the high pressure source device to a pressure according to the pilot pressure.

In the hydraulic brake system of this form, like the above described hydraulic brake system having the pressure adjusting device, the pilot-pressure-dependent pressure reducing mechanism, which is an auxiliary pressure reducing mechanism, can reduce the pressure of the brake fluid supplied from the high pressure source device.

(37) The hydraulic brake system according to the form (36), wherein the pilot-pressure-dependent pressure reducing mechanism is configured to utilize the pressure of the brake fluid in the pressurizing chamber of the master cylinder device as the pilot pressure.

In the hydraulic brake system of this form, like the above described hydraulic brake system utilizing the pressure of the pressurizing chamber as the pilot pressure, where the pressure of the brake fluid in the pressurizing chamber is changed by the operation force, the pressure adjusting device can be activated by utilizing the pressure as the pilot pressure.

(38) The hydraulic brake system according to the form (36), wherein the pilot-pressure-dependent pressure reducing mechanism is configured to utilize the pressure of the brake fluid in the inter-piston chamber of the master cylinder device as the pilot pressure.

In the hydraulic brake system, like the above described hydraulic brake system utilizing the pressure of the inter-piston chamber as the pilot pressure, a pressure change of the brake fluid in the inter-piston chamber can follow a change of a brake operation comparatively well. Therefore, operational feeling in a brake operation is excellent when the pressure of the brake fluid is reduced by the pilot-pressure-dependent pressure reducing mechanism.

<<Pressure Receiving Piston Lock Type Master Cylinder Device>>

(41) A master cylinder device for supplying a pressurized brake fluid to a brake device provided in a wheel, comprising:

a housing whose front side end is closed and which includes a partition portion separating an interior of the housing into a front side chamber and a rear side chamber and having an opening through the partition portion;

a pressure receiving piston which includes a main body portion having a flange on a rear end thereof and disposed in the front side chamber, and which is moved forward by receiving a force for pressurizing the brake fluid to be supplied to the brake device;

a pressurizing piston disposed in the front side chamber and in front of the pressure receiving piston; and an input piston which is disposed in the rear side chamber, which is connected to a brake operation member disposed behind the housing, and which is moved forward by an operation force applied to the brake operation member, wherein the pressurizing piston is fitted in the housing with a seal, the main body portion of the pressure receiving piston is fitted, at the flange and a portion in front of the flange, in the housing with respective seals, and the pressure receiving piston is fitted in the partition portion with a seal, whereby: a pressurizing chamber in which the brake fluid to be supplied to the brake device is pressurized by a forward movement of the pressurizing piston is defined in front of the pressurizing piston; a first input chamber into which a brake fluid from a high pressure source is introduced is defined between the main body portion of the pressure receiving piston and the pressure receiving piston; a second input chamber into which the brake fluid from the high pressure source is introduced is defined between a rear end of the main body portion of the pressure receiving piston and the partition portion; and an opposing chamber which opposes the second input chamber with the flange being interposed between the opposing and second input chambers is defined around the main body portion of the pressure receiving piston, wherein the input piston is fitted in the housing with a seal, whereby, between the input piston and the pressure receiving piston, there is defined an inter-piston chamber across which the input piston and the pressure receiving piston face to each other by utilizing the opening formed in the partition portion though the input piston and the pressure receiving piston are not fitted to each other with any seal, wherein the master cylinder device is configured such that a pressurized area of the pressure receiving piston on which a pressure of the brake fluid in the first input chamber acts and a pressurized area of the pressure receiving piston on which a pressure of the brake fluid in the second input chamber acts are equal, and such that, when the respective brake fluids are introduced from the high pressure source into the first input chamber and the second input chamber with the opposing chamber being hermetically closed, a forward movement of the pressure receiving piston is prohibited and the brake fluid in the pressurizing chamber is pressurized by the forward movement of the pressurizing piston, and wherein the master cylinder device further comprises a reaction force applying mechanism which is configured to allow a relative forward movement of the input piston relative to the pressure receiving piston by the operation force in a state in which a decrease of a volume of the inter-piston chamber is allowed, and which is configured to apply to the pressure receiving piston and the input piston a reaction force against the relative forward movement and with a magnitude according to an amount of the relative forward movement such that the reaction force acts as an operation reaction force against an operation of the brake operation member.

In the master cylinder device of this form, when the brake fluid is introduced from the high pressure source to the first input chamber, the pressurizing piston moves forward so as to supply the pressurized brake fluid to the brake device. As regards the pressure receiving piston, the pressurized area on which the pressure of the brake fluid in the first input chamber acts and the pressurized area on which the pressure of the brake fluid in the second input chamber acts are equal. Therefore, a rearward bias force acting on the pressure receiving piston by the pressure of the brake fluid in the first input chamber and a frontward bias force acting on the pressure receiving piston by the pressure of the brake fluid in the second input chamber become equal. Accordingly, even when the brake fluid is introduced from the high pressure source into the first input chamber and the second input chamber, this brake fluid does not cause any movement of the pressure receiving piston. In addition, when the opposing chamber is hermetically closed, the forward movement of the pressure receiving piston is prohibited. As a result, in a state in which the opposing chamber is hermetically closed, when a driver operates the brake operation member, the operation force is not transmitted to the pressurizing piston via the pressure receiving piston, and the pressurizing piston can pressurize the brake fluid to be supplied to the brake device depending on only a pressure of the brake fluid introduced from the high pressure source. In other words, the master cylinder device of this form can realize a high-pressure-source-pressure dependent pressurizing state. So to say, the master cylinder device can realize the high-pressure-source-pressure dependent pressurizing state with the pressure receiving piston being fixed (locked), thus the master cylinder device is called the "Pressure Receiving Piston Lock Type Master Cylinder Device".

It is noted that the pressurized area on which the pressure of the brake fluid in the first input chamber acts and the pressurized area on which the pressure of the brake fluid in the second input chamber acts need not be precisely equal but may be slightly different. That is, the term "equal" regarding the pressurized areas of the pressure receiving piston on which the pressures of the brake fluids act, as used herein, includes a concept that these pressurized areas are slightly different, in other words, a concept that these pressurized areas are considered to be substantially equal. Where the two pressurized areas are slightly different, the magnitude of the forward bias force and the magnitude of the rearward bias force described above are slightly different. Therefore, even in a normal condition, the pressure receiving piston moves slightly. This is advantageous, for example, to preventing the pressure receiving piston from adhering to the housing, which is caused by that the pressure receiving piston is not moved for a long time.

In addition, where the operation force is transmitted to the pressure receiving piston by releasing the hermetical closing of the opposing chamber in a realization of the high-pressure-source-pressure dependent pressurizing state, the master cylinder device can realize an "operation-force/high-pressure-source-pressure dependent pressurizing state". In this state, the brake device can generate a hydraulic brake force with a magnitude dependent on the pressure of the second input chamber, namely, the high-pressure-source pressure plus a hydraulic brake force with a magnitude dependent on the operation force. In order to transmit the operation force from the pressure receiving piston to the pressure receiving piston, for example, the pressure receiving piston may be allowed to come into an abutting contact with the pressurizing piston, or alternatively, the first input chamber may be hermetically closed. More specifically, where the pressure receiving piston comes into an abutting contact with the pressurizing piston, the operation force is transmitted, owing to the abutting contact, from the pressure receiving piston to the pressurizing piston. Where the first input chamber is hermetically closed, the operation force is transmitted, via the brake fluid in the first input chamber, to the pressure receiving piston. Therefore, where the operation-force/high-pressure-source-pressure dependent pressurizing state is realized in a condition in which a large hydraulic brake force is required, such as a condition of an emergency brake, the brake device can generate a comparatively large hydraulic brake force. In addition, according to the master cylinder device of this form, it is possible to generate a comparatively large hydraulic brake force with the high pressure source having a comparatively small output. In order to transmit the operation force to the pressure receiving piston, for example, the input piston may be allowed to come into an abutting contact with the pressure receiving piston, or alternatively, the inter-piston chamber may be hermetically closed.

In addition, even when the brake fluid is not introduced from the high pressure source, as in the operation-force/high-pressure-source-pressure dependent pressurizing state, the master cylinder device can realize an "operation-force dependent pressurizing state" by releasing the hermetical closing of the opposing chamber and transmitting the operation force to the pressurizing piston. Therefore, for example, even in a condition in which the high pressure source cannot work due to an electric failure etc., the brake device can be actuated depending on only the operation force.

In the master cylinder device of this form, like the Input Piston Free Type Master Cylinder Device and the Master-Cut System Adoptable Type Master Cylinder Device described above, the input piston is not fitted to the pressure receiving piston with any seal. Therefore, a movement of the pressure receiving piston by the introduction of the brake fluid from the high pressure source to the input chamber generates no force causing any movement of the input piston, that is, no force resulting from any friction force of any seal to act on the input piston. In other words, a movement of the pressure receiving piston does not pull the input piston and the operation member. Therefore, operational feeling in a brake operation is excellent. Additionally, in the master cylinder device of this form, since the input chamber is defined by that the pressure receiving piston is fitted, at the main body portion, in the housing with the seal and fitted in the partition portion of the housing with the seal, the seal between the input piston and the housing is not required to be a high-pressure seal. Consequently, a friction force resulting from the seal upon a movement of the input piston can be comparatively reduced. That is, a resistance upon a movement of the input piston is comparatively small, whereby operational feeling in a brake operation is excellent. Especially in the operation-force dependent pressurizing state, it is possible to provide excellent operational feeling.

Additionally, in the master cylinder device of this form, for example, when the high-pressure-source-pressure dependent pressurizing state is realized, a force by the pressure of the brake fluid in the pressurizing chamber is not transmitted to the brake operation member. However, owing to the operation reaction force by the reaction force applying mechanism, the driver can feel like pressurizing the brake fluid in the pressurizing chamber by the driver's operation force, that is, operating the brake device. That is, in the master cylinder device of this form, a so-called stroke simulator is constituted by the reaction force applying mechanism.

(42) The master cylinder device according to the form (41), wherein the pressure receiving piston includes an extension portion extending from the main body portion through the opening of the partition portion into the rear side chamber and is fitted, at the extension portion, in the partition portion with the seal, whereby the second input chamber is defined, and the inter-piston chamber is defined such that a rear end of the extension portion and the input piston face to each other.

In the master cylinder device of this form, like the Input Piston Free Type Master Cylinder Device and the Master-Cut System Adoptable Type Master Cylinder Device having the extension portion as described above, the inter-piston chamber is defined including a space across which a rear end face of the extension portion and a front end face of the input piston face to each other.

(43) The master cylinder device according to the form (42),
wherein the pressure receiving piston includes a blind hole which is formed inside the main body portion and the extension portion and which is open rearward, and the inter-piston chamber is defined so as to include an interior of the blind hole.

In the master cylinder device of this form, like the above described Master Cut System Adoptable Type Master Cylinder Device having the blind hole, since the inter-piston chamber is defined utilizing the blind hole, the size of the inter-piston chamber can be comparatively large in the front-back direction. Therefore, for example, a comparatively long spring can be employed as the reaction force applying mechanism, and the constant of the spring can be set to be comparatively small.

(44) The master cylinder device according to the form (43),
wherein the partition portion of the housing includes an annular separation wall portion projecting to inside the housing in a radial direction and an inner cylindrical portion having a hollow cylindrical shape and extending forward from an inner periphery of the separation wall portion, a front end of the inner cylindrical portion functions as the opening, and an interior of the inner cylindrical portion serves as a part of the rear side chamber,
wherein the main body portion of the pressure receiving piston includes a blind hole which is open rearward, whereby a rear side portion of the main body portion is a cylindrical portion having a hollow cylindrical shape, and the main body portion has the flange at a rear end of the cylindrical portion,
wherein the pressure receiving piston is disposed such that the inner cylindrical portion of the partition portion is inserted in the cylindrical portion of the pressure receiving piston, and the pressure receiving piston and the partition portion are fitted at an inner circumferential face of the cylindrical portion and an outer circumferential face of the inner cylindrical portion to each other with the seal, whereby the second input chamber is defined between the rear end of the cylindrical portion and the separation wall portion of the partition portion, and
wherein the inter-piston chamber is defined such that a bottom portion of the blind hole of the pressure receiving piston and the input piston face to each other with the opening formed in the partition portion being interposed between the bottom portion and the input piston.

In the master cylinder device of this form, like the Input Piston Free Type Master Cylinder device and the Master-Cut System. Adoptable Type Master Cylinder described above whose respective housings are constructed to have a double-cylindrical structure, the housing has a portion outside the inner cylindrical portion, which may be referred to as an outer cylindrical portion. The cylindrical portion of the pressure receiving piston can be considered to be interposed between the inner cylindrical portion and the outer cylindrical portion. Moreover, the input chamber can be considered to be a fluid chamber surrounded at a rear end of the cylindrical portion by the outer cylindrical portion, the separation wall portion, and the inner cylindrical portion.

(45) The master cylinder device according to the form (44),
wherein at least a part of the input piston including a front end thereof is disposed so as to be inserted in the inner cylindrical portion.

(46) The master cylinder device according to the form (45),
wherein the input piston is fitted, at the at least a part of the input piston, in the inner cylindrical portion with a seal.

In the master cylinder devices of the above two forms, like the above described master cylinder devices, specifically, the Input Piston Free Type Master Cylinder Device and the Master-Cut System Adoptable Type Master Cylinder Device in each of which at least a part of the input piston including a front end thereof is inserted in the inner cylindrical portion, a part of the pressure receiving piston and a part of the input piston overlap with each other in the front-back direction, whereby a total length of the master cylinder device can be shortened while respective necessary lengths of those pistons are secured. Additionally, in the master cylinder device described in the latter form, where the input piston is fitted, at a part inserted in the inner cylindrical portion, in the housing with a seal, the inter-piston chamber is defined in the inner cylindrical portion.

(47) The master cylinder device according to any one of the forms (41)-(46),
wherein the reaction force applying mechanism includes an elastic member disposed in the inter-piston chamber and generating an elastic reaction force against a relative forward movement of the input piston relative to the pressure receiving piston.

In the master cylinder device of this form, like the above described Master-Cut System Adoptable Type Master Cylinder Device in which the reaction force applying mechanism includes the elastic member, for example, a compression coil spring may be employed as the elastic member. Such a spring can apply a rearward bias force by the elastic reaction force to the input piston against the forward movement of the input piston relative to the pressure receiving piston. Therefore, a driver can feel the bias force as the operation reaction force.

(48) The master cylinder device according to any one of the forms (41)-(47),
wherein the master cylinder device further comprises a low-pressure-source communication mechanism which allows the opposing chamber to communicate with a low pressure source, and
wherein the master cylinder device is configured to allow the forward movement of the pressure receiving piston in a state in which the opposing chamber communicates with the low pressure source by the low-pressure-source communication mechanism so as to allow an abutting contact of the pressure receiving piston and the pressurizing piston to each other, and is configured to allow a pressurization of the brake fluid in the pressurizing chamber not depending on pressures of the brake fluids introduced from the high pressure source into the first input chamber and the second input chamber but depending on the operation force.

In the master cylinder device of this form, the operation force is transmitted to the pressurizing piston via the pressure receiving piston by a function of the low-pressure-source communication mechanism. Therefore, the low-pressure-source communication mechanism may be considered a mechanism for realizing the operation-force dependent pressurizing state. In addition, when the brake fluid from the high pressure source is introduced into the second input chamber in a state in which the pressure receiving piston abuts on the pressurizing piston by the low-pressure-source communication mechanism, the pressurizing piston can be moved forward depending on a pressure of the brake fluid in the second input chamber, whereby the operation-force/high-pressure-source-pressure dependent pressurizing state is realized. In order to allow the pressurization of the brake fluid in the pressurizing chamber by the operation force, for example, as described above, the input piston may be allowed to come into an abutting contact with the pressure receiving piston, or alternatively, the inter-piston chamber may be hermetically closed.

For example, a mechanism having a normally-opened electromagnetic valve as a main component may be employed as the low-pressure-source communication mechanism. That is, in a case in which the master cylinder device is configured to make the opposing chamber communicate with the low pressure source by opening a valve, the normally-opened valve opens simultaneously at a moment when an electric failure occurs, and then the opposing chamber communicates with the low pressure source. In other words, such a low-pressure-source communication mechanism can allow the master cylinder device to be actuated in the operation-force dependent pressurizing state in an electric failure condition.

(49) The master cylinder device according to any one of the forms (41)-(48), wherein the master cylinder device further comprises an input-piston-relative-forward-movement prohibiting mechanism which prohibits the relative forward movement of the input piston relative to the pressure receiving piston.

In the master cylinder device of this form, like the above described Master-Cut System Adoptable Type Master Cylinder Device having the input-piston-relative-forward-movement prohibiting mechanism, the operation force can be transmitted to the pressure receiving piston by prohibiting the relative forward movement of the input piston to the pressure receiving piston. Accordingly, since it does not occur that the input piston moves forward relative to the pressure receiving piston and the operation force is transmitted to the pressure receiving piston, the operation force can be transmitted to the pressure receiving piston without generating an ineffective brake operation amount when the brake fluid is pressurized in the operation-force dependent pressurizing state or the operation-force/high-pressure-source-pressure dependent pressurizing state, that is, depending on the operation force. This feature is advantageous in the operation-force dependent pressurizing state in particular.

(50) The master cylinder device according to the form (49), wherein the input-piston-relative-forward-movement prohibiting mechanism includes an inter-piston-chamber hermetically closing mechanism which hermetically closes the inter-piston chamber.

In the master cylinder device of this form, like the Input Piston Free Type Master Cylinder Device and the Master-Cut System Adoptable Type Master Cylinder Device described above which have the inter-piston-chamber hermetically closing mechanism, the operation force can be transmitted to the pressure receiving piston via the brake fluid in the inter-piston chamber by the inter-piston-chamber hermetically closing mechanism.

(51) A hydraulic brake system, comprising:

the master cylinder device according to any one of the forms (41)-(50);

a high pressure source device, as the high pressure source, which intensifies a pressure of a brake fluid; and a pressure adjusting device which adjusts a pressure of a brake fluid to be introduced from the high pressure source device to the input chambers of the master cylinder device.

In the master cylinder device of this form, like the above described hydraulic brake system having the Input Piston Free Type Master Cylinder Device, the high pressure source device, and pressure adjusting device, the pressure of the brake fluid in the pressurizing chamber can be adjusted to a pressure according to a pressure of the pressure-adjusted brake fluid in the high-pressure-source-pressure dependent pressurizing state and the operation-force/high-pressure-source-pressure dependent pressurizing state. In other words, the hydraulic brake force in the brake device can be adjusted.

(52) The hydraulic brake system according to the form (51), wherein the high pressure source device includes a hydraulic pump which intensifies the pressure of the brake fluid, and an accumulator which stores the pressure-intensified brake fluid.

In the hydraulic brake system of this form, like the above described hydraulic brake system having the hydraulic pump and the accumulator, where the accumulator is configured to store a certain amount of the brake fluid, the hydraulic pump may be worked only in a time when a pressure of the brake fluid in the accumulator is below a predetermined pressure.

(53) The hydraulic brake system according to the form (51) or (52), wherein the pressure adjusting device is configured to be controlled to reduce the pressure of the brake fluid supplied from the high pressure source device to a pressure according to the control, and configured to supply the pressure-reduced brake fluid to the master cylinder device, and wherein the pressure adjusting device includes a pilot-pressure-dependent pressure reducing mechanism which utilizes, as a pilot pressure, any one of a pressure of the brake fluid in the pressurizing chamber, a pressure of the brake fluid in the opposing chamber, and a pressure of the brake fluid in the inter-piston chamber, and which reduces the pressure of the brake fluid supplied from the high pressure source device to a pressure according to the pilot pressure.

In the hydraulic brake system of this form, like the above described hydraulic brake system having the pressure adjusting device, the pilot-pressure-dependent pressure reducing mechanism, which is an auxiliary pressure reducing mechanism, can reduce the pressure of the brake fluid supplied from the high pressure source device.

(54) The hydraulic brake system according to the form (53), wherein the pilot-pressure-dependent pressure reducing mechanism is configured to utilize the pressure of the brake fluid in the pressurizing chamber of the master cylinder device as the pilot pressure.

In the hydraulic brake system of this form, like the above described hydraulic brake system utilizing the pressure of the pressurizing chamber as the pilot pressure, where the pressure of the brake fluid in the pressurizing chamber is changed by the operation force, the pressure adjusting device can be activated by utilizing the pressure as the pilot pressure.

(55) The hydraulic brake system according to the form (53), wherein the pilot-pressure-dependent pressure reducing mechanism is configured to utilize the pressure of the brake fluid in the pressurizing chamber of the master cylinder device as the pilot pressure.

In the hydraulic brake system, like the above described hydraulic brake system utilizing the pressure of the inter-piston chamber as the pilot pressure, a pressure change of the brake fluid in the inter-piston chamber can follow a change of a brake operation comparatively well. Therefore, operational feeling in a brake operation is excellent when the pressure of the brake fluid is reduced by the pilot-pressure-dependent pressure reducing mechanism.

MODES FOR CARRYING OUT THE INVENTION

There will be described in detail some embodiments according to the claimable invention with reference to the drawings. It is to be understood, however, that the claimable invention is not limited to the following embodiments but may be embodied with various changes and modifications on the basis of knowledge of those skilled in the art.

First Embodiment

Structure of Vehicle

Figure 1:
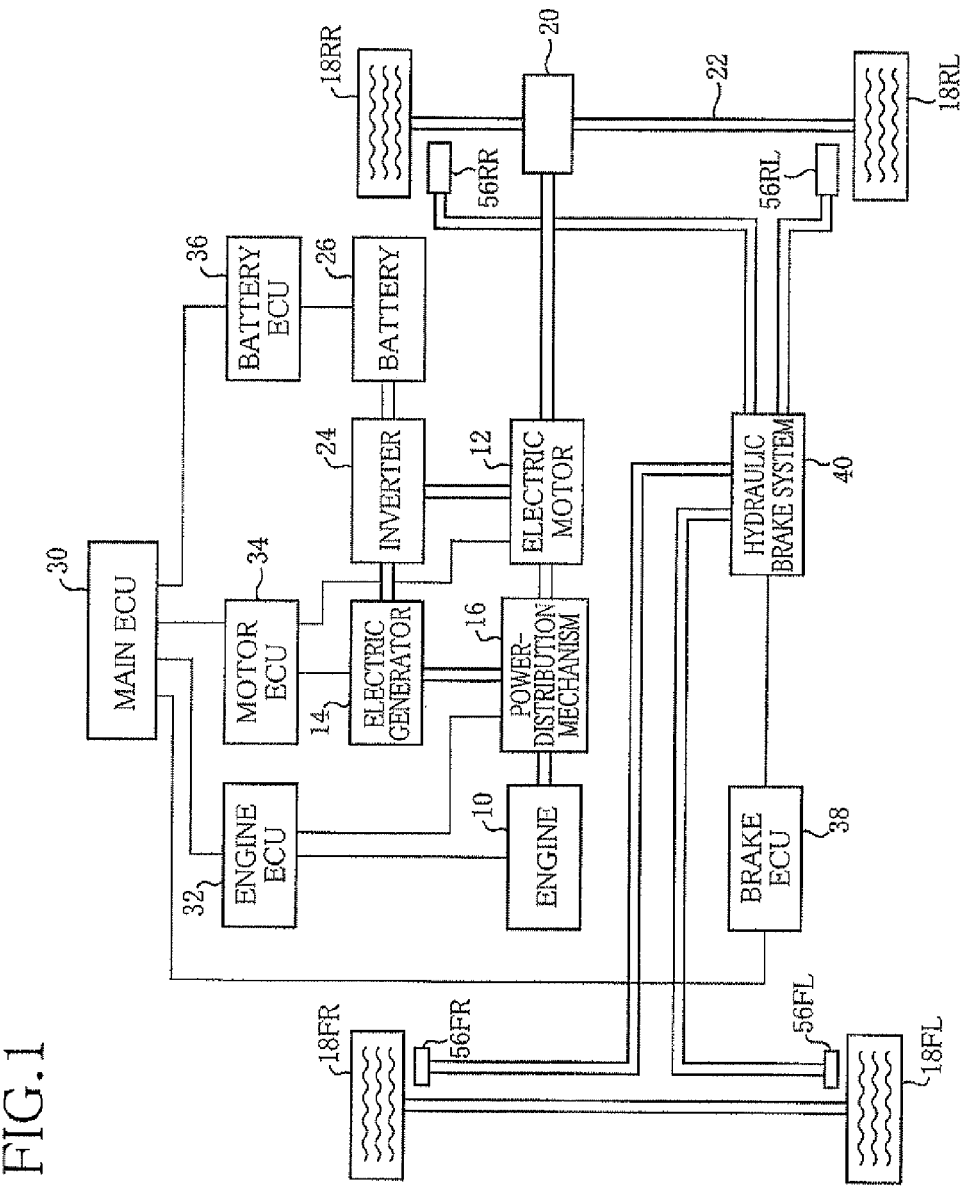
FIG. 1 is a schematic view of a drive system and a brake system of a hybrid vehicle equipped with a master cylinder device of an embodiment according to the claimable invention.

FIG. 1 schematically illustrates a drive system and a brake system of a hybrid vehicle equipped with a master cylinder device of a first embodiment. The vehicle is equipped with an engine 10 and an electric motor 12 as power sources, and also an electric generator 14 for generating electricity by an output power of the engine 10. The engine 10, the electric motor 12, and the electric generator 14 are connected to one another via a power-distribution mechanism 16. By controlling the power-distribution mechanism 16, the power of the engine 10 can be divided into a power for driving the electric generator 14 and a power for rotating drive wheels among four wheels 18, and a power of the electric motor 12 can be transmitted to the drive wheels. In other words, the power-distribution mechanism 16 functions as a speed-change mechanism with respect to a driving power which is transmitted to the drive wheels via a speed reducer 20 and a drive shaft 22. It is noted that, while some of components such as the wheels 18 are collectively described, a suitable one of suffixes "FL", "FR", "RL", "RR" respectively indicative of a front left wheel, a front right wheel, a rear left wheel, and a rear right wheel is attached to the numerals of a component element, where it is needed to indicate which one of the four wheels the component corresponds to. According to the explanation of the suffixes, the drive wheels of the vehicle are the wheel 18RL and the wheel 18 RR.

The electric motor 12 is an alternate current (AC) synchronous motor and is driven by AC electricity. The vehicle is equipped with an inverter 24 which can change electricity of direct current to electricity of alternate current and vice versa. Therefore, by controlling the inverter 24, electricity of alternate current generated by the electric generator 14 can be inverted into electricity of direct current for being charged in a battery 26, and electricity of direct current charged in the battery 26 can be inverted into electricity of alternate current for driving the electric motor 12. The electric generator 14 is constructed as an AC synchronous motor, like the electric motor 12. Accordingly, the vehicle of the present embodiment can be considered to have two AC synchronous motors. One of them is used as the electric motor 12 to mainly output the driving power, and the other of them is used as the electric generator 14 to mainly generate electricity by using the output power of the engine 10.

The electric motor 12 can also generate (regenerate) electricity by using rotations of the wheels 18RL and 18RR in the vehicle running. In regenerating electricity, the electric motor 12 connected to the wheels 18RL and 18RR generates electricity and a resistance force for restraining a rotation of the electric motor 12. Therefore, it is possible to utilize the resistance force as a brake force for braking the vehicle. That is, the electric motor 12 is utilized as means of a regenerative brake which brakes the vehicle while regenerating electricity. Thus, the vehicle is braked by controlling the regenerative brake as well as an engine brake and a hydraulic brake described below. On the other hand, the electric generator 14 mainly generates electricity by using the output power of the engine 10 and also functions as an electric motor by that electricity is supplied from the battery 26 via the inverter 24.

In the vehicle, a control of the above brakes and various other controls associated with the vehicle are executed by a plurality of electronic control units (ECUs). Among the ECUs, a main ECU 30 has a function for supervising the execution of these controls. For instance, the hybrid vehicle can run by a drive of the engine 10 and a drive of the electric motor 12, which are synthetically controlled by the main ECU 30. Specifically, the main ECU 30 determines a ratio between the output power of the engine 10 and an output power of the electric motor 12, and, on the basis of the ratio, the main ECU 30 sends, to an engine ECU 32 for controlling the engine 10 and a motor ECU 34 for controlling the electric motor 12 and the electric generator 14, commands regarding their respective controls.

A battery ECU 36 for controlling the battery 26 is also connected to the main ECU 30. The battery ECU 36 monitors an electric charge state of the battery 26, and sends a charge-request command to the main ECU 30 when an electric charge amount is short. When the main ECU 30 receives the charge-request command, the main ECU 30 sends, to the motor ECU 34, a command of generating electricity by the electric generator 14 in order to charge the battery 26.

A brake ECU 38 is also connected to the main ECU 30. The vehicle is equipped with a brake operation member (hereinafter, referred to as an "operation member", where appropriate) operated by a driver. The brake ECU 38 determines a target brake force on the basis of at least one of a brake operation amount (hereinafter, referred to as an "operation amount", where appropriate) which is an amount of operation of the operation member and a brake operation force (hereinafter, referred to as an "operation force", where appropriate) which is a force that is applied to the operation member by the driver, and sends the target brake force to the main ECU 30. The main ECU 30 sends the target brake force to the motor ECU 34, and then the motor ECU 34 controls the regenerative brake on the basis of the target brake force and sends, to the main ECU 30, an execution value, that is, a value of the regenerative brake force which is being generated. In the main ECU 30, the regenerative brake force is subtracted from the target brake force, and a target hydraulic brake force which should be generated in a hydraulic brake system 40 provided in the vehicle is determined on the basis of the remainder. The main ECU 30 sends the target hydraulic brake force to the brake ECU 38, and then the brake ECU 38 controls the hydraulic brake system 40 such that a hydraulic brake force generated by the hydraulic brake system 40 becomes equal to the target hydraulic brake force.

<<Structure of Hydraulic Brake System>>

The hydraulic brake system 40 provided in the hybrid vehicle constructed as described above will be described with reference to FIG. 2. In the following description, the terms "forward" and "rearward" are used to indicate the leftward direction and the rightward direction in FIG. 2, respectively. In addition, the terms "front side", "front end", "forward movement", "rear side", "rear end", "rearward movement", etc. are used for similar indication. Incidentally, in the following description, characters enclosed in square brackets [ ] represent sensors etc. in the drawings.

Figure 2:
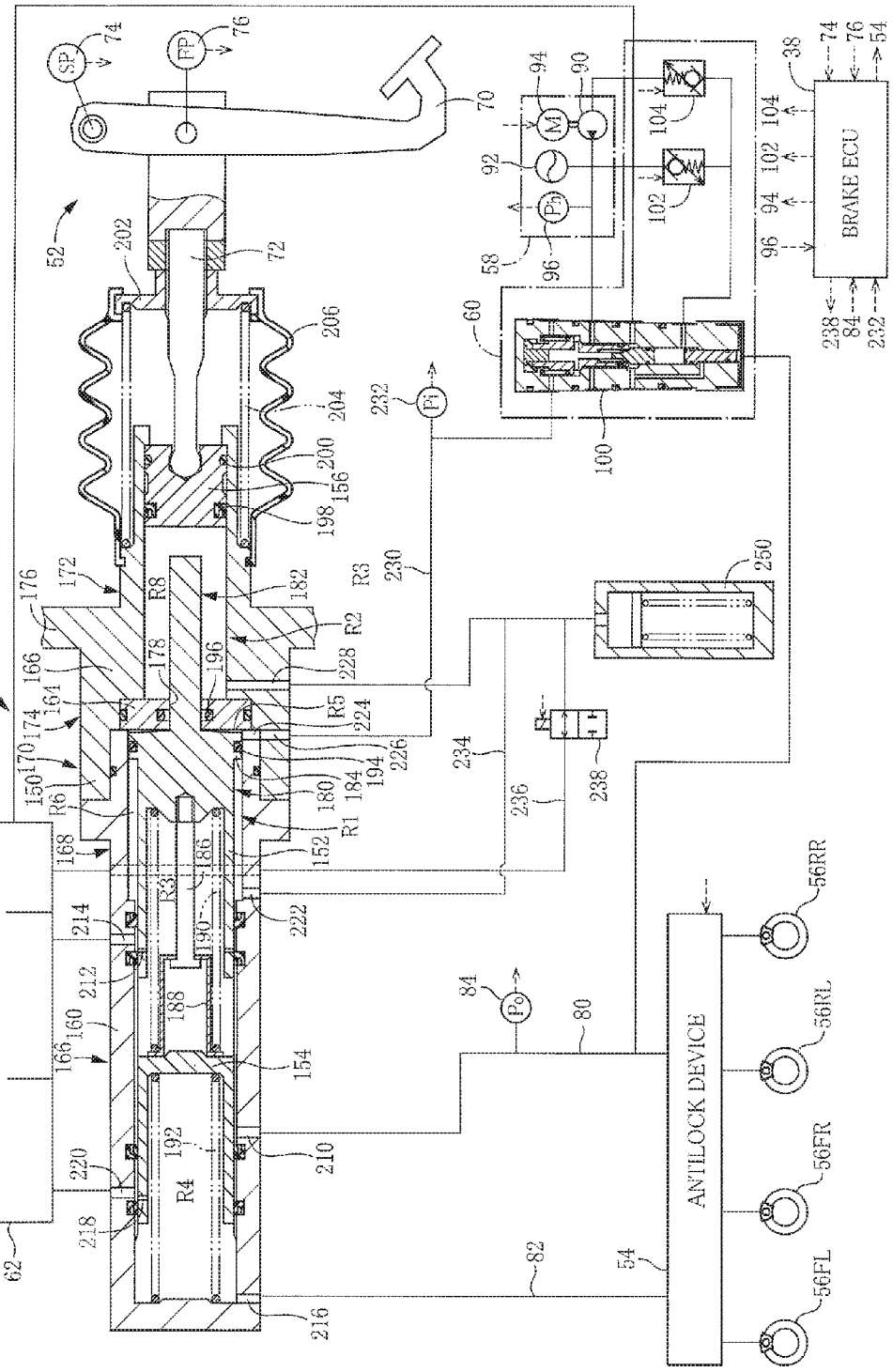
FIG. 2 is a view of a hydraulic brake system including the master cylinder device of a first embodiment.

FIG. 2 schematically represents the hydraulic brake system 40 provided in the vehicle. The hydraulic brake system 40 has a master cylinder device 50 for pressurizing a brake fluid. The driver in the vehicle can actuate the master cylinder device 50 by operating an operation device 52 which is connected to the master cylinder device 50. The master cylinder device 50 pressurizes the brake fluid by its actuation. The pressurized brake fluid is supplied to each of the brake devices 56 provided in the respective wheels via an antilock device 54 connected to the master cylinder device 50. The brake devices 56 generate respective forces for restraining rotations of the wheels 18, namely, hydraulic brake forces, depending on a pressure of the pressurized brake fluid (hereinafter, referred to as a "master pressure", where appropriate).

The hydraulic brake system 40 has, as a high pressure source, a high-pressure-source device 58 for intensifying a pressure of a brake fluid. The high-pressure-source device 58 is connected to the master cylinder device 50 via a pressure-intensifying/reducing device 60. The pressure-intensifying/reducing device 60 is a device which controls the pressure of the brake fluid intensified by the high-pressure-source device 58 (hereinafter, referred to as a "high-pressure-source pressure", where appropriate) to be not higher than the pressure, and which intensifies and reduces the pressure of the brake fluid inputted to the master cylinder device 50. This pressure is referred to as an "input pressure", where appropriate. That is, the input pressure is a pressure obtained by controlling the brake fluid of the high-pressure-source pressure, and may be called a controlled high-pressure-source pressure. The master cylinder device 50 is constructed to be able to be actuated according to the intensification and reduction of the input pressure. The hydraulic brake system 40 has a reservoir 62, as a low pressure source, for storing a brake fluid at the atmospheric pressure. The reservoir 62 is connected to the master cylinder device 50, the pressure-intensifying/reducing device 60, and the high-pressure-source device 58.

The operation device 52 includes a brake pedal 70 as an operation member and an operation rod 72 connected to the brake pedal 70. The brake pedal 70 is pivotably held at an upper end portion thereof on the body of the vehicle. The operation rod 72 is connected at a rear end portion thereof to the brake pedal 70 and at a front end portion thereof to the master cylinder device 50. The operation device 52 also has an operation amount sensor [SP] 74 for detecting the operation amount of the brake pedal 70 and an operation force sensor [FP] 76 for detecting the operation force. The operation amount sensor 74 and the operation force sensor 76 are connected to the brake ECU 38 which determines the target brake force on the basis of values detected by the sensors.

The brake devices 56 are connected to the master cylinder device 50 via fluid passages 80, 82. The fluid passages 80, 82 are fluid passages for supplying, to the brake devices 56, the brake fluid pressurized to the master pressure by the master cylinder device 50. An master pressure sensor $[P_O]$ 84 is provided on the fluid passage 80. Though detailed explanation about the brake devices 56 is abbreviated, each of them includes a brake caliper, a wheel cylinder (brake cylinder) and brake pads which are provided in the brake caliper, and a brake disc which rotates together with the corresponding wheel. Each of the fluid passages 80, 82 is connected to the brake cylinder of each brake device 56. On the way of each of the fluid passages 80, 82, there is provided the antilock device 54. Incidentally, the fluid passage 80 is connected to the brake devices 56RL, 56RR for the rear wheels, and the fluid passage 82 is connected to the brake devices 56FL, 56FR for the front wheels. In each of the brake devices 56, the brake cylinder presses the brake pad onto the brake disk on the basis of the master pressure, and then friction resulting from the press generates the hydraulic brake force for restraining rotation of the corresponding wheel, whereby the vehicle is braked.

The antilock device 54 is a common device and, in short, has four pairs of open/close valves corresponding to the respective wheels. One of the open/close valves of each of the pairs is a pressure-intensifying open/close valve, and is put in an open state, when the corresponding wheel is not locked. The other of them is an pressure-reducing open/close valve, and is put in a close state, when the wheel is not locked. The antilock device 54 is configured such that, when the wheel is locked, the pressure-intensifying open/close valve shuts off a flow of the brake fluid from the master cylinder device 50 to the brake devices 56 and the pressure-reducing open/close valve allows a flow of the brake fluid from the brake devices 56 to the reservoir 62, so as to release the lock of the wheel.

The high-pressure-source device 58 includes a hydraulic pump 90 which suctions the brake fluid from the reservoir 62 and intensifies the pressure of the brake fluid, and an accumulator 92 in which the pressure-intensified brake fluid is stored. Incidentally, the hydraulic pump 90 is driven by an electric motor 94. The high-pressure-source device 58 has a high-pressure-source pressure sensor [Ph] 96 for detecting the pressure of the pressure-intensified brake fluid. The brake ECU 38 monitors a value detected by the high-pressure-source pressure sensor 96, and the hydraulic pump 90 is controlled to be driven on the basis of the detected value. Owing to the control, the high-pressure-source device 58 supplies, to the pressure-intensifying/reducing device 60, the brake fluid having a pressure of a predetermined pressure at all times.

The pressure-intensifying/reducing device 60 includes a pressure adjusting valve device 100 which adjusts the pressure of the brake fluid supplied from the high pressure source device 58 according to a pressure of the brake fluid introduced into the pressure adjusting valve device 100, an electromagnetic pressure-intensifying linear valve 102 connected with the high pressure source device 58, and an electromagnetic pressure-reducing linear valve 104 connected with the reservoir 62. The pressure adjusting valve device 100 is connected to the electromagnetic pressure-intensifying linear valve 102 and the electromagnetic pressure-reducing linear valve 104 within the pressure-intensifying/reducing device 60. The activations of the electromagnetic pressure-reducing linear valve 102 and the electromagnetic pressure-reducing linear valve 104 controls the pressure of the brake fluid from the high pressure source device 58 and supplies it to the pressure adjusting valve device 100. The pressure adjusting valve device 100 is activated according to the pressure of the brake fluid and adjusts the pressure of the brake fluid from the high pressure source device 58, and thus can supply the brake fluid to the master cylinder device 50.

Figure 3:
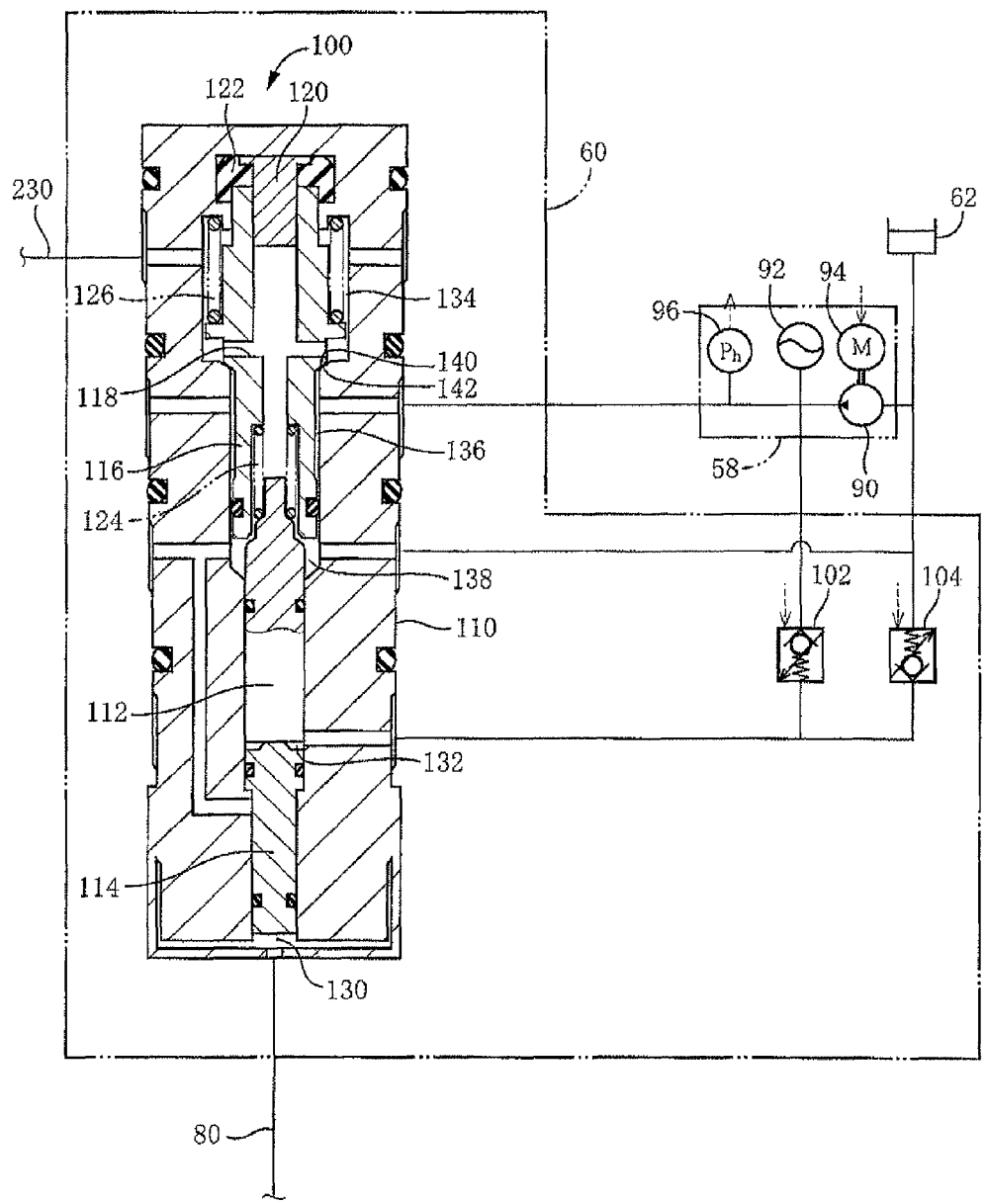
FIG. 3 is a view of a pressure-intensifying/reducing device in the hydraulic brake system illustrated in FIG. 2 for adjusting a pressure of a brake fluid intensified by the high pressure source.

The pressure adjusting valve device 100 has, as illustrated in FIG. 3, a housing 110 whose both ends are closed and which has a hollow cylindrical shape, a first plunger 112 disposed inside the housing 110 and having a solid cylindrical shape, a second plunger 114 disposed below the first plunger 112 and having a solid cylindrical shape, and a pressure adjusting pipe 116 disposed above the first plunger 112 and having a hollow cylindrical shape. These first plunger 112, second plunger 114, and pressure adjusting pipe 116 are slidably fitted in the housing 110, independently. The housing 110 has step faces on the inner circumferential face thereof because the internal diameter thereof is different according to location. The internal diameter is generally larger at a higher location. In addition, the first plunger 112, the second plunger 114, and the pressure adjusting pipe 116 also have respective step faces on their respective outer periphery because the outer diameter of each of them varies according to location. The pressure adjusting pipe 116 has a through hole 118 being through the pressure adjusting pipe 116 in an axis direction and a radial direction, and has respective openings of the through hole 118 at an upper end face, a lower end face, and a side face. On the opening at the lower end face of the pressure adjusting pipe 116, an upper end portion of the first plunger 112 can be seated. On the other hand, a pin 120 supported by an upper end face of the housing 110 is fitted in the opening at the upper end face of the pressure adjusting pipe 116. The pressure adjusting pipe 116 can move relative to the pin 120. In addition, above the pressure adjusting pipe 116, there is provided an annular buffer rubber 122 for preventing the pressure adjusting pipe 116 from coming into an abutting contact with the housing 110. Between the first plunger 112 and the pressure adjusting pipe 116, there is provided a spring 124 being a compression spring, which biases the first plunger 112 and the pressure adjusting pipe 116 to be separated from each other. Between the pressure adjusting pipe 116 and the housing 110, there is provided a spring 126 being a compression spring, which biases the pressure adjusting pipe 116 downward.

Inside the housing 110, there are formed a plurality of fluid chambers by the inner circumferential face and end faces of the housing 110, and outer circumferential faces and end faces of the first plunger 112, the second plunger 114, and the pressure adjusting pipe 116. Specifically, a first fluid chamber 130 is defined between a lower end face of the second plunger 114 and an inner bottom face of the housing 110, and a second fluid chamber 132 is defined between an upper end face of the second plunger and a lower end face of the first plunger 112. The outer diameter of an upper portion of the pressure adjusting pipe 116 is smaller than the inner diameter of the housing 110, whereby a third fluid chamber 134 is defined between the pressure adjusting pipe 116 and the housing 110. The outer diameter of a lower portion of the pressure adjusting pipe 116 is slightly smaller than the inner diameter of the housing 110, whereby a fourth fluid chamber 136 is defined between the pressure adjusting pipe 116 and the housing 110. Moreover, a fifth fluid chamber 138 is defined by an outer circumferential face of an upper portion of the first plunger 112, a lower end face of the pressure adjusting pipe 116, and the inner circumferential face of the housing 110.

These fluid chambers communicate with the exterior through communication holes provided in the housing 110. Specifically, the first fluid chamber 130 is connected to a fluid passage diverging from the fluid passage 80, and thus the brake fluid pressurized by the master cylinder device 50 to the master pressure is supplied to the first fluid chamber 130. The second fluid chamber 132 is connected to the electromagnetic pressure-intensifying linear valve 102 and the electromagnetic pressure-reducing linear valve 104, and thus a brake fluid in the second fluid chamber 132 has the pressure adjusted by the electromagnetic pressure-intensifying linear valve 102 and the electromagnetic pressure-reducing linear valve 104. The fourth fluid chamber 136 is connected to the high pressure source device 58, and thus a brake fluid in the fourth fluid chamber 136 has the high-pressure-source pressure. The fifth fluid chamber 138 is connected to the reservoir 62, and thus a brake fluid in the fifth fluid chamber 138 has the atmospheric pressure. A pressure of a brake fluid in the third fluid chamber 134, as described later, is adjusted by the activation of the pressure adjusting valve device 100. In addition, the third fluid chamber 134 is connected to the master cylinder device 50, and thus the pressure-adjusted brake fluid is inputted into the master cylinder device 50. In other words, the pressure of the brake fluid in the third fluid chamber 134 is the input pressure for the master cylinder device 50.

The pressure of the brake fluid in the third fluid chamber 134 is normally adjusted according to the pressure of the brake fluid supplied to the second fluid chamber 132 (hereinafter, referred to as a "controlling fluid pressure", where appropriate). The controlling fluid pressure is intensified or reduced by controlling the electricity supplied to the electromagnetic pressure-intensifying linear valve 102 and the electromagnetic pressure-reducing linear valve 104. When the electricity is not supplied to the electromagnetic pressure-intensifying linear valve 102 and the electromagnetic pressure-reducing linear valve 104, the electromagnetic pressure-intensifying linear valve 102 is closed and the electromagnetic pressure-reducing linear valve 104 is opened, and thus the controlling fluid pressure becomes the atmospheric pressure. When the maximum electric current in a predetermined range is supplied to the electromagnetic pressure-reducing linear valve 104 and an electricity supplied to the electromagnetic pressure-intensifying linear valve 102 is controlled, a valve opening pressure of the electromagnetic pressure-intensifying linear valve 102 is controlled with the electromagnetic pressure-reducing linear valve 104 being closed. In this control, the controlling fluid pressure is increased as the electricity supplied to the electromagnetic pressure-intensifying linear valve 102 is increased. On the other hand, when the electricity is not supplied to the electromagnetic pressure-intensifying linear valve 102 and the electricity to the electromagnetic pressure-reducing linear valve 104 is controlled, a valve opening pressure of the electromagnetic pressure-reducing linear valve 104 is controlled with the electromagnetic pressure-intensifying linear valve 102 being closed. In this control, the controlling fluid pressure is reduced as the electricity supplied to the electromagnetic pressure-reducing linear valve 104 is reduced.

The increase of the controlling fluid pressure, as described above, causes the first plunger 112 to move upward against an elastic force of the coil spring 124 so as to be seated on the opening of the through hole 118 at the lower end of the pressure adjusting pipe 116. This opening is referred to as a "fifth-fluid-chamber side opening", where appropriate. Further upward movement of the first plunger 112 causes the pressure adjusting pipe 116 to move upward, thereby separating a step face 140 on the outer circumferential face of the pressure adjusting pipe 116 from the step face formed on an inner periphery portion of the housing 110. Therefore, a flow of the brake fluid from the fourth fluid chamber 136 to the third fluid chamber 134 is allowed, whereby a pressure of the third fluid chamber increases. In addition, the reduction of the controlling fluid pressure causes the step face 140 of the pressure adjusting pipe 116 to be seated on the step face 142 of the housing 110 with the first plunger 112 being seated on the fifth-fluid-chamber side opening. Further reduction of the controlling fluid pressure causes the first plunger to separate from the fifth-fluid-chamber side opening, whereby the third fluid chamber 134 is communicated with the reservoir 62 via the fifth fluid chamber 138. That is, the pressure-intensifying/reducing device 60 is a pressure adjusting device in which the electromagnetic pressure-intensifying linear valve 102 and the electromagnetic pressure-reducing linear valve 104 are controlled to reduce the pressure of the brake fluid supplied from the high pressure source device to a pressure according to the control, and which supplies the pressure-reduced brake fluid to the master cylinder device 50.

In addition, the pressure adjusting valve device 100 is configured so as to be able to intensify or reduce the brake fluid in the third fluid chamber 134 depending on a pressure of the brake fluid in the first fluid chamber 130, that is, the master pressure generated by the actuation of the master cylinder device 50 in a condition in which the electromagnetic pressure-intensifying linear valve 102 and the electromagnetic pressure-reducing linear valve 104 are not supplied with the electricity. Accordingly, as the pressure of the brake fluid in the first fluid chamber 130 increases, the second plunger 114 moves upward, whereby the first plunger 112 is moved upward too. Also, as the pressure of the brake fluid in the first fluid chamber 130 reduces, the second plunger 114 moves downward, whereby the first plunger 112 moves downward too. Therefore, as described above, the pressure of the brake fluid in the third fluid chamber 134 is increased and reduced in association with the increase and reduction of the pressure of the brake fluid in the first fluid chamber 130. That is, the pressure adjusting valve device 100 can be activated by utilizing the above master pressure as a pilot pressure, and has a pilot-pressure-dependent pressure reducing mechanism for reducing the pressure of the brake fluid supplied from the high pressure source device to a pressure according to the pilot pressure.

<<Structure of Master Cylinder Device>>

The master cylinder device 50 is categorized into the Input Piston Free Type Master Cylinder Device, and has a housing 150 being a casing, a first pressurizing piston 152 and a second pressurizing piston 154 which pressurize the brake fluid to be supplied to the brake devices 56, and an input piston 156 to which an operation of the driver is inputted via the operation device 52. FIG. 2 shows a state in which the master cylinder device 50 is not actuated, that is, a brake operation is not performed. It is noted that each of all figures of master cylinder devices of embodiments described in the following shows a state in which a brake operation is not carried out.

The housing 150 mainly includes three members, specifically, a first housing member 160, a second housing member 162, and a third housing member 164. The first housing member 160 has a roughly hollow cylindrical shape whose front end is closed. The first housing member 160 is sectioned into two portions having mutually different inner diameters, specifically, a front small-diameter portion 166 arranged in a front side and having a small inner diameter, and a rear large-diameter portion 168 arranged in a rear side and having a large inner diameter. The second housing member 162 has a roughly hollow cylindrical shape, and is sectioned into three portions having mutually different inner diameters, specifically, a front large-diameter portion 170 arranged in a front side and having a large inner diameter, a rear small-diameter portion 172 arranged in a rear side and having a small inner diameter, and an intermediate portion 174 arranged between the above two portions and having an inner diameter of a medium size between the above two inner diameters. The second housing member 162 is united with the first housing member 160 by that a rear end portion of the rear large-diameter portion 168 of the first housing member 160 is inserted into an interior of the front large-diameter portion 170. By the way, the second housing member 162 has a flange 176 on an outer periphery thereof, and the master cylinder device 50 is fixed on a vehicle body at the flange 176. Between a rear end face of the first housing member 160 and a step face formed between the rear small-diameter portion 172 and intermediate portion 174 of the second housing member 162, there is interposed the third housing member 164 having a disk shape. In the center of the third housing member 164, there is provided a through hole 178. Therefore, an interior of the housing 150 constructed above is separated by the third housing member 164 into a front side chamber R1 located in a front side and a rear side chamber R2 located in a rear side. That is, the third housing member 164 serves as a partition portion separating the interior of the housing 150, and the through hole 178 serves as an opening of the partition portion.

The second pressurizing piston 154 has a hollow cylindrical shape whose rear end portion is closed, and is slidably fitted with seals in the front small-diameter portion 166 of the first housing member 160 in the front side chamber R1. The first pressurizing piston 152 includes a main body portion 180 located in the front side chamber R1 and having a hollow cylindrical shape whose rear end portion is closed, and an extension portion 182 extending from a rear end portion of the main body portion 180 through the through hole 178 into the rear side chamber R2. Additionally, on an outer periphery of a bottom portion of the main body portion 180, there is provided a flange 184. The first pressurizing piston 152 is fitted with seals in the housing 150 such that a front portion of the main body portion 180 slidably contacts with the front small-diameter portion 166 of the first housing member 160, the flange 184 slidably contacts with the rear large-diameter portion 168 of the first housing member 160, and the extension portion 182 slidably contacts with the through hole 178 of the third housing member 164.

In front of the first pressurizing piston 152 and between the first pressurizing piston 152 and the second pressurizing piston 154, there is defined a first pressurizing chamber R3 in which the brake fluid is pressurized to be supplied to the brake devices 56RL, RR provided in the two rear wheels. And in front of the second pressurizing piston 154, there is defined a second pressurizing chamber R4 in which the brake fluid is pressurized to be supplied to the brake devices 56FL, FR provided in the two front wheels. Incidentally, a headed pin 186 is screwed vertically on a bottom portion of a blind hole being open forward, and a pin-retaining tube 188 is fixed on a rear end face of the second pressurizing piston 154. These headed pin 186 and pin-retaining tube 188 limits a distance in which the first pressurizing piston 302 and the second pressurizing piston 304 separate from each other to be within a predetermined rang. In the first pressurizing chamber R3 and the second pressurizing chamber R4, compression coil springs (hereinafter, referred to as a "return springs", where appropriate) 190, 192 are disposed, respectively. Those springs bias the first pressurizing piston 152 and the second pressurizing piston 154 in directions that the pistons 152, 154 separate away from each other and bias the pistons 152, 154 rearward. Incidentally, a rearward movement of the first pressurizing piston 152 is limited by that the rear end portion comes into abutting contact with a front end face of the third housing member 164. The input piston 156 has a shape roughly like a cylinder and is located in the rear side chamber R2. Specifically, the input piston 156 is fitted, behind the extension portion 182 of the first pressurizing piston 152, in the rear small-diameter portion 172 of the second housing member 162 with seals.

In the master cylinder device 50 constructed thus, between the main body portion 180 of the first pressurizing portion 152 and the third housing member 164, there is defined a fluid chamber R5 into which the brake fluid from the high pressure source device 58 is inputted. This fluid chamber R5 is referred to as an "input chamber", where appropriate. It is noted that the input chamber R5 is illustrated in an almost squeezed state in FIG. 2. Additionally, between an inner circumferential face of the rear large-diameter portion 168 of the first housing member 160 in front of the flange 184 and an outer circumferential face of the main body portion 180 of the first pressurizing piston 152, there is defined an annular fluid chamber R6 opposing the input chamber R5 with the flange 184 being interposed between the annular fluid chamber R6 and the input chamber R5. Hereinafter, this annular fluid chamber is referred to as an "opposing chamber", where appropriate. Between a rear end face of the extension portion 182 of the first pressurizing piston 152 and a front end face of the input piston 152, there is provided a space having a certain size in no brake operation. In a space around the extension portion 182 including the above space, there is defined an inter-piston chamber R8. Additionally, in the first pressurizing piston 152, a pressurized area on which a pressure of a brake fluid in the inter-piston chamber R8 acts to generate a forward bias force in the first pressurizing piston 152, namely, an area of the rear end face of the extension portion 182, and a pressurized area on which a pressure of a brake fluid in the opposing chamber R6 acts to generate a rearward bias force in the first pressurizing piston 152, namely, an area of the front end face of the flange 184 are equal.

In the master cylinder device 50 in which each of the chambers is defined thus, the input chamber R5 is defined by that the first pressurizing piston 152 contacts with an inner circumferential face of the rear large-diameter portion 168 of the first housing member 160 via a seal 194 embedded in an outer circumferential face of the flange 184 and contacts with an inner circumferential face defining the through hole 178 of the third housing member 164 via a seal 196 embedded in the inner circumferential face defining the through hole 178. By the way, the input piston 156 slidably contacts with an inner circumferential face of the second housing member 162, and seals 198, 200 are embedded in an outer circumferential face of the input piston 156. It is noted that a high-pressure seal is employed as each of the seals 194, 196 but not employed as each of the seals 198, 200.

A front end portion of the operation rod 72 is connected to a rear end portion of the input piston 156 so as to transmit, to the input piston 156, the operation force applied to the brake pedal 70 and so as to move the input piston 156 forward and rearward in accordance with the operation amount of the brake pedal 70. Incidentally, the rearward movement of the input piston 156 is limited by that it is stopped by a rear end portion of the second housing member 162. In addition, a spring seat 202 shaped like a disc is fixed to the operation rod 72, and a compression coil spring (hereinafter, referred to as a "return spring", where appropriate) 204 is disposed between a spring seat 202 and the second housing member 162. The return spring 204 biases the operation rod 72 rearward. Incidentally, a boot 206 is bridged between the spring seat 202 and the housing 150, whereby a rear side portion of the master cylinder device 50 is protected from dust.

The first pressurizing chamber R3 communicates, through a communication hole 210 provided in the first housing member 160, with the fluid passage 80 connected to the antilock device 54, and can communicate, through a communication hole 212 provided in the first pressurizing piston 152 and a communication hole 214 provided in the first housing member 160, with the reservoir 62. On the other hand, the second pressurizing chamber R4 communicates, through a communication hole 216 provided in the first housing member 160, with the fluid passage 82 connected to the antilock device 54, and can communicate, through a communication hole 218 provided in the second pressurizing piston 154 and a communication hole 220 provided in the first housing member 160, with the reservoir 62.

In the first housing member 160, there is provided a communication hole 222 whose one end is open to the opposing chamber R6 and whose other end is open to the exterior. In addition, in the first housing member 160, there is provided a communication hole 224 whose one end is open to the input chamber R5, and, in the second housing member 162, there is provided a communication hole 226 whose one end is open so as to face the other end of the communication hole 224 and whose other end is open to the exterior. That is, the input chamber R5 communicates with the exterior through the communication holes 224, 226. Moreover, in the first housing member 160, there is provided a communication hole 228 whose one end is open to the inter-piston chamber R8 and whose other end is open to the exterior.

In the master cylinder device 50 in which the communication holes are formed thus, to the communication hole 226, an input pressure passage 230 whose one end is connected to the pressure-intensifying/reducing device 60, specifically, the third fluid chamber 134 of the pressure adjusting valve device 100 is connected at the other end thereof. Therefore, the brake fluid whose pressure is adjusted by the pressure adjusting valve device 100 is inputted into the input chamber R5. In addition, on the input pressure passage 230, there is provided an input pressure sensor [Pi] 232 for detecting a pressure of a brake fluid in the input chamber R5.

Moreover, one end of an external communication passage 234 is connected to the communication hole 222, and the other end thereof is connected to the communication hole 228. Therefore, in the master cylinder device 50, the communication holes 222, 228, and the external communication passage 234 constitute an inter-chamber communication passage which allows a communication between the opposing chamber R6 and the inter-piston chamber R8. Further, a low pressure passage 236 communicating with the reservoir 62 being a low pressure source diverges from the external communication passage 234, and an electromagnetic open/close valve 238 is provided on the low pressure passage 236. Therefore, the opposing chamber R6 and the inter-piston chamber R8 can communicate with the reservoir 62, thus a mechanism including the open/close valve 238, the external communication passage 234, and the low pressure passage 236 constitutes a low-pressure-source communication mechanism for the opposing and inter-piston chambers which allows the opposing chamber R6 and the inter-piston chamber R8 to communicate with the reservoir 62. Incidentally, the open/close valve 238 is a normally-opened valve which opens in a de-energized state.

Figure 4:
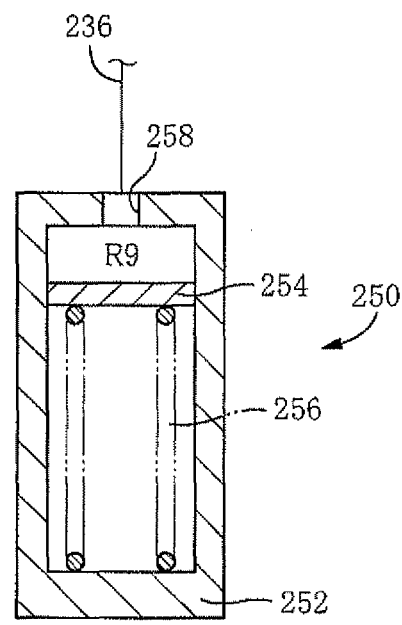
FIG. 4 is a view of a reaction force applying mechanism employed in the master cylinder device illustrated in FIG. 2.

In the low pressure passage 236, there is provided a reaction force generating device 250 into/from which the brake fluid flows from/into the master cylinder device 50. FIG. 4 is a cross-sectional view of the reaction force generating device 250. The reaction force generating device 250 includes a housing 252 being a casing, and a piston 254 and a compression coil spring 256 which are disposed in the housing 252. The housing 252 has a hollow cylindrical shape whose both ends are closed. The piston 254 has a disk shape and is disposed so as to be able to slidably contact with an inner circumferential face of the housing 252. The spring 256 is supported at one end thereof by an inner bottom face of the housing 252 and at the other end thereof by an end face of the piston 254. Therefore, the piston 254 is elastically supported by the housing 252 owing to the spring 256. In an interior of the housing 252, there is defined a fluid storage chamber R9 by the other end face of the piston 254 and the housing 252. Additionally, in the housing 252, there is provided a communication hole 228 whose one end is open to the fluid storage chamber R9. To the other end of the communication hole 228, a fluid passage diverging from the low pressure passage 236 at between the end thereof connected to the external communication passage 234 and the open/close valve 238 is connected. Therefore, the fluid storage chamber R9 communicates with the opposing chamber R6 and the inter-piston chamber R8. Accordingly, as a total volume of the opposing chamber R6 and the inter-piston chamber R8 decreases, a volume of the fluid storage chamber R9 increases according to the decrease and the spring 256 generates an elastic reaction force according to the amount of the increase. That is, a mechanism including the spring 256 is an elastic-reaction-force applying mechanism for the fluid storage chamber which applies an elastic reaction force with a magnitude according to the amount of the increase of the volume of the fluid storage chamber R9 to a brake fluid in the fluid storage chamber R9.

By the way, the reaction force generating device 250 employed in the master cylinder device 50 may be a so-called diaphragm type. That is, a reaction force generating device in which the fluid storage chamber R9 is defined by a diaphragm as an alternative of the piston 254 and the brake fluid is pressurized by a pressure of a gas in a gas chamber provided with the diaphragm being interposed between the fluid storage chamber R9 and the gas chamber may be employed.

<<Actuation of Hydraulic Brake System>>

Actuation of the hydraulic brake system 40 will be described below. In a normal condition, that is, in a condition in which the hydraulic brake system 40 can be actuated normally, as described above, when the target brake force becomes larger than the regenerative brake force by the regenerative brake, a surplus of the target brake force being above the regenerative brake force is determined as the target hydraulic brake force. In the pressure-intensifying/reducing device 60, the pressure of the brake fluid from the high pressure source device 58 is adjusted according to the target hydraulic brake force, and then the pressure-adjusted brake fluid is introduced into the input chamber R5. The first pressurizing piston 152 moves forward depending on the pressure of the brake fluid in the input chamber R5 so as to pressurize the brake fluid in the first pressurizing chamber R3. The second pressurizing piston 154 also moves forward depending on the pressure of the brake fluid in the first pressurizing chamber R3 so as to pressurize the brake fluid in the second pressurizing chamber R4. The pressurized brake fluid is supplied via the antilock device 54 to each of the brake devices 56, which then generates the hydraulic brake force. Incidentally, the brake ECU 38 monitors a detected value of the input pressure sensor 232, and the pressure-intensifying/reducing device 60 is controlled so that the input pressure is controlled to be a pressure according to the target hydraulic brake force.

The pressure of the brake fluid in the opposing chamber R6 acts on the front end face of the flange 184, therefore the rearward bias force is applied to the first pressurizing piston 152. Additionally, the pressure of the brake fluid in the inter-piston chamber R8 acts on the rear end face of the extension portion 182 of the first pressurizing piston 152, therefore the forward bias force is applied to the first pressurizing piston 152. As described above, in the first pressurizing piston 152, since the pressurized area on which the pressure of the brake fluid in the opposing chamber R6 acts and the pressurized area on which the pressure of a brake fluid in the inter-piston chamber R8 acts are equal, the forward bias force and the rearward bias force become equal. Consequently, the first pressurizing piston 152 is moved depending on not the pressure of the brake fluid in the opposing chamber R6 and the pressure of the brake fluid in the inter-piston chamber R8 but the pressure of the brake fluid in the input chamber R5.

In the first pressurizing piston 152, as described above, the two pressurized areas are equal. Therefore, a volume decrease amount of one of the opposing chamber R6 and the inter-piston chamber R8 and a volume increase amount of the other of them which associate with a movement of the first pressurizing piston 152 become equal. As a result, when the first pressurizing piston 152 moves, the brake fluid flows between the opposing chamber R6 and the inter-piston chamber R8 while each volume of the chambers changes. That is, even though the first pressurizing piston 152 moves, the total volume of the opposing chamber R6 and the inter-piston chamber R8 does not change, and each of the pressures of the brake fluids in the opposing chamber R6, the inter-piston chamber R8, and the fluid storage chamber R9 does not change. Therefore, even when the first pressurizing piston 152 moves depending on the pressure of the brake fluid in the input chamber R5, this movement does not cause any movement of the input piston 156. That is, the master cylinder device 50 is configured such that the first pressurizing piston 152 and the input piston 156 can move independently from each other in the normal condition. Accordingly, in the master cylinder device 50, a "high-pressure-source-pressure dependent pressurizing state", that is, a state in which the brake fluid supplied to the brake devices 56 can be pressurized depending on the pressure of the brake fluid introduced from the high pressure source device 58 is realized in the normal condition. So to speak, in the master cylinder device 50, the high-pressure-source-pressure dependent pressurizing state is realized with the input piston 156 being able to move freely relative to the first pressurizing piston 152.

Additionally, in the normal condition, when the input piston 156 moves forward relative to the first pressurizing piston 152 in accordance with an increase of the operation amount of the brake pedal 70 by the driver, the brake fluid in the inter-piston chamber R8 flows out, thus the total volume of the opposing chamber R6 and the inter-piston chamber R8 decreases. In the normal condition, since the open/close valve 238 is energized to be closed, the above outflowed brake fluid flows into the fluid storage chamber R9 of the reaction force generating device 250, thus the volume of the fluid storage chamber R9 increases. Therefore, the elastic reaction force of the spring 256 increases, each of the pressures of the brake fluids in the opposing chamber R6, the inter-piston chamber R8, and the fluid storage chamber R9 increases.

Additionally, the above pressure of the brake fluid in the inter-piston chamber R8 acts on the front end face of the input piston 156, therefore a rearward bias force is applied to the input piston 156. Since this rearward bias force is transmitted via the input piston 156 to the brake pedal 70, the driver can feel the bias force as the operation reaction force against a brake operation by the driver. In addition, since the pressure of the brake fluid in the inter-piston chamber R8, as described above, increases according to the forward movement of the input piston 156, the driver can feel that the operation reaction force increases according to the increase of the brake operation amount by the driver irrespective of the pressures of the brake fluids in the pressurizing chambers R3, R4, namely, the actual hydraulic brake force. That is, it is considered that a stroke simulator which allows a brake operation by the driver while generating the reaction force in accordance with the operation is constructed.

When, in realization of high-pressure-source-pressure dependent pressurizing state, a large hydraulic brake force is required, such as an emergency brake (hereinafter, referred to as a "large-brake-force-required condition", where appropriate), the open/close valve 238 is de-energized to be opened in the hydraulic brake system 40. Consequently, the opposing chamber R6 and the inter-piston chamber R8 communicate with the reservoir 62 via the external communication passage 234 and the low pressure passage 236, and the fluid storage chamber R9 of the reaction force generating device 250 also communicates with the reservoir 62. Therefore, the input piston 156 can move forward with the brake fluids in the inter-piston chamber R8 and the opposing chamber R6 being flowed into the reservoir 62, thereby coming into an abutting contact with the extension portion 182 of the first pressurizing piston 152. Upon this forward movement, since the operation reaction force by the reaction force generating device 250 does not generate, it is allowed that the input piston 156 easily comes into an abutting contact with the first pressurizing piston 152. Therefore, since the brake operation force by the driver is transmitted from the input piston 156 to the first pressurizing piston 152, it becomes possible to pressurize the brake fluids in the pressurizing chambers R3, R4 depending on not only the pressure of the brake fluid from the high pressure source device 58 but also the operation force. Accordingly, in the master cylinder device 50, an "operation-force/high-pressure-source-pressure dependent pressurizing state", that is, a state in which the brake fluid supplied to the brake devices 56 can be pressurized depending on not only the pressure of the brake fluid introduced from the high pressure source device 58 but also the operation force is realized in the large-brake-force-required condition. Therefore, the first pressurizing piston 156 can be considered a pressure receiving piston which pressurizes the brake fluid to be supplied to the brake devices 56 by receiving the operation force and the pressure of the brake fluid supplied to the input chamber R5. Incidentally, in the operation-force/high-pressure-source-pressure dependent pressurizing state, since the pressure of the brake fluids in the pressurizing chambers R3, R4 is transmitted to the input piston 310, the driver can feel the rearward bias force generated by the pressure as the operation reaction force.

By the way, a determination whether the hydraulic brake system 40 is in the above large-brake-force-required condition or not is carried out by a comparison of the above target hydraulic brake force with the maximum hydraulic brake force in the high-pressure-source-pressure dependent pressurizing state, that is, a hydraulic brake force in a case in which the input pressure is fairly equal to the high-pressure-source pressure. That is, when the target hydraulic brake force becomes larger than the maximum hydraulic brake force, a switch from the high-pressure-source-pressure dependent pressurizing state to the operation-force/high-pressure-source-pressure dependent pressurizing state is performed. Therefore, in the hydraulic brake system 40, the brake ECU 38 determines whether the large hydraulic brake force is required or not, depending on the detected value of the high-pressure-source pressure 96 and the detected value of the input pressure sensor 232. Additionally, in consideration of a margin for performing the switch smoothly, the brake ECU 38 is configured to output a command for opening the open/close valve 238 when the input pressure becomes higher than a set pressure determined to be slightly lower than the high-pressure-source pressure. As for a switch from the operation-force/high-pressure-source-pressure dependent pressurizing state to the high-pressure-source-pressure dependent pressurizing state, the brake ECU 38 is configured to output a command for closing the open/close valve 238 when the input pressure becomes lower than the set pressure.

Incidentally, the hydraulic brake system 40 may utilize, as a parameter for determining whether the large hydraulic brake force is required or not, the master pressure, the brake operation amount, the brake operation force, a vehicle speed, or so on. That is, when the master pressure is high or the brake operation force is large, it is possible to determine, based on the fact, that the required hydraulic brake force is large. In the case of the brake operation amount, it is possible to calculate, by utilizing its variation, an operation speed of the brake pedal 70, and then to determine an emergency brake etc. In the case of the vehicle speed, it is possible to calculate, by utilizing its variation, a deceleration of the vehicle, and then to determine an emergency brake etc.

Next, it will be described how the master cylinder device 50 is actuated in a condition in which electric power is not supplied to the hydraulic brake system 40 due to an electric failure. In the electric failure condition, the hydraulic pump 90 of the high pressure source device 60 cannot work and the pressure-intensifying linear valve 102 and the pressure-reducing linear valve 104 cannot be activated. Additionally, the open/close valve 238 is de-energized to be opened. Therefore, as in the operation-force/high-pressure-source-pressure dependent pressurizing state, the first pressurizing piston 152 can move forward depending on the operation force. Accordingly, in the master cylinder device 50, an "operation-force dependent pressurizing state", that is, a state in which the brake fluid supplied to the brake devices 56 can be pressurized depending on only the operation force is realized.

It is noted that the pressure adjusting valve device 100 can be still activated by using the above pilot-pressure-dependent pressure reducing mechanism. Therefore, when the pressure-intensified brake fluid is stored in the accumulator 92 immediately after an occurrence of an electric failure, the pressure adjusting valve device 100 can adjust the pressure of the brake fluid, and then the pressure-adjusted brake fluid is introduced into the input chamber R5. Accordingly, even in the electric failure condition, the operation-force/high-pressure-source-pressure dependent pressurizing state can be realized, and the brake fluids in the pressurizing chambers R3, R4 can be pressurized depending on not only the operation force. Therefore, in the pressure adjusting valve device 100, where a mechanism including the pressure-intensifying linear valve 102 and the pressure-reducing linear valve 104 is considered to be a main pressure reducing mechanism of the pressure adjusting valve device 100, that is, a main pressure reducing mechanism for reducing the pressure of the brake fluid supplied from the high pressure source device 58, the pilot-pressure-dependent pressure reducing mechanism can be considered to be an auxiliary pressure reducing mechanism.

In the master cylinder device 50, the input piston 156 is not fitted to the first pressurizing piston 152 with any seal. Therefore, even when the first pressurizing piston 152 is moved by the pressure of the brake fluid in the input chamber R5, no force resulting from any friction force of any seal acts on the input piston 156. Therefore, since a movement of the first pressurizing piston 152 does not pull the input piston 156 and the brake pedal 70 and thus does not cause the input piston 156 and the brake pedal 70 to be moved, operational feeling in a brake operation is excellent.

In addition, as described above, a high-pressure seal is employed as each of the seals 194, 196, whereby the master cylinder device 50 is constructed not to cause a leak of the brake fluid in the input chamber R5 even in a condition in which the pressure of the brake fluid becomes considerably high in the large-brake-force-required condition etc. Therefore, the seals 194, 196 result in generating a comparatively large friction force upon a movement of the first pressurizing piston 152. On the other hand, since both of the seals 198, 200 between the input piston 156 and the housing 150 are not high-pressure seals, each of them causes a comparatively small friction force upon a movement of the input piston 156. Therefore, in the master cylinder device 50, a resistance upon a movement of the input piston 156 is comparatively small, whereby operational feeling in a brake operation is excellent. Especially in the operation-force dependent pressurizing state, it is possible to provide excellent operational feeling.

Second Embodiment

Figure 5:
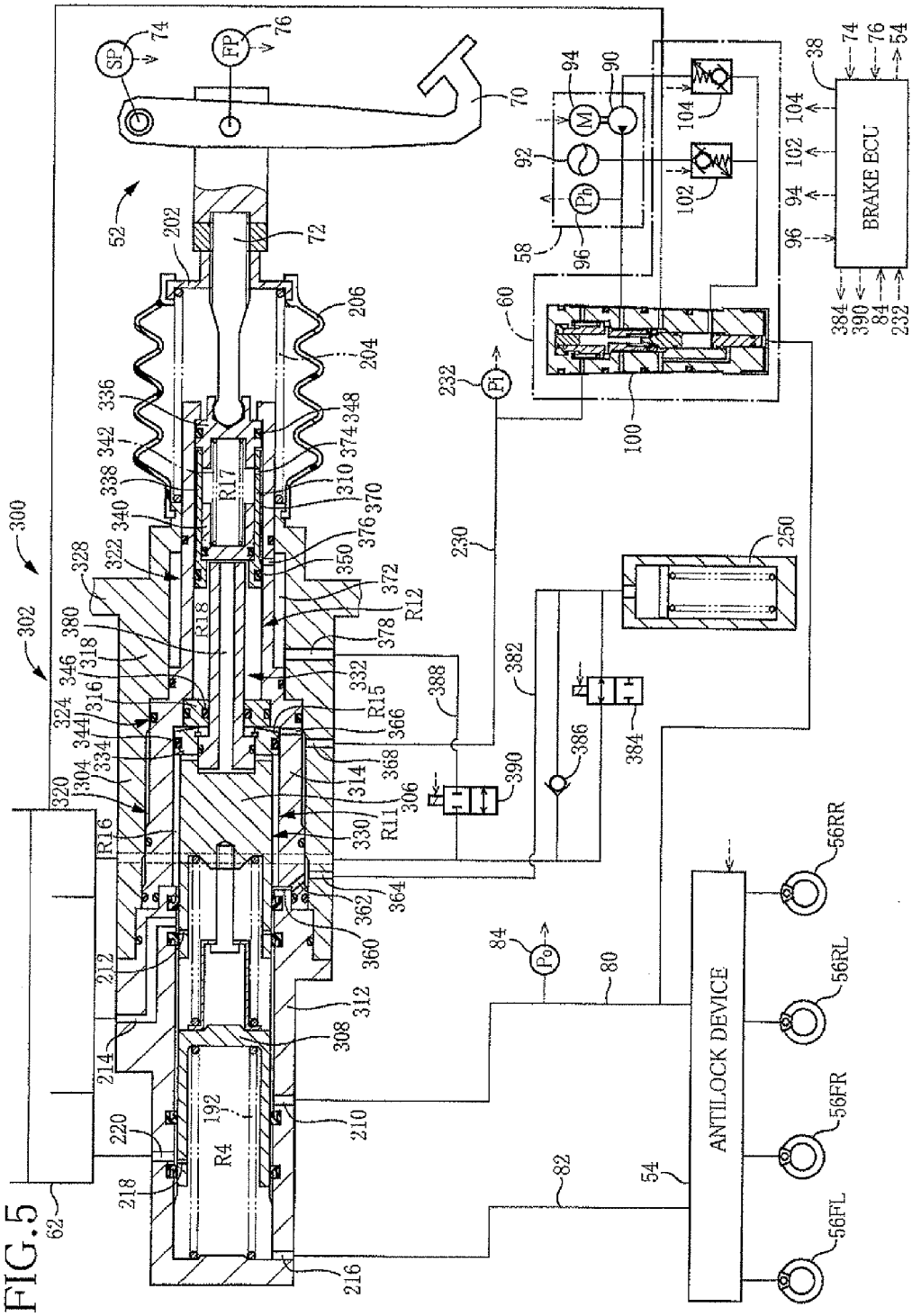
FIG. 5 is a view of a hydraulic brake system including the master cylinder device of a second embodiment.

FIG. 5 schematically represents a hydraulic brake system 300 of the second embodiment. The hydraulic brake system 300 has a master cylinder device 302. The hydraulic brake system 300 generally has the same structure as the hydraulic brake system 40 of the first embodiment. In the following description, with consideration for abbreviating the explanation, different construction and actuation from the hydraulic brake system 40 of the first embodiment will be described but the same construction and actuation as the hydraulic brake system 40 of the first embodiment are omitted.

<<Structure of Master Cylinder Device>>

The master cylinder device 302 is categorized into the Input Piston Free Type Master Cylinder Device, and has a housing 304 being a casing, a first pressurizing piston 306 and a second pressurizing piston 308 which pressurize the brake fluid to be supplied to the brake devices 56, and an input piston 310 to which an operation of the driver is inputted via the operation device 52.

The housing 304 mainly includes four members, specifically, a first housing member 312, a second housing member 314, a third housing member 316, and a fourth housing member 318, and has a roughly hollow cylindrical shape whose front end is closed. Among these housing members, the second housing member 314 has a roughly hollow cylindrical shape, and is sectioned into three portions having mutually different inner diameters, specifically, a front large-diameter portion 320 arranged in a front side and having a large inner diameter, a rear small-diameter portion 322 arranged in a rear side and having a small inner diameter, and an intermediate portion 324 arranged between the above two portions and having an inner diameter of a medium size between the above two inner diameters. In the intermediate portion 324 of the second housing member 314, there is fitted a third housing member 316 having a disk shape and provided with a through hole 326 in the center thereof. An interior of the housing 304 constructed thus is separated by the third housing member 316 to define a front side chamber R11 located in a front side and a rear side chamber R12 located in a rear side. That is, the third housing member 316 serves as a partition portion separating the interior of the housing 304, and the through hole 326 serves as an opening of the partition portion.

The second pressurizing piston 308 has a hollow cylindrical shape whose rear end portion is closed, and is slidably fitted with seals in the first housing member 312 in the front side chamber R11. The first pressurizing piston 306 includes a main body portion 330 located in the front side chamber R11 and having a hollow cylindrical shape whose rear end portion is closed, and an extension portion 332 fixed in a rear end portion of the main body portion 330 and extending through the through hole 326 into the rear side chamber R12. Additionally, on an outer periphery of a bottom portion of the main body portion 330, there is provided a flange 334. The first pressurizing piston 306 is fitted in the housing 304 with seals such that a front portion of the main body portion 330 slidably contacts with the first housing member 312, the flange 334 slidably contacts with the rear large-diameter portion 320 of the second housing member 312, and the extension portion 332 slidably contacts with the through hole 326 of the third housing member 316.

The input piston 310 is disposed in the rear side chamber R12 and is fitted, behind the extension portion 332 of the first pressurizing piston 306, in the rear small-diameter portion 322 of the second housing member 314. The input piston 310 includes a base end portion 336 to which the operation rod 72 is connected, a guide portion 338 having a hollow cylindrical shape and extending forward from the base end portion 336, and a movable portion 340 slidably contacting with an inside of the guide portion 338. In the input piston 310, a rearward movement of the movable portion 340 relative to the base end portion 336, in other words, a shrink of the input piston 310 is allowed. Additionally, between the base end portion 336 and the movable portion 340, there is disposed a compression coil spring 342 which generates an elastic reaction force for separating the base end portion 336 and the movable portion 340 from each other. Incidentally, an inner flange is provided on an inner periphery of a front end portion of the guide portion 338, and the inner flange prevents the movable portion 340 from coming out forward from the guide portion 338. An inner diameter of the guide portion 338 is larger than an outer diameter of the extension portion 332 of the first pressurizing piston 306, and the first pressurizing piston 306 and the input piston 310 are disposed such that a rear end of the extension portion 332 is inserted into the inside of the guide portion 338. That is, a part of the first pressurizing piston 306 and the part of the input piston 310 overlap with each other in the front-back direction.

In the master cylinder device 302 constructed thus, between the main body portion 330 of the first pressurizing portion 306 and the third housing member 316, there is defined a fluid chamber R15 into which the brake fluid from the high pressure source device 58 is inputted. This fluid chamber R15 is referred to as an "input chamber", where appropriate. Additionally, between an inner circumferential face of the second housing member 314 in front of the flange 334 and an outer circumferential face of the first pressurizing piston 306, there is defined an annular fluid chamber R16 opposing the input chamber R15 with the flange 334 being interposed between the opposing chamber R16 and the input chamber R15. Hereinafter, this chamber is referred to as an "opposing chamber", where appropriate. Moreover, inside the input piston 310, there is defined a fluid chamber (hereinafter, referred to as an "internal chamber", where appropriate) R17 between the base end portion 336 and the movable portion 340. Furthermore, between a rear end face of the extension portion 332 of the first pressurizing piston 306 and a front end face of the movable portion 340 of the input piston 310, there is provided a clearance which is small in no brake operation. In a space around the extension portion 332 including the above clearance, there is defined an inter-piston chamber R18. Additionally, in the first pressurizing piston 306, a pressurized area on which a pressure of a brake fluid in the inter-piston chamber R18 acts, namely, an area of the rear end face of the extension portion 332, and a pressurized area on which a pressure of a brake fluid in the opposing chamber R16 acts, namely, an area of the front end face of the flange 334 are equal.

In the master cylinder device 302 in which each of the chambers is defined thus, the input chamber R15 is defined by that the first pressurizing piston 306 contacts with the inner circumferential face of the second housing member 314 via a seal 344 embedded in an outer circumferential face of the flange 334 and contacts with an inner circumferential face defining the through hole 326 of the third housing member 316 via a seal 346 embedded in the inner circumferential face defining the through hole 326. In addition, the input piston 310 slidably contacts with the inner circumferential face of the second housing member 314. Therefore, a seal 348 is embedded in an outer circumferential face of the base end portion 336, and a seal 350 is embedded in an outer circumferential face of the front end of the guide portion 338. It is noted that a high-pressure seal is employed as each of the seals 344, 346 but not employed as each of the seals 348, 350.

In the first housing member 312, there is provided a communication hole 360 whose one end is open to the opposing chamber R16. In the second housing member 314, there is provided a communication hole 362 whose one end is open so as to face the other end of the communication hole 360, and, in the fourth housing member 318, there is provided a communication hole 364 whose one end is open so as to face the other end of the communication hole 362 and whose other end is open to the exterior. That is, the opposing chamber R16 communicates with the exterior through the communication holes 360, 362, 364. In addition, in the second housing member 314, there is provided a communication hole 366 whose one end is open to the input chamber R15, and, in the fourth housing member 318, there is provided a communication hole 368 whose one end is open so as to face the other end of the communication hole 366 and whose other end is open to the exterior. That is, the input chamber R15 communicates with the exterior through the communication holes 366, 368.

Since an outer diameter of a part of the guide portion 338 of the input piston 310 is slightly smaller than an inner diameter of the rear small-diameter portion 322 of the second housing member 314, a fluid passage 370 is formed between the guide portion 338 and the rear small-diameter portion 322. In addition, between an outer circumferential face of the second housing member 314 and an inner circumferential face of the fourth housing member 318, there is formed a fluid passage 372 since an outer diameter of the second housing member 314 and an inner diameter of the fourth housing member 318 are different from each other. In the input piston 310, there is provided a communication hole 374 whose one end is open to the internal chamber R17 and whose other end is open to the fluid passage 370. In the second housing member 314, there is provided a communication hole 376 whose one end is open to the fluid passage 370 and whose other end is open to the fluid passage 372. Moreover, in the fourth housing member 318, there is provided a communication hole 378 whose one end is open to the fluid passage 372 and whose other end is open to the exterior. That is, the internal chamber R17 communicates with the exterior through the communication hole 374, the fluid passage 370, the communication hole 376, the fluid passage 372, and the communication hole 378.

Additionally, inside the first pressurizing piston 306, there is formed an internal communication passage 380 whose one end is open on the rear end face of the extension portion 332 and whose other end is open in front of the flange 334 of the main body portion 330. Therefore, in the master cylinder device 302, the internal communication passage 380 constitutes an inter-chamber communication passage which allows a communication between the opposing chamber R16 and the inter-piston chamber R18. Therefore, the inter-piston chamber R18 also communicates with the exterior through the internal communication passage 380, the opposing chamber R16, the communication holes 360, 362, 364.

In the master cylinder device 302 formed thus, to the communication hole 368, an input pressure passage 230 whose one end is connected to the third fluid chamber 134 of the pressure adjusting valve device 100 is connected at the other end thereof. Additionally, to the communication hole 364, one end of the external communication passage 382 communicating with the reservoir 62 is connected, and an electromagnetic open/close valve 384 which is a normally-opened valve is provided on the external communication passage 382. Therefore, a mechanism including the external communication passage 382 and the open/close valve 384 constitutes a low-pressure-source communication mechanism for the opposing and inter-piston chambers which allows the opposing chamber R6 and the inter-piston chamber R8 to communicate with the reservoir 62. Moreover, in the external communication passage 382, there is provided a check valve 386 in parallel with the open/close valve 384 in order that each of the pressures of the brake fluids in the opposing chamber R16 and the inter-piston chamber R18 does not become lower than a pressure of the brake fluid in the reservoir 62. In the low pressure passage 382, a reaction force generating device 250 into/from which the brake fluid flows from/into the master cylinder device 302 is provided between the end connecting to the communication hole 364 and the open/close valve 384.

To the communication hole 378, one end of a low pressure passage 388 communicating with the reservoir 62 is connected, and an electromagnetic open/close valve 390 which is a normally-closed valve is provided on the low pressure passage 388. Therefore, the internal chamber R17 can communicate with the reservoir 62. Additionally, when the open/close valve 390 is closed, the internal chamber R17 is hermetically closed. That is, a mechanism including the low pressure passage 388 and the open/close valve 390 can be considered to be an input-piston-shrink prohibiting mechanism which prohibits the shrink of the input piston 310 by hermetically closing the internal chamber R17.

<<Actuation of Hydraulic Brake System>>

Actuation of the hydraulic brake system 300 will be described below. In the normal condition, that is, in a condition in which the hydraulic brake system 300 can be actuated normally, the open/close valve 384 is energized to be closed and the open/close valve 390 is energized to be opened. In this state, the brake fluid whose pressure is adjusted according to the target hydraulic brake force is inputted into the input chamber R15. The first pressurizing piston 306 moves forward depending on the pressure of the brake fluid in the input chamber R15 so as to pressurize the brake fluid in the first pressurizing chamber R3 and then pressurize the brake fluid in the second pressurizing chamber R4. Additionally, in the normal condition, when the input piston 310 moves forward relative to the first pressurizing piston 306 in accordance with an increase of the operation amount, the brake fluid in the inter-piston chamber R18 flows out via the opposing chamber R16, thus a total volume of the opposing chamber R16 and the inter-piston chamber R18 decreases. The outflowed brake fluid flows into the fluid storage chamber R9 of the reaction force generating device 250, and then each of the pressures of the brake fluids in the opposing chamber R16, the inter-piston chamber R18, and the fluid storage chamber R9 increases.

As described above, in the first pressurizing piston 306, since the pressurized area on which the pressure of the brake fluid in the opposing chamber R16 acts and the pressurized area on which the pressure of a brake fluid in the inter-piston chamber R18 acts are equal, the first pressurizing piston 306 is moved depending on not the pressure of the brake fluid in the opposing chamber R16 and the pressure of the brake fluid in the inter-piston chamber R18 but the pressure of the brake fluid from the high pressure source device 58. Additionally, a movement of the first pressurizing piston 306 does not cause any movement of the input piston 310. Accordingly, in the master cylinder device 302, the high-pressure-source-pressure dependent pressurizing state is realized in the normal condition.

Additionally, in the input piston 310 in the normal condition, the base end portion 336 and the guide portion 338 move forward relative to the movable portion 340 by the operation force and the pressure of the brake fluid in the inter-piston chamber R18. In other words, the input piston 310 shrinks with the brake fluid in the internal chamber R17 being flowed out, thus the spring 342 generates an elastic reaction force according to an amount of the shrink. That is, a mechanism including the spring 342 is an elastic-reaction-force applying mechanism for the input piston which applies the elastic reaction force with a magnitude according to the amount of the shrink to the base end portion 336 and the movable portion 340. Therefore, when the input piston 310 shrinks, a rearward bias force acts on the base end portion 336 to which the brake pedal 70 is connected, whereby the driver can feel the bias force as an operation reaction force against a brake operation by the driver. Also, the above described operation reaction force by the elastic-reaction-force applying mechanism for the fluid storage chamber, that is, the spring 256 of the reaction force generating device 250 acts on the base end portion 336. Consequently, it is possible to say that the master cylinder device 302 have two elastic-reaction-force-applying mechanisms, that is, the elastic-reaction-force applying mechanism for the input piston and the elastic-reaction-force applying mechanism for the fluid storage chamber.

In the master cylinder device 302, the base end portion 336 of the input piston 310 comes into abutting contact with the movable portion 340 at a certain brake operation amount. That is, the input piston 310 becomes to be incapable of shrinking, therefore the operation reaction force is generated only by the elastic-reaction-force applying mechanism for the fluid storage chamber in a brake operation exceeding the certain brake operation amount. Therefore, the spring constant of the spring 342 of the elastic-reaction-force applying mechanism for the input piston is considerably smaller than the spring constant of the spring 256 of the elastic-reaction-force applying mechanism for the fluid storage chamber. Since the two elastic-reaction-force-applying mechanisms are constructed thus, a ratio of the operation force to the operation amount is comparatively small from a start of a brake operation to the certain brake operation amount and becomes comparatively large in a brake operation exceeding the certain brake operation amount. That is, the master cylinder device 302 is configured such that, as the operation amount of the brake pedal 70 increases, a ratio of increase of the operation reaction force increases owing to the two elastic-reaction-force-applying mechanisms.

In the large-brake-force-required condition, the open/close valve 384 is de-energized to be opened in the hydraulic brake system 300. Therefore, the input piston 310 moves forward with the brake fluids in the inter-piston chamber R18 and the opposing chamber R16 being flowed into the reservoir 62. Therefore, when the movable portion 340 of the input piston 310 comes into an abutting contact with the extension portion 332 of the first pressurizing piston 306, the first pressurizing piston 306 can be moved forward by the operation force. That is, it is possible to pressurize the brake fluids in the pressurizing chambers R3, R4 depending on not only the pressure of the brake fluid from the high pressure source device 58 but also the operation force. Accordingly, in the master cylinder device 302, the operation-force/high-pressure-source-pressure dependent pressurizing state is realized in the large-brake-force-required condition. Accordingly, the first pressurizing piston 306 can be considered a pressure receiving piston which pressurizes the brake fluid to be supplied to the brake devices 56 by receiving the operation force or the pressure of the brake fluid supplied to the input chamber R15. In the large-brake-force-required condition, the open/close valve 390 is also de-energized to be closed, thereby prohibiting the shrink of the input piston 310. Therefore, the brake operation force by the driver is transmitted to the first pressurizing piston 306 without shrinking the input piston 310, that is, without generating an ineffective brake operation amount. Incidentally, in the operation-force/high-pressure-source-pressure dependent pressurizing state, since the pressure of the brake fluids in the pressurizing chambers R3, R4 is transmitted to the input piston 310, the driver can feel the rearward bias force generated by the pressure as the operation reaction force.

In a condition in which electric power is not supplied to the hydraulic brake system 300 due to an electric failure, the open/close valve 384 is de-energized to be opened and the open/close valve 390 is de-energized to be closed. Therefore, as in the operation-force/high-pressure-source-pressure dependent pressurizing state, the first pressurizing piston 306 can move forward depending on the operation force. That is, in the master cylinder device 302, the operation-force dependent pressurizing state is realized.

In the master cylinder device 302, the pressure adjusting valve device 100 may be activated by utilizing, as the pilot pressure, not the master pressure but the pressure of the brake fluid in the internal chamber R17. In this case, the first fluid chamber 130 may be connected not to the fluid passage diverging from the fluid passage 80 but to a fluid passage diverging from between the communication hole 378 and the open/close valve 390 on the low pressure passage 388. As described above, the open/close valve 390 is de-energized to be closed, whereby the internal chamber R17 is hermetically closed in the operation-force dependent pressurizing state. Therefore, in the operation-force dependent pressurizing state, the pressure of the brake fluid in the first pressurizing chamber R3 is transmitted to the input piston 310 via the first pressurizing piston 306, whereby a force by the pressure of the brake fluid in the internal chamber R17 has a magnitude to be equal to a force by the pressure of the brake fluid in the first pressurizing chamber R3. That is, the pressure of the brake fluid in the internal chamber R17 is a pressure indicating the master pressure, therefore the pressure adjusting valve device 100 is activated while indirectly utilizing the master pressure as the pilot pressure.

In the master cylinder device 302, the input piston 310 is not fitted to the first pressurizing piston 306 with any seal. Therefore, even when the first pressurizing piston 306 is moved by the pressure of the brake fluid in the input chamber R15, no force resulting from any friction force of any seal acts on the input piston 310. In addition, each of the high-pressure seals 344, 346 between the first pressurizing piston 306 and the housing 304 causes a comparatively large friction force upon a movement of the first pressurizing piston 306, whereas each of the seals 348, 350 between the input piston 310 and the housing 304 causes a comparatively small friction force upon a movement of the input piston 310. Therefore, in the master cylinder device 302, operational feeling in a brake operation is excellent. Especially in the operation-force dependent pressurizing state, it is possible to provide excellent operational feeling.

Third Embodiment

Figure 6:
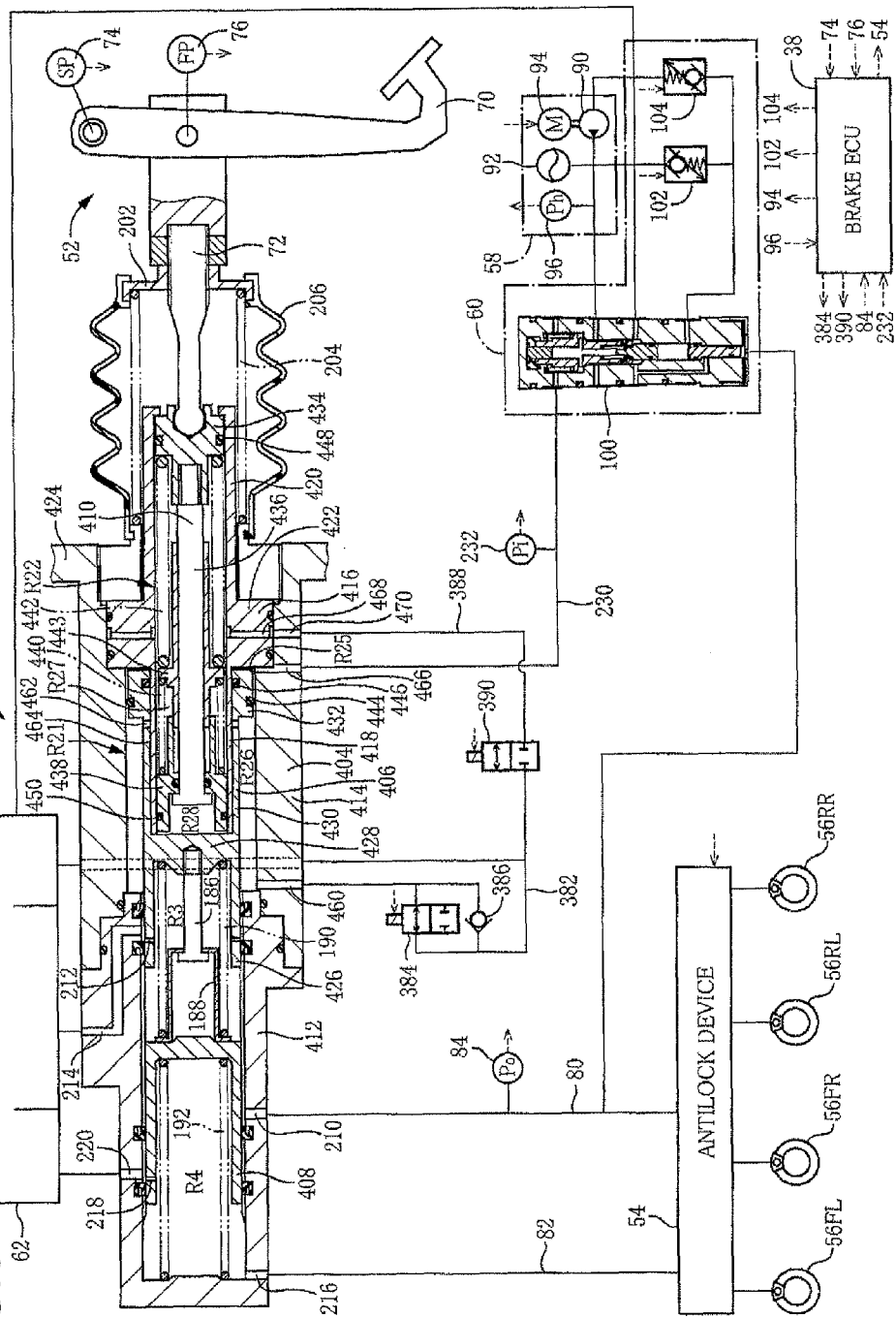
FIG. 6 is a view of a hydraulic brake system including the master cylinder device of a third embodiment.

FIG. 6 schematically represents a hydraulic brake system 400 of the third embodiment. The hydraulic brake system 400 has a master cylinder device 402. The hydraulic brake system 400 generally has the same structure as each of the hydraulic brake systems of the first and the second embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 402 is categorized into the Input Piston Free Type Master Cylinder, and has a housing 404 being a casing, a first pressurizing piston 406 and a second pressurizing piston 408 which pressurize the brake fluid to be supplied to the brake devices 56, and an input piston 410 to which an operation of the driver is inputted via the operation device 52.

The housing 404 mainly includes three members, specifically, a first housing member 412, a second housing member 414, and a third housing member 416, and has a roughly hollow cylindrical shape whose front end is closed. Among these housing members, the third housing member 416 has a roughly hollow cylindrical shape, and is sectioned into a front side portion 418 arranged in a front side, a rear side portion 420 arranged in a rear side, and an intermediate portion 422 arranged between the above two portions and having an outer diameter larger than that of the front side portion 418 and that of the rear side portion 420.

In the housing 404 constructed above, the intermediate portion 422 of the third housing member 416 serves an annular separation wall portion projecting to the inside in a radial direction, and the front side portion 418 serves an inner cylindrical portion extending forward from an inner periphery of the separation wall portion. In other words, in the housing 404, a partition portion separating an interior of the housing 404 is formed by the intermediate portion 422 and the front side portion 418. Therefore, the interior of the housing 404 is separated into a front side chamber R21 including an outside space of the front side portion 418 and a rear side chamber R22 including an inside space of the front side portion 418. In addition, a front end of the front side portion 418 serves as an opening formed in the partition portion.

The second pressurizing piston 408 has a hollow cylindrical shape whose rear end portion is closed, and is slidably fitted with seals in the first housing member 412 in the front side chamber R21. The first pressurizing piston 406 includes a main body portion 426 disposed in the front side chamber R21 and having a roughly hollow cylindrical shape, and a separation wall 428 disposed approximately in the middle of the main body portion 426 in the front-back direction and separating an interior of the first pressurizing piston 406 in the front-back direction. Therefore, in the first pressurizing piston 406, a rear portion of the separation wall 428 serves as a cylindrical portion 430 including a blind hole being open rearward. In addition, a flange 432 is formed on a rear end of the cylindrical portion 430. The first pressurizing piston 406 formed thus is fitted with seals in the housing 404 such that a front portion of the main body portion 426 slidably contacts with the first housing member 412, the flange 432 slidably contacts with the second housing member 414, and the cylindrical portion 430 slidably contacts with the front side portion 418 of the third housing member 416. That is, the first pressurizing piston 406 is disposed such that the front side portion 418 of the third housing member 416 is inserted in the cylindrical portion 430, in other words, such that the cylindrical portion 430 is interposed between the second housing member 414 and the front side portion 418 of the third housing member 416. So to speak, the second housing member 414 can be considered to be an outer cylindrical portion of the housing 404.

The input piston 410 includes a base end portion 434 to which the operation rod 72 is connected, a rod portion 436 screwed in the base end portion 434 and extending forward from the base end portion 434, and a movable portion 438 slidably fitted to the rod portion 436. In the input piston 410, a rearward movement of the movable portion 438 relative to the base end portion 434, in other words, a shrink of the input piston 410 is allowed. Additionally, between the base end portion 434 and the movable portion 438, two compression coil springs 440, 442 each of which generates an elastic reaction force for biasing the movable portion 438 forward are disposed in series in the front-back direction. It is noted that the spring constant of the spring 440 is smaller than the spring constant of the spring 442. Additionally, between the springs 440, 442, a floating seat 443 is disposed such that it is supported by them. Incidentally, an outer flange is provided on an outer periphery of a front end portion of the rod portion 436, and the outer flange prevents the movable portion 438 from coming out forward from the rod portion 436. The input piston 410 is fitted in an inside of the third housing member 416 with a front portion of the input piston 410 being inserted in the front side portion 418 of the third housing member 416. That is, the input piston 410 is disposed such that the front side thereof is located in the cylindrical portion 430 of the first pressurizing piston 406. Accordingly, in the master cylinder device 402, since a part of the first pressurizing piston 406 and a part of the input piston 410 overlap with each other in the front-back direction, the entire length of the master cylinder device 402 is comparatively short.

In the master cylinder device 402 constructed thus, between a rear end of the main body portion 426 of the first pressurizing portion 406 and the intermediate portion 422 of the third housing member 416, there is defined a fluid chamber R25 into which the brake fluid from the high pressure source device 58 is inputted. This fluid chamber R25 is referred to as an "input chamber", where appropriate. Additionally, between an inner circumferential face of the second housing member 414 in front of the flange 432 and an outer circumferential face of the first pressurizing piston 406, there is defined an annular fluid chamber R26 opposing the input chamber R25 with the flange 432 being interposed between the opposing chamber R26 and the input chamber R25. Hereinafter, this chamber is referred to as an "opposing chamber", where appropriate. Moreover, inside the input piston 410, a fluid chamber (hereinafter, referred to as an "internal chamber", where appropriate) R27 for allowing a shrink of the input piston 410 is defined between the base end portion 434 and the movable portion 438. Furthermore, between a bottom face of a rearward-open blind hole of the first pressurizing piston 406 and a face of the input piston 410 which faces forward, there is defined an inter-piston chamber R28 across which the input piston 410 and the first pressurizing piston 406 face to each other. Additionally, in the first pressurizing piston 406, a pressurized area on which a pressure of a brake fluid in the inter-piston chamber R28 acts, namely, an area of the bottom face of the rearward-open blind hole, and a pressurized area on which a pressure of a brake fluid in the opposing chamber R26 acts, namely, an area of a front end face of the flange 432 are equal.

In the master cylinder device 402 in which each of the chambers is defined thus, the input chamber R25 is defined by that the first pressurizing piston 406 contacts with the inner circumferential face of the second housing member 414 via a seal 444 embedded in an outer circumferential face of the flange 432 and contacts with an outer circumferential face of the front side portion 418 of the third housing member 416 via a seal 446 embedded in an inner circumferential face of the cylindrical portion 430. In addition, the input piston 410 slidably contacts with the inner circumferential face of the second housing member 414. Therefore, a seal 448 is embedded in an outer circumferential face of the base end portion 434, and a seal 450 is embedded in an outer circumferential face of the movable portion 438. It is noted that a high-pressure seal is employed as each of the seals 444, 446 but not employed as each of the seals 448, 450.

In the second housing member 414, there is provided a communication hole 460 whose one end is open to the opposing chamber R26. Additionally, in the cylindrical portion 430 of the first pressurizing piston 406, there is provided a communication hole 462 whose one end is open to the opposing chamber R26. Between the inner circumferential face of the cylindrical portion 430 of the first pressurizing piston 406 and the outer circumferential face of the front side portion 418 of the third housing member 416, there is provided a clearance 464 having a certain cross section area through which the brake fluid can flow, though it is hard to be seen from the figure. Therefore, in the master cylinder device 402, the clearance 464 and the communication hole 460 constitute an inter-chamber communication passage which allows a communication between the opposing chamber R26 and the inter-piston chamber R28. Therefore, the inter-piston chamber R28 also communicates with the exterior through the clearance 464, the communication hole 462, the opposing chamber R26, and the communication hole 460. In the second housing member 414, there is also provided a communication hole 466 whose one end is open to the input chamber R25. In the third housing member 416, there is provided a communication hole 468 whose one end is open to the internal chamber R27, and, in the second housing member 414, there is provided a communication hole 470 whose one end is open so as to face the other end of the communication hole 468 and whose other end is open to the exterior. That is, the internal chamber R27 communicates with the exterior through the communication holes 468, 470.

In the master cylinder device 402 in which the communication holes are formed thus, to the communication hole 466, an input pressure passage 230 whose one end is connected to the third fluid chamber 134 of the pressure adjusting valve device 100 is connected at the other end thereof. Additionally, one end of an external communication passage 382 is connected to the communication hole 460, thus the opposing chamber R26 and the inter-piston chamber R28 can communicate with the reservoir 62. Therefore, in the master cylinder device 402, a mechanism including the open/close valve 384 and the external communication passage 382 constitutes a low-pressure-source communication mechanism for the opposing and inter-piston chambers which allows the opposing chamber R26 and the inter-piston chamber R28 to communicate with the reservoir 62. Incidentally, in the master cylinder device 402, the reaction force generating device 250 is not provided. Additionally, one end of the low pressure passage 388 communicating with the low pressure source is connected to the communication hole 470, thus the internal chamber R27 can communicate with the reservoir 62.

<<Actuation of Hydraulic Brake System>>

Actuation of the hydraulic brake system 400 will be described below. In the normal condition, that is, in a condition in which the hydraulic brake system 400 can be actuated normally, the brake fluid whose pressure is adjusted according to the target hydraulic brake force is inputted into the input chamber R25. The first pressurizing piston 406 moves forward depending on the pressure of the brake fluid in the input chamber R25 so as to pressurize the brake fluid in the first pressurizing chamber R3 and then pressurize the brake fluid in the second pressurizing chamber F4.

As described above, in the first pressurizing piston 406, since the pressurized area on which the pressure of the brake fluid in the opposing chamber R26 acts and the pressurized area on which the pressure of a brake fluid in the inter-piston chamber R28 acts are equal, the first pressurizing piston 406 is moved depending on not the pressure of the brake fluid in the opposing chamber R26 and the pressure of the brake fluid in the inter-piston chamber R28 but the pressure of the brake fluid from the high pressure source device 58. Additionally, a movement of the first pressurizing piston 406 does not cause any movement of the input piston 410. That is, the master cylinder device 402 is configured such that the first pressurizing piston 406 and the input piston 410 can move independently from each other in the normal condition. Accordingly, in the master cylinder device 402, the high-pressure-source-pressure dependent pressurizing state is realized in the normal condition.

Moreover, in the normal condition, since a total volume of the opposing chamber R26 and the inter-piston chamber R28 is constant, the rod portion 436 and the movable portion 438 in the input piston 410 move relative to each other with the brake fluid in the internal chamber R27 being flowed out when the operation force is applied to the brake pedal 70. In other words, the rod portion 436 and the movable portion 438 move relative to each other so that the input piston 410 shrinks. Additionally, as it shrinks, the elastic reaction force with a magnitude according to an amount of the shrink of the input piston 410 is generated by the springs 440, 442. That is, in the master cylinder device 402, a mechanism including the springs 440, 442 serves an elastic-reaction-force applying mechanism for the input piston which applies the elastic reaction force with the magnitude according to the amount of the shrink of the input piston 410 to the base end portion 434 and the movable portion 438, as a reaction force applying mechanism which enables the driver to feel the elastic reaction force. Incidentally, since the spring constants of the springs 440, 442 are different from each other, the spring 440 with the small spring constant mainly shrinks until a certain operation amount, and then only the spring 442 with the large spring constant will shrink after the spring 440 cannot shrink any more. That is, the master cylinder device 402 is configured such that, as the operation amount of the brake pedal 70 increases, a ratio of increase of the operation reaction force increases owing to the two springs 440, 442.

In the large-brake-force-required condition, the open/close valve 384 is de-energized to be opened in the hydraulic brake system 400. Therefore, the input piston 410 moves forward with the brake fluids in the inter-piston chamber R28 and the opposing chamber R26 being flowed into the reservoir 62. Therefore, when the input piston 410 comes into an abutting contact with the bottom face of the rearward-open blind hole of the first pressurizing piston 406, the first pressurizing piston 406 can be moved forward by the operation force. That is, it is possible to pressurize the brake fluids in the pressurizing chambers R3, R4 depending on not only the pressure of the brake fluid from the high pressure source device 58 but also the operation force. Accordingly, in the master cylinder device 402, the operation-force/high-pressure-source-pressure dependent pressurizing state is realized in the large-brake-force-required condition. Therefore, the first pressurizing piston 406 can be considered a pressure receiving piston which pressurizes the brake fluid to be supplied to the brake devices 56 by receiving the operation force or the pressure of the brake fluid supplied to the input chamber R25. In the large-brake-force-required condition, the open/close valve 390 is also de-energized to be closed, thereby hermetically closing the internal chamber R27, that is, prohibiting the shrink of the input piston 410. That is, in the master cylinder device 402, a mechanism including the low pressure passage 388 and the open/close valve 390 constitutes an input-piston-shrink prohibiting mechanism which prohibits the shrink of the input piston 410. Therefore, the brake operation force by the driver is transmitted to the first pressurizing piston 406 without shrinking the input piston 410, that is, without generating an ineffective brake operation amount. Since the pressure of the brake fluids in the pressurizing chambers R3, R4 is transmitted to the input piston 410, the driver can feel the rearward bias force associated with the pressure as the operation reaction force.

In a condition in which electric power is not supplied to the hydraulic brake system 400 due to an electric failure, the open/close valve 384 is de-energized to be opened and the open/close valve 390 is de-energized to be closed. Therefore, as in the operation-force/high-pressure-source-pressure dependent pressurizing state, the first pressurizing piston 406 can move forward depending on the operation force. That is, in the master cylinder device 402, the operation-force dependent pressurizing state is realized.

In the master cylinder device 402, the input piston 410 is not fitted to the first pressurizing piston 406 with any seal. Therefore, even when the first pressurizing piston 406 is moved by the pressure of the brake fluid in the input chamber R25, no force resulting from any friction force of any seal acts on the input piston 410. In addition, each of the high-pressure seals 444, 446 between the first pressurizing piston 406 and the housing 404 causes a comparatively large friction force upon a movement of the first pressurizing piston 406, whereas each of the seals 448, 450 between the input piston 410 and the housing 404 causes a comparatively small friction force upon a movement of the input piston 410. Therefore, in the master cylinder device 402, operational feeling in a brake operation is excellent. Especially in the operation-force dependent pressurizing state, it is possible to provide excellent operational feeling.

Fourth Embodiment

Figure 7:
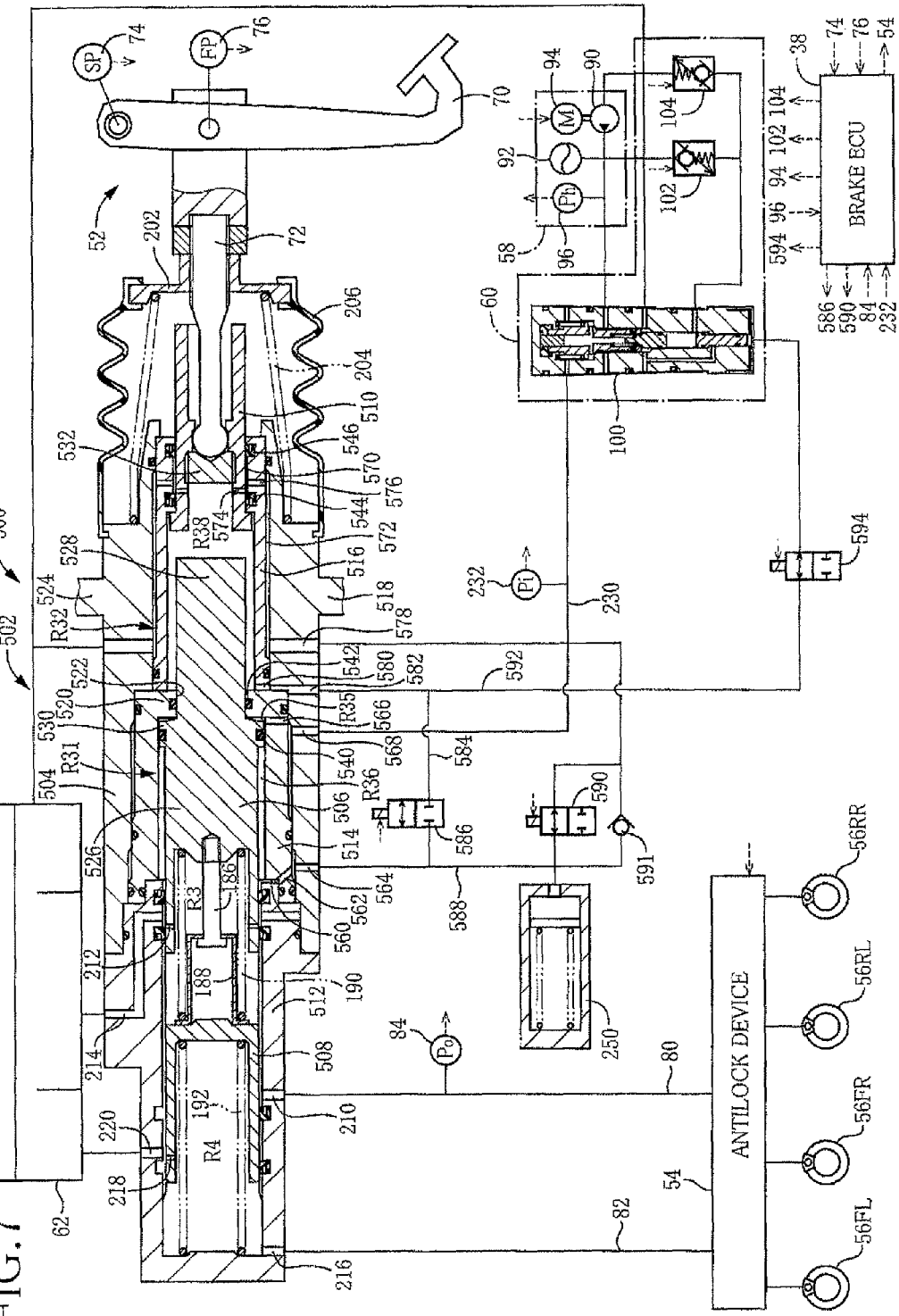
FIG. 7 is a view of a hydraulic brake system including the master cylinder device of a fourth embodiment.

FIG. 7 schematically represents a hydraulic brake system 500 of the fourth embodiment. The hydraulic brake system 500 has a master cylinder device 502. The hydraulic brake system 500 generally has the same structure as any one of the hydraulic brake systems of the first through third embodiments. In the following description, with consideration for abbreviating the explanation, different construction and actuation from the hydraulic brake systems will be described but the same construction and actuation as the hydraulic brake systems are omitted.
<<Structure of Master Cylinder Device>>

The master cylinder device 502 is categorized into Input Piston Free Type Master Cylinder, and has a housing 504 being a casing, a first pressurizing piston 506 and a second pressurizing piston 508 which pressurize the brake fluid to be supplied to the brake devices 56, and an input piston 510 to which an operation of the driver is inputted via the operation device 52.

The housing 504 mainly includes four members, specifically, a first housing member 512, a second housing member 514, a third housing member 516, and a fourth housing member 518, and has a roughly hollow cylindrical shape whose front end is closed. Among the housing members, the second housing member 514 has a hollow cylindrical shape in which an inner flange 520 is formed at a rear end portion. In addition, the inner flange 520 defines a through hole 522 at a rear end of the second housing member 514. An interior of the housing 504 constructed thus is separated by the inner flange 520 of the second housing member 514 to define a front side chamber R31 located in a front side and a rear side chamber R32 located in a rear side. That is, the inner flange 520 serves as a partition portion separating the interior of the housing 504, and the through hole 522 serves as an opening of the partition portion.

The second pressurizing piston 508 has a hollow cylindrical shape whose rear end portion is closed, and is slidably fitted with seals in the first housing member 512 in the front side chamber R31. The first pressurizing piston 506 includes a main body portion 526 located in the front side chamber R31 and having a hollow cylindrical shape whose rear end portion is closed, and an extension portion 522 extending from a rear end portion of the main body portion 526 through the through hole 522 into the rear side chamber R32. Additionally, on an outer periphery of a bottom portion of the main body portion 526, there is provided a flange 530. The first pressurizing piston 506 is fitted with seals in the housing 504 such that a front portion of the main body portion 526 slidably contacts with the first housing member 512, the flange 530 slidably contacts with the second housing member 512, and the extension portion 528 slidably contacts with the through hole 522 of the second housing member 512. The input piston 510 is disposed in the rear side chamber R32 and is fitted, behind the extension portion 528 of the first pressurizing piston 506, in the third housing member 516. The input piston 510 has a roughly a hollow cylindrical shape and is connected, at a separation wall 532 provided in an interior thereof, to the operation rod 72. In addition, a flange is provided on an outer periphery of a front end portion of the input piston 510, whose a rearward movement is limited by that the flange is stopped by the third housing member 516.

In the master cylinder device 502 constructed thus, between the main body portion 526 of the first pressurizing portion 506 and the inner flange 520 of the second housing member 512, there is defined a fluid chamber R35 into which the brake fluid from the high pressure source device 58 is inputted. This fluid chamber R35 is referred to as an "input chamber", where appropriate. Additionally, between an inner circumferential face of the second housing member 514 in front of the flange 530 and an outer circumferential face of the first pressurizing piston 506, there is defined an annular fluid chamber R36 opposing the input chamber R35 with the flange 530 being interposed between the opposing chamber R36 and the input chamber R35. Hereinafter, this chamber is referred to as an "opposing chamber", where appropriate. In addition, between a rear end face of the extension portion 528 of the first pressurizing piston 506 and a front end face of the input piston 510, there is provided a clearance which is small in no brake operation. In a space around the extension portion 528 including the above clearance, there is defined an inter-piston chamber R38. Additionally, in the first pressurizing piston 506, a pressurized area on which a pressure of a brake fluid in the inter-piston chamber R38 acts, namely, an area of the rear end face of the extension portion 528, and a pressurized area on which a pressure of a brake fluid in the opposing chamber R36 acts, namely, an area of the front end face of the flange 530 are equal.

In the master cylinder device 502 in which each of the chambers is defined thus, the input chamber R35 is defined by that the first pressurizing piston 506 contacts with the inner circumferential face of the second housing member 514 via a seal 540 embedded in an outer circumferential face of the flange 530 and contacts with an inner circumferential face defining the through hole 522 of the second housing member 514 via a seal 542 embedded in an inner circumferential face defining the through hole 522. By the way, the input piston 510 slidably contacts with an inner circumferential face of the third housing member 516, and seals 544, 546 are embedded in an inner circumferential face of a rear end portion of the third housing member 516. It is noted that a high-pressure seal is employed as each of the seals 540, 542 but not employed as each of the seals 544, 546.

In the first housing member 512, there is provided a communication hole 560 whose one end is open to the opposing chamber R36. In the second housing member 514, there is provided a communication hole 562 whose one end is open so as to face the other end of the communication hole 560, and furthermore, in the fourth housing member 518, there is provided a communication hole 564 whose one end is open so as to face the other end of the communication hole 562 and whose other end is open to the exterior. That is, the opposing chamber R36 communicates with the exterior through the communication holes 560, 562, 564. In addition, in the second housing member 514, there is provided a communication hole 566 whose one end is open to the input chamber R35, and, in the fourth housing member 518, there is provided a communication hole 568 whose one end is open so as to face the other end of the communication hole 566 and whose other end is open to the exterior. That is, the input chamber R35 communicates with the exterior through the communication holes 566, 568.

Since an inner diameter of a part of the rear end portion of the third housing member 516 is slightly larger than an outer diameter of a circumferential wall of the input piston 510, a fluid passage 570 is formed between a rear end portion and the circumferential wall of the input piston 510. In addition, between an outer circumferential face of the third housing member 516 and an inner circumferential face of the fourth housing member 518, there is formed a fluid passage 572 since an outer diameter of the third housing member 516 and an inner diameter of the fourth housing member 518 are different from each other. In the circumferential wall of the input piston 510, there is provided a communication hole 574 whose one end is open to the inter-piston chamber R38 and whose other end is open to the fluid passage 570. In the third housing member 516, there is provided a communication hole 576 whose one end is open to the fluid passage 570 between the seal 544 and the seal 546 and whose other end is open to the fluid passage 572. Moreover, in the fourth housing member 518, there is provided a communication hole 578 whose one end is open to the fluid passage 572 and whose other end is open to the exterior. That is, the inter-piston chamber R38 communicates with the exterior through the communication hole 574, the fluid passage 570, the communication hole 576, the fluid passage 572, and the communication hole 578.

In addition, in a front end portion of the third housing member 516, there is provided a communication hole 580 whose one end is open to the inter-piston chamber R38, and, in the fourth housing member 518, there is provided a communication hole 582 whose one end is open so as to face the other end of the communication hole 580 and whose other end is open to the exterior.

In the master cylinder device 502 in which the communication holes are formed thus, to the communication hole 568, an input pressure passage 230 whose one end is connected to the third fluid chamber 134 of the pressure adjusting valve device 100 is connected at the other end thereof. Moreover, one end of an external communication passage 584 is connected to the communication hole 564, and the other end thereof is connected to the communication hole 582. Therefore, in the master cylinder device 502, the external communication passage 584 constitutes an inter-chamber communication passage which allows a communication between the opposing chamber R36 and the inter-piston chamber R38. In addition, an electromagnetic open/close valve 586 which is a normally-closed valve is provided on the external communication passage 584. Further, a low pressure passage 588 communicating with the reservoir 62 through the communication hole 578 diverges from between an end portion connected to the communication hole 564 and the open/close valve 586 in the external communication passage 584, and an electromagnetic open/close valve 590 which is a normally-opened valve is provided on the low pressure passage 588. Therefore, the opposing chamber R36 and the inter-piston chamber R38 can communicate with the reservoir 62, thus a mechanism including the external communication passage 584, the open/close valve 586, the low pressure passage 588, and the open/close valve 590 constitutes a low-pressure-source communication mechanism for the opposing and inter-piston chambers which allows the opposing chamber R36 and the inter-piston chamber R38 to communicate with the reservoir 62. Moreover, in the low pressure passage 588, there is provided a check valve 591 in parallel with the open/close valve 590 in order that each of the pressures of the brake fluids in the opposing chamber R36 and the inter-piston chamber R38 does not become lower than a pressure of the brake fluid in the reservoir 62. In the low pressure passage 588, a reaction force generating device 250 into/from which the brake fluid flows from/into the master cylinder device 502 is provided between a diverging point from the external communication passage 584 and the open/close valve 590. Therefore, in a state in which the open/close valve 590 is closed, when a total volume of the opposing chamber R36 and the inter-piston chamber R38 decreases, the volume of the fluid storage chamber R9 of the reaction force generating device 250 increases.

a communication passage 592 diverging from between the end connected to the communication hole 582 and the open/close valve 584 in the external communication passage 584 is connected to the pressure adjusting valve device 100 of the pressure-intensifying/reducing device 60, specifically, the first fluid chamber 130 of the pressure adjusting valve device 100. That is, in the hydraulic brake system 500, the pressure adjusting valve device 100 can be activated by utilizing, as the pilot pressure, not the master pressure but the pressure of the brake fluid in the inter-piston chamber R38. In addition, an electromagnetic open/close valve 594 which is a normally-opened valve is provided on the external communication passage 592.

<<Actuation of Hydraulic Brake System>>

Actuation of the hydraulic brake system 500 will be described below. In a normal condition, that is, in a condition in which the hydraulic brake system 500 can be actuated normally, the open/close valve 590 is energized to be closed and the open/close valve 594 is energized to be closed. In this state, the brake fluid whose pressure is adjusted according to the target hydraulic brake force is inputted into the input chamber R35. The first pressurizing piston 506 moves forward depending on the pressure of the brake fluid in the input chamber R35 so as to pressurize the brake fluid in the first pressurizing chamber R3 and then pressurize the brake fluid in the second pressurizing chamber R4.

As described above, in the first pressurizing piston 506, since the pressurized area on which the pressure of the brake fluid in the opposing chamber R36 acts and the pressurized area on which the pressure of a brake fluid in the inter-piston chamber R38 acts are equal, the first pressurizing piston 506 as the pressure receiving piston is moved depending on not the pressure of the brake fluid in the opposing chamber R36 and the pressure of the brake fluid in the inter-piston chamber R38 but the pressure of the brake fluid from the high pressure source device 58. Additionally, a movement of the first pressurizing piston 506 does not cause any movement of the input piston 510. That is, the master cylinder device 502 is configured such that the first pressurizing piston 506 and the input piston 510 can move independently from each other in the normal condition. Accordingly, in the master cylinder device 502, a "high-pressure-source-pressure dependent pressurizing state", that is, a state in which the brake fluid supplied to the brake devices 56 can be pressurized depending on the pressure of the brake fluid introduced from the high pressure source device 58 is realized in the normal condition.

Additionally, in the normal condition, when the input piston 510 moves forward relative to the first pressurizing piston 506 in accordance with an increase of the operation amount, and then the brake fluid in the inter-piston chamber R38 flows out, therefore the total volume of the opposing chamber R36 and the inter-piston chamber R38 decreases. The outflowed brake fluid flows into the fluid storage chamber R9 of the reaction force generating device 250, each of the pressures of the brake fluids in the opposing chamber R36, the inter-piston chamber R38, and the fluid storage chamber R9 increases. The pressure of the brake fluid in the inter-piston chamber R38 acts on the input piston 510, therefore a rearward bias force is applied to the input piston 510, whereby the driver can feel the bias force as an operation reaction force against a brake operation by the driver.

In the large-brake-force-required condition, the open/close valve 586 is de-energized to be closed and the open/close valve 590 is de-energized to be opened in the hydraulic brake system 500. Therefore, the first pressurizing piston 506 moves forward with the brake fluids in the opposing chamber R36 being flowed into the reservoir 62. Therefore, in the master cylinder device 502, a mechanism including the open/close valve 590 constitutes a low-pressure-source communication mechanism for the opposing chamber which allows the opposing chamber R36 to communicate with the reservoir 62. In addition, when the input piston is moved forward in this state, the communication hole 574 provided in the input piston 510 passes over the seal 544, whereby the communication between the communication hole 576 of the third housing member 516 and the communication hole 574 is shut off. That is, in the large-brake-force-required condition, since the open/close valve 586 is closed and the communication between the communication hole 574 and the communication hole 576 is shut off, the communication between the inter-piston chamber R38 and the reservoir 62 is shut off. Therefore, in the master cylinder device 502, a mechanism including the open/close valve 586, the seal 544, and the communication holes 574, 576 is considered an inter-piston-chamber hermetically closing mechanism. Therefore, the brake operation force by the driver is transmitted from the input piston 510 via the brake fluid in the inter-piston chamber R38 to the first pressurizing piston 506. Accordingly, in the master cylinder device 502, the operation-force/high-pressure-source-pressure dependent pressurizing state is realized in the large-brake-force-required condition. Therefore, the first pressurizing piston 506 can be considered a pressure receiving piston which pressurizes the brake fluid to be supplied to the brake devices 56 by receiving the operation force or the pressure of the brake fluid supplied to the input chamber R35. Incidentally, in the operation-force/high-pressure-source-pressure dependent pressurizing state, since the pressure of the brake fluids in the pressurizing chambers R3, R4 is transmitted to the input piston 510, the driver can feel the rearward bias force generated by the pressure as the operation reaction force.

In a condition in which electric power is not supplied to the hydraulic brake system 500 due to an electric failure, the open/close valves 586, 590 are put in the same respective states as in the operation-force/high-pressure-source-pressure dependent pressurizing state. That is, it is possible to pressurize the brake fluids in the pressurizing chambers R3, R4 depending on the operation force so as to supply the brake fluid to the brake devices 56FL, 56FR. That is, in the master cylinder device 502, the operation-force dependent pressurizing state is realized. Moreover, in the hydraulic brake system 500, the open/close valve 594 is de-energized to be opened in the electric failure condition etc. Therefore, the pressure adjusting valve device 100 can be activated by utilizing, as the pilot pressure, the pressure of the brake fluid in the inter-piston chamber R38. Therefore, unlike utilizing, as the pilot pressure, the master pressure which is affected by a friction force etc. upon a movement of the first pressurizing piston 506, the activation of the pressure adjusting valve device 100 is comparatively favorable in an ability of following a change of brake operation.

In the master cylinder device 502, the input piston 510 is not fitted to the first pressurizing piston 506 with any seal. Therefore, even when the first pressurizing piston 506 is moved by the pressure of the brake fluid in the input chamber R35, no force resulting from any friction force of any seal acts on the input piston 510. In addition, each of the high-pressure seals 540, 542 between the first pressurizing piston 506 and the housing 504 causes a comparatively large friction force upon a movement of the first pressurizing piston 506, whereas each of the seals 544, 546 between the input piston 510 and the housing 504 causes a comparatively small friction force upon a movement of the input piston 510. Therefore, in the master cylinder device 502, operational feeling in a brake operation is excellent. Especially in the operation-force dependent pressurizing state, it is possible to provide excellent operational feeling.

Fifth Embodiment

Figure 8:
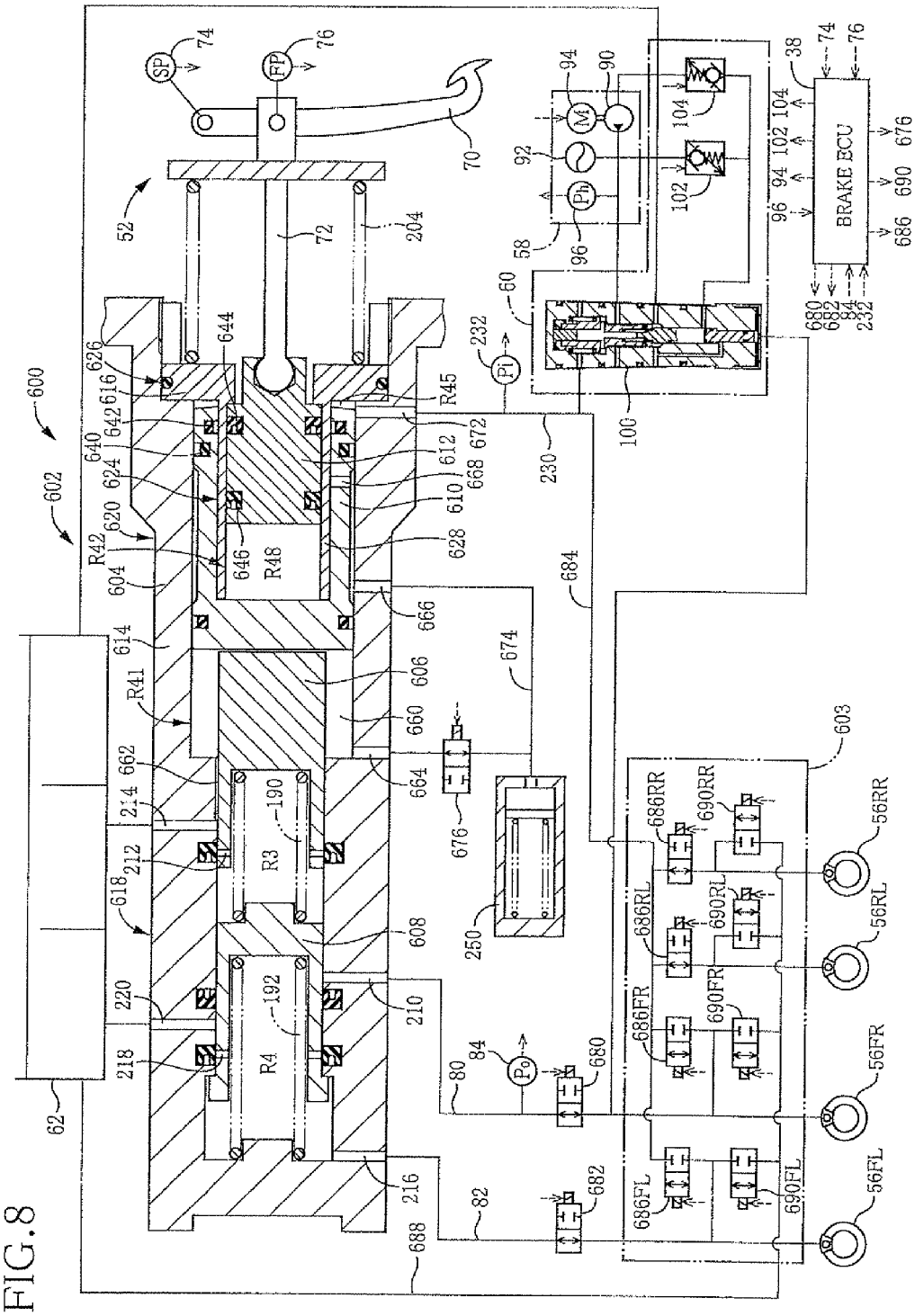
FIG. 8 is a view of a hydraulic brake system including the master cylinder device of a fifth embodiment.

FIG. 8 schematically represents a hydraulic brake system 600 of the fifth embodiment. The hydraulic brake system 600 has a master cylinder device 602 and an antilock device 603. The hydraulic brake system 600 generally has the same structure as any one of the hydraulic brake systems of the first through fourth embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 602 is categorized into the Master-Cut System Adoptable Type Master Cylinder Device, and has a housing 604 being a casing, a first pressurizing piston 606 and a second pressurizing piston 608 which pressurize the brake fluid to be supplied to the brake devices 56, an intermediate piston 610 which can move forward by the brake fluid introduced from the high pressure source device 58, and an input piston 612 to which an operation of the driver is inputted via the operation device 52.

The housing 604 mainly includes two members, specifically, a first housing member 614 and a second housing member 616. The first housing member 614 has a roughly hollow cylindrical shape whose front end is closed. The first housing member 614 is sectioned into two portions having mutually different inner diameters, specifically, a small-inner-diameter portion 618 arranged in a front side and having a small inner diameter, and a large-inner-diameter portion 620 arranged in a rear side and having a large inner diameter. The second housing member 616 has a roughly hollow cylindrical shape, and is sectioned into two portions having mutually different outer diameters, specifically, a small-outer-diameter portion 624 arranged in a front side and having a small outer diameter, and a large-outer-diameter portion 626 arranged in a rear side and having a large outer diameter.

In the housing 604 constructed above, the large-outer-diameter portion 626 of the second housing member 616 serves an annular separation wall portion projecting to the inside in a radial direction, and the small-outer-diameter portion 624 serves an inner cylindrical portion extending forward from an inner periphery of the separation wall portion. In other words, in the housing 604, a partition portion separating an interior of the housing 604 is formed by the small-outer-diameter portion 624 and the large-outer-diameter portion 626 of the second housing member 616. Therefore, the interior of the housing 604 is separated into a front side chamber R41 including an outside space of the small-outer-diameter portion 624 and a rear side chamber R42 including an inside space of the small-outer-diameter portion 624. In addition, a front end of the small-outer-diameter portion 624 serves as an opening formed in the partition portion.

Each of the first pressurizing piston 606 and the second pressurizing piston 608 has a hollow cylindrical shape whose rear end portion is closed, and is slidably fitted with seals in the small-inner-diameter portion 618 of the first housing member 614 in the front side chamber R41. The intermediate piston 610 includes a main body portion disposed in the front side chamber R41 and having a hollow cylindrical shape, and a rear side portion of the main body portion serves as a cylindrical portion 628 which has a blind hole being open rearward and a hollow cylindrical shape. The intermediate piston 610 is fitted with seals in the housing 604 such that an outer circumferential face slidably contacts with the large-inner-diameter portion 620 of the first housing member 614, and an inner circumferential face of the cylindrical portion 628 slidably contacts with the small-outer-diameter portion 624 of the second housing member 616. That is, the intermediate piston 610 is disposed such that the small-outer-diameter portion 624 of the second housing member 616 is inserted in the cylindrical portion 628, in other words, such that the cylindrical portion 628 is interposed between the large-inner-diameter portion 620 of the first housing member 614 and the small-outer-diameter portion 624 of the second housing member 616. So to speak, the large-inner-diameter portion 620 of the first housing member 614 can be considered to be an outer cylindrical portion of the housing 604. In addition, between a rear end face of the first pressurizing piston 606 and a front end face of the intermediate piston 610, there is a clearance which is small in no brake operation. The input piston 612 has a shape roughly like a cylinder and is located in the rear side chamber R42. Specifically, the input piston 612 is fitted in the small-outer-diameter portion 624 of the second housing member 616 with seals. Accordingly, in the master cylinder device 602, since a part of the intermediate piston 610 and the input piston 612 overlap with each other in the front-back direction, the entire length of the master cylinder device 602 is comparatively short.

In the master cylinder device 602 constructed thus, between a rear end of the main body portion of the intermediate piston 610 and the second housing member 616, there is defined a fluid chamber R45 into which the brake fluid from the high pressure source device 58 is inputted. This fluid chamber R45 is referred to as an "input chamber", where appropriate. It is noted that the input chamber R45 is illustrated in an almost squeezed state in FIG. 8. In addition, a bottom face of the blind hole of the intermediate piston 610 and a front end face of the input piston 612 separate away from each other in no brake operation. Including a space formed by the separation, an inter-piston chamber R48 is defined between the intermediate piston 610 and the input piston 612.

In the master cylinder device 602 in which each of the chambers is defined thus, the input chamber R45 is defined by that the intermediate piston 610 contacts with an inner circumferential face of the first housing member 614 via a seal 640 embedded in the outer circumferential face of the intermediate piston 610 and contacts with an outer circumferential face of the small-outer-diameter portion 624 of the second housing member 616 via a seal 642 embedded in an inner circumferential face of the intermediate piston 610. By the way, the input piston 612 slidably contacts with an inner circumferential face of the small-outer-diameter portion 624 of the second housing member 616, and seals 644, 646 are embedded in an outer circumferential face of the input piston 612. It is noted that a high-pressure seal is employed as each of the seals 640, 642 but not employed as each of the seals 644, 646.

In the master cylinder device 602, there is provided an atmospheric pressure chamber 660 between an outer circumferential face of a rear end portion of the first pressurizing piston 606 and an inner circumferential face of an intermediate portion of the first pressurizing piston 614. The atmospheric pressure chamber 660 is provided in the first housing member 614, and is maintained at the atmospheric pressure at all times by a fluid passage 662 whose one end is open to the atmospheric pressure chamber 660 and whose other end is open to the above described communication hole 214 communicating with the reservoir 62. Additionally, in the first housing member 614, there is provided a communication hole 664 whose one end is open to the atmospheric pressure chamber 660 and whose other end is open to the exterior.

Since the outer diameter of a part of the cylindrical portion 628 is small, there is provided a fluid passage between the large-inner-diameter portion 620 of the first housing member 614 and the cylindrical portion 628 of the intermediate piston 610. Additionally, between the inner circumferential face of the cylindrical portion 628 of the intermediate piston 610 and the outer circumferential face of the small-outer-diameter portion 624 of the second housing member 616, there is provided a clearance having a certain cross section area through which the brake fluid can flow, though it is hard to be seen from the figure. In the first housing member 614, there is provided a communication hole 666 whose one end is open to the fluid passage and whose other end is open to the exterior. Additionally, in the intermediate piston 610, there is provided a communication hole 668 whose one end is open to the clearance and whose other end is open to the fluid passage. Therefore, the inter-piston chamber R48 communicates with the exterior through the clearance, the communication hole 668, the fluid passage, and the communication hole 666. Moreover, in the first housing member 614, there is provided a communication hole 672 whose one end is open to the input chamber R45 and whose other end is open to the exterior. Therefore, the input chamber R45 communicates with the exterior.

In the master cylinder device 602 in which the communication holes are formed thus, to the communication hole 672, an input pressure passage 230 whose one end is connected to the third fluid chamber 134 of the pressure adjusting valve device 100 is connected at the other end thereof. Moreover, one end of an external communication passage 674 is connected to the communication hole 664 which communicates with the atmospheric pressure chamber 660 being at the atmospheric pressure, and the other end thereof is connected to the communication hole 666. Therefore, the inter-piston chamber R48 can communicate with the reservoir 62. In addition, an electromagnetic open/close valve 676 which is a normally-opened valve is provided on the external communication passage 674. In the external communication passage 674, a reaction force generating device 250 into/from which the brake fluid flows from/into the master cylinder device 602 is provided between the end connected to the communication hole 666 and the open/close valve 676. Therefore, in a state in which the open/close valve 676 is closed, when the volume of the inter-piston chamber R48 decreases, the volume of the fluid storage chamber R9 of the reaction force generating device 250 increases according to the decrease.

Electromagnetic open/close valves 680, 682 (hereinafter, each of which is referred to as a "master-cut valve", where appropriate) each of which opens in a de-energized state and closes in an energized state are provided on fluid passages 80, 82, respectively. In the hydraulic brake system 600, the open/close of those master-cut valves 680, 682 selectively realize a state in which a supply of the brake fluid pressurized by the master cylinder device 602 to the brake devices 56FL, FR is allowed and a state in which the supply is prohibited.

<<Structure of Antilock Device>>

Unlike the above hydraulic brake system employing the Input Piston Free Type Master Cylinder Device, a pressure intensifying communication passage 684 for supplying the pressure-adjusted brake fluid to the brake devices 56 diverges from the input pressure passage 230 connecting the pressure adjusting valve device 100 to the master cylinder device 50. The pressure intensifying communication passage 684 is connected to the antilock device 603. Inside the antilock device 603, the pressure intensifying communication passage 684 diverges into four passages. These diverging four pressure intensifying communication passages are each connected to the brake devices 56 via electromagnetic pressure-intensifying open/close valves 686. In addition, a pressure reducing communication passage 688 is connected to the reservoir 62. Inside the antilock device 603, the pressure reducing communication passage 688 also diverges into four passages. These diverging four pressure reducing communication passages are each connected to the brake devices 56 via an electromagnetic pressure-reducing open/close valve 690. Incidentally, among four pressure-intensifying open/close valves 686, the pressure-intensifying open/close valves 686FL, FR corresponding to the brake devices 56FL, FR are normally-closed valve, and the other two pressure-intensifying open/close valves 686 and the four pressure-reducing open/close valves 690 are normally-opened valves.

<<Actuation of Hydraulic Brake System>>

In the hydraulic brake system 600, when the input piston 612 moves forward relative to the intermediate piston 610, the brake fluid in the inter-piston chamber R48 flows out. When the open/close valve 676 is closed, the outflowed brake fluid flows into the fluid storage chamber R9 of the reaction force generating device 250. Therefore, the brake fluids in the inter-piston chamber R48 and the fluid storage chamber R9 increase. Then, the intermediate piston 610 can be moved forward by the operation force. In addition, when the brake fluid in the inter-piston chamber R48 flows out and then the input piston 612 comes into abutting contact with the intermediate piston 610, the intermediate piston 610 is also moved by the operation force. Moreover, the intermediate piston 610 can be also moved by the pressure in the brake fluid in the input chamber R45, that is, the pressure of the brake fluid from the high pressure source device 58. That is, the intermediate piston 610 can be considered a pressure receiving piston which pressurizes the brake fluid to be supplied to the brake devices 56 by receiving the operation force or the pressure of the brake fluid supplied to the input chamber R45. Accordingly, the master cylinder device 602 of the hydraulic brake system 600 is configured to realize the operation-force/high-pressure-source-pressure dependent pressurizing state at all times. Incidentally, the above pressure of the brake fluid in the inter-piston chamber R48 acts on the input piston 612, therefore a rearward bias force is applied to the input piston 612, whereby the driver can feel the bias force as an operation reaction force against a brake operation by the driver.

In this hydraulic brake system 600, the master-cut valves 680, 682 are energized to be closed in the normal condition. Therefore, the pressurizing chambers R3, R4 are hermetically closed, thus the pressurizing pistons 606, 608 can hardly move forward, and the brake fluid is not supplied from the master cylinder device 602 to the brake device 56 in the normal condition. Meanwhile, the pressure-intensifying open/close valve 686 is opened, thus the pressure-intensified brake fluid is supplied to the brake device 56 through the pressure intensifying communication passage 684. Consequently, the brake device 56 can generate the hydraulic brake force depending on only the pressure of the brake fluid. That is, in the brake device 56, a state in which the hydraulic brake force with a magnitude dependent on the high-pressure-source pressure is realized in the normal condition. So to say, in the master cylinder device 602, shutting (cutting) off the communication between the master cylinder device 602 and the brake device 56 realizes the state in which the hydraulic brake force with a magnitude dependent on only the high-pressure-source pressure is generated. Incidentally, the open/close valve 676 is energized to be closed in the normal condition.

In the large-brake-force-required condition, the master-cut valves 680, 682 are de-energized to be opened and the pressure-intensifying open/close valves 686FL, FR are de-energized to be closed in the hydraulic brake system 600. Therefore, the brake fluid is supplied to the brake devices 56FL, FR from the master cylinder device 602 in the operation-force/high-pressure-source-pressure dependent pressurizing state, and the supply of the brake fluid from the pressure adjusting valve device 100 is shut off. Consequently, in the brake devices 56FL, FR, a state in which the hydraulic brake force with a magnitude dependent on the high-pressure-source pressure plus a hydraulic brake force with a magnitude dependent on the operation force is generated is realized in the large-brake-force-required condition. Incidentally, since the open/close valve 676 is de-energized to be opened in the large-brake-force-required condition, the input piston 612 moves forward with the brake fluid in the inter-piston chamber R48 being flowed into the reservoir 62 so as to comes into an abutting contact with the bottom face of the blind hole of the intermediate piston 610. It is noted that, since the brake fluids in the pressurizing chambers R3, R4 are supplied only to the brake devices 56FL, FR in the large-brake-force-required condition, the brake fluid is supplied only to the brake devices 56 in the front wheels from the master cylinder device 602. Additionally, since the pressure of the brake fluids in the pressurizing chambers R3, R4 is transmitted to the input piston 612, the driver can feel a rearward bias force generated by the pressure as the operation reaction force.

As a result, in the hydraulic brake system 600, the open/close of each of the master-cut valves 680, 682 and the pressure-intensifying open/close valves 686FL, FR is controlled in order to supply the brake fluid from one of the master cylinder device 602 and the pressure adjusting valve device 100 each of which is a supply source of the brake fluid to the brake devices 56FL, FR. That is, a mechanism including the master-cut valves 680, 682 and the pressure-intensifying open/close valves 686FL, FR can be considered to be a switching mechanism for switching the supply source of the brake fluid to the brake devices 56FL, 56FR.

In the hydraulic brake system 600, a switch from a state in which the brake devices 56FL, 56FR generate the hydraulic brake force with a magnitude dependent on the high-pressure-source pressure to a state in which they generate the hydraulic brake force with a magnitude dependent on the high-pressure-source pressure and the operation force is carried out when the pressure of the brake fluid supplied from the pressure adjusting device 100 to the brake devices 56FL, FR is approximately equal to the pressure of the brake fluid supplied from the master cylinder device 602 to the brake devices 56FL, FR. Therefore, the pressure of the brake fluid to be supplied to the brake devices 56FL, FR hardly change before and after the switch, and therefore the switch can be carried out without changing the hydraulic brake force generating in the brake devices 56FL, FR. Accordingly, the switch can be carried out without giving a driver unfavorable feeling. Therefore, in the master cylinder device 602, a pressurized area of the first pressurizing piston 606 on which a pressure of the first pressurizing chamber R3 acts and a pressurized area of the second pressurizing piston 608 on which a pressure of the second pressurizing chamber R4 acts are set such that the pressure of the brake fluids in the pressurizing chambers R3, R4 and the pressure of the brake fluid supplied from the pressure adjusting device 100 to the brake devices 56 be almost equal. Specifically, each of those pressurized areas is smaller by a degree corresponding to the considered operation force than a pressurized area of the intermediate piston 610 on which the pressure of the brake fluid in the input chamber R45 acts.

In a condition in which electric power is not supplied to the hydraulic brake system 600 due to an electric failure, each of the open/close valve 676, the master-cut valves 680, 682, and the pressure-intensifying open/close valves 686FL, FR is de-energized to come into the same open/close state as in the large-brake-force-required condition. Accordingly, in the master cylinder device 602, an "operation-force dependent pressurizing state", that is, a state in which the brake fluids in the pressurizing chambers R3, R4 are pressurized depending on only the operation force is realized. That is, in the brake devices 56FL, FR, a state in which the hydraulic brake force with a magnitude dependent on only the operation force is realized. Incidentally, when the pressure-intensified brake fluid is stored in the accumulator 92 of the high pressure source device 58, the pressure of the pressure-intensified brake fluid assists the pressurizing of the brake fluids in the pressurizing chambers R3, R4.

In the master cylinder device 602, the input piston 612 is not fitted to the intermediate piston 610 with any seal. Therefore, even when the intermediate piston 610 is moved by the pressure of the brake fluid in the input chamber R45, no force resulting from any friction force of any seal acts on the input piston 612. In addition, each of the high-pressure seals 640, 642 between the intermediate piston 610 and the housing 604 causes a comparatively large friction force upon a movement of the intermediate piston 610, whereas each of the seals 644, 646 between the input piston 612 and the housing 604 causes a comparatively small friction force upon a movement of the input piston 612. Therefore, in the master cylinder device 602, operational feeling in a brake operation is excellent especially in the operation-force dependent pressurizing state. So it is possible to provide excellent operational feeling especially in the operation-force dependent pressurizing state.

Sixth Embodiment

Figure 9:
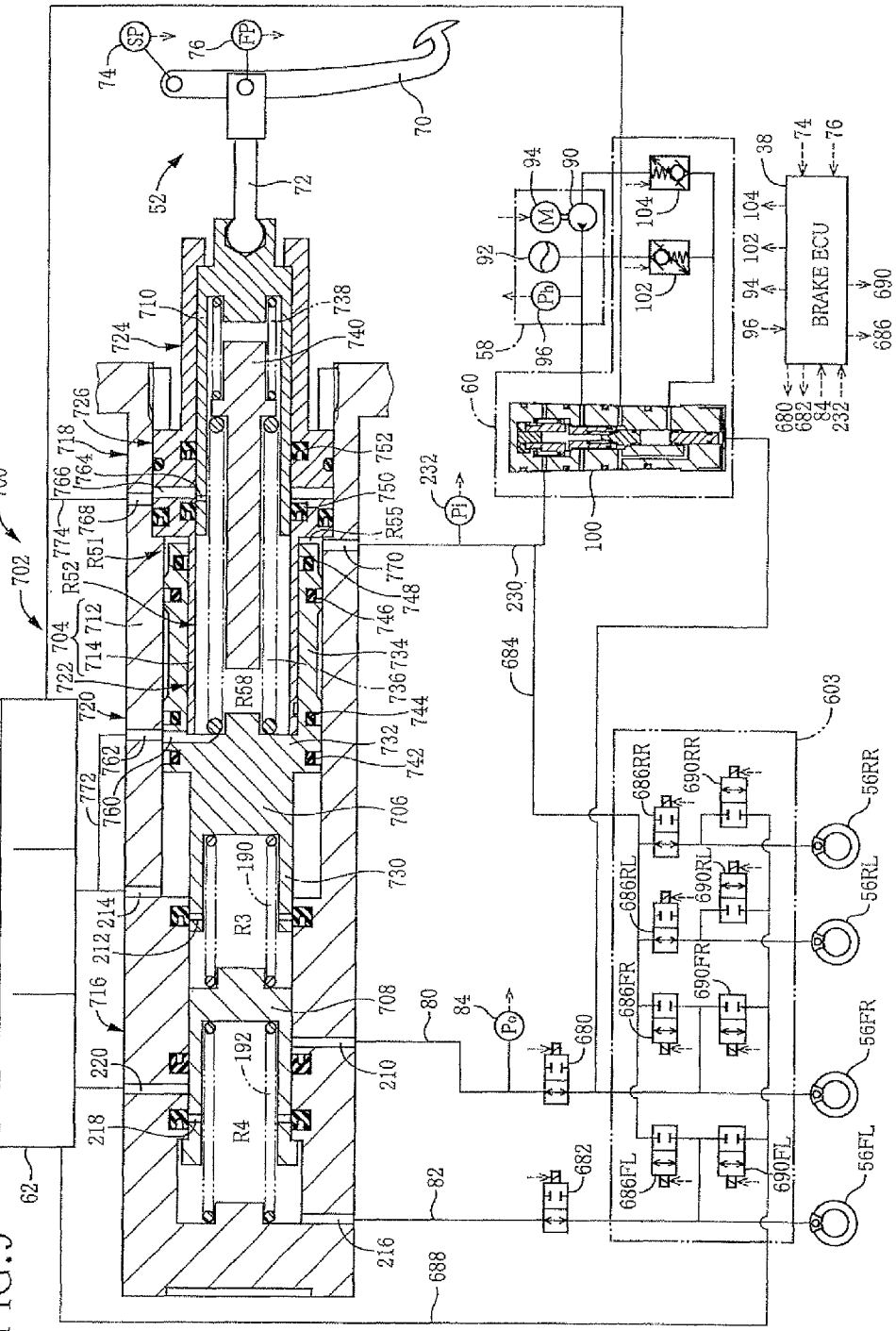
FIG. 9 is a view of a hydraulic brake system including the master cylinder device of a sixth embodiment.

FIG. 9 schematically represents a hydraulic brake system 700 of the sixth embodiment. The hydraulic brake system 700 has a master cylinder device 702 and an antilock device 603. The hydraulic brake system 700 generally has the same structure as any one of the hydraulic brake systems of the first through fifth embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 702 is categorized into the Master-Cut System Adoptable Type Master Cylinder Device, and has a housing 704 being a casing, a first pressurizing piston 706 and a second pressurizing piston 708 which pressurize the brake fluid to be supplied to the brake devices 56, and an input piston 710 to which an operation of the driver is inputted via the operation device 52.

The housing 704 mainly includes two members, specifically, a first housing member 712 and a second housing member 714. The first housing member 712 has a roughly hollow cylindrical shape whose front end is closed, and is sectioned into three portions having mutually different inner diameters, specifically, a front small-diameter portion 716 arranged in a front side and having a small inner diameter, a rear large-diameter portion 718 arranged in a rear side and having a large inner diameter, and an intermediate portion 720 arranged between the above two portions and having an inner diameter of a medium size between the above two inner diameters. The second housing member 714 has a roughly hollow cylindrical shape, and is sectioned into a front side portion 722 arranged in a front side, a rear side portion 724 arranged in a rear side, and an intermediate portion 726 arranged between the above two portions and having an outer diameter larger than that of the front side portion 722 and that of the rear side portion 724.

In the housing 704 constructed above, the intermediate portion 726 of the second housing member 714 serves an annular separation wall portion projecting to the inside in a radial direction, and the front side portion 722 serves an inner cylindrical portion extending forward from an inner periphery of the separation wall portion. In other words, in the housing 704, a partition portion separating an interior of the housing 704 is formed by the intermediate portion 726 and the front side portion 722. Therefore, the interior of the housing 704 is separated into a front side chamber R51 including an outside space of the front side portion 722 and a rear side chamber R52 including an inside space of the front side portion 722. In addition, a front end of the front side portion 722 serves as an opening formed in the partition portion.

The second pressurizing piston 708 has a hollow cylindrical shape whose rear end portion is closed, and is slidably fitted with seals in the first housing member 712 in the front side chamber R51. The first pressurizing piston 706 includes a main body portion 730 disposed in the front side chamber R51 and having a roughly hollow cylindrical shape, and a separation wall 732 disposed approximately in the middle of the main body portion 730 in the front-back direction and separating an interior of the first pressurizing piston 706 in the front-back direction. Therefore, in the first pressurizing piston 706, a rear portion of the separation wall 732 serves as a cylindrical portion 734 including a blind hole being open rearward. The first pressurizing piston 706 formed thus is fitted with seals in the housing 704 such that a front portion of the main body portion 730 slidably contacts with the front small-diameter portion 716 of the first housing member 712, and the cylindrical portion 734 slidably contacts with the intermediate portion 720 of the first housing member 712 and the front side portion 722 of the second housing member 714. That is, the first pressurizing piston 706 is disposed such that the front side portion 722 of the second housing member 714 is inserted in the cylindrical portion 734, in other words, such that the cylindrical portion 734 is interposed between the intermediate portion 720 of the first housing member 712 and the front side portion 722 of the second housing member 714. So to speak, the intermediate portion 720 of the first housing member 712 can be considered to be an outer cylindrical portion of the housing 704. The input piston 710 roughly has a hollow cylindrical shape whose rear end portion is closed, that is, a shape having a blind hole being open forward. An operation rod 72 is connected to a rear end of the input piston 710.

The input piston 710 is inserted in the second housing member 714 and fitted in an inside of the second housing member 714 with seals. Accordingly, in the master cylinder device 702, since a part of the first pressurizing piston 706 and a part of the input piston 710 overlap with each other in the front-back direction when the input piston 710 moves forward, the entire length of the master cylinder device 702 is comparatively short. Additionally, between a bottom face of the rearward-opening blind hole of the cylindrical portion 734 of the first pressurizing piston 706 and a bottom face of the forward-opening blind hole of the input piston 710, two compression coil springs 736, 738 each of which generates an elastic reaction force in a direction of separating the first pressurizing piston 706 and the input piston 710 are disposed in series in the front-back direction. It is noted that the spring constant of the spring 738 is smaller than the spring constant of the spring 736. Additionally, between the springs 736, 738, a floating seat 740 is disposed while supported by them.

In the master cylinder device 702 constructed thus, between a rear end of the main body portion 730 of the first pressurizing portion 706 and the intermediate portion 726 of the second housing member 714, there is defined a fluid chamber R55 into which the brake fluid from the high pressure source device 58 is inputted. This fluid chamber R55 is referred to as an "input chamber", where appropriate. Furthermore, between a bottom face of a rearward-open blind hole of the cylindrical portion 734 of the first pressurizing piston 706 and the input piston 710, there is defined an inter-piston chamber R28 across which the input piston 710 and the first pressurizing piston 706 face to each other.

In the master cylinder device 702, the first pressurizing piston 706 contacts with an inner circumferential face of the intermediate portion 720 of the first housing member 712 via seals 742, 744 embedded in an outer circumferential face in a front portion of the cylindrical portion 734. Additionally, the input chamber R55 is defined by that the first pressurizing piston 706 contacts with the inner circumferential face of the intermediate portion 720 of the first housing member 712 via a seal 746 embedded in an outer circumferential face of the cylindrical portion 734 and contacts with an outer circumferential face of the front side portion 722 of the second housing member 714 via a seal 748 embedded in an inner circumferential face of the cylindrical portion 734. The input piston 710 slidably contacts with an inner circumferential face of the second housing member 714, and seals 750, 752 are embedded in an inner circumferential face of the second housing member 714. It is noted that a high-pressure seal is employed as each of the seals 746, 748 but not employed as each of the seals 750, 752.

In the first pressurizing piston 706, there is provided a communication hole 760 whose one end is open to the inter-piston chamber R58. Additionally, in the first housing member 712, there is provided a communication hole 762 whose one end is open so as to face the other end of the communication hole 760 and whose other end is open to the exterior. Accordingly, the inter-piston chamber R58 can communicate with the exterior. It is noted that the other end of the communication hole 760 is open between the seal 742 and the seal 744. In a circumferential wall of the input piston 710, there is provided a communication hole 764 whose one end is open to the inter-piston chamber R58. In the intermediate portion 726 of the second housing member 714, there is provided, between the seal 750 and the seal 752, a communication hole 766 whose one end is open so as to face the other end of the communication hole 764. Moreover, in the first housing member 712, there is provided a communication hole 768 whose one end is open so as to face the other end of the communication hole 766 and whose other end is open to the exterior. Accordingly, the inter-piston chamber R58 can communicate with the exterior. Additionally, in the first housing member 712, there is provided a communication hole 770 whose one end is open to the input chamber R55 and whose other end is open to the exterior.

In the master cylinder device 702 in which the communication holes are formed thus, to the communication hole 770, an input pressure passage 230 whose one end is connected to the third fluid chamber 134 of the pressure adjusting valve device 100 is connected at the other end thereof. Additionally, a pressure intensifying communication passage 684 diverging from the input pressure passage 230 for supplying the pressure-adjusted brake fluid to the brake devices 56 is connected to the antilock device 603. Also, low pressure passages 772, 774 communicating with the reservoir 62 are connected to the communication holes 762, 768, respectively.

<<Actuation of Hydraulic Brake System>>

In the hydraulic brake system 700, the input piston 710 can move forward, according to an increase of the brake operation amount, relative to the first pressurizing piston 706 with the brake fluid in the inter-piston chamber R58 being flowed into the reservoir 62 through the communication holes 760, 762 and the low pressure passage 772. Upon the forward movement, the elastic reaction forces by the springs 736, 738 increase, a forward bias force acts on the first pressurizing piston 706. That is, it is possible to move the first pressurizing piston 706 forward by the operation force. The seal 744 is moved forward by the forward movement of the first pressurizing piston 706, and then goes beyond the communication hole 762 of the first housing member 712, whereby the communication between the communication hole 760 and the communication hole 762 is shut off. Additionally, the communication hole 764 is moved forward by the forward movement of the input piston 710, and then goes beyond the seal 750 embedded in the second housing member 714, whereby the communication between the communication hole 764 and the communication hole 766 is shut off. That is, in the master cylinder device 702, a mechanism including the seals 744, 750 and the communication holes 760, 762, 764, 766 constitutes an inter-piston-chamber hermetically closing mechanism for hermetically closing the inter-piston chamber R58. Also, this inter-piston-chamber hermetically closing mechanism can be considered as an input-piston-relative-forward-movement prohibiting mechanism which prohibits a relative forward movement of the input piston 710 relative to the first pressurizing piston 706. Therefore, when the inter-piston chamber R58 is hermetically closed, the operation force is transmitted via a brake fluid in the inter-piston chamber R58 to the first pressurizing piston 706, whereby the first pressurizing piston 706 can be moved forward by the operation force. That is, the first pressurizing piston 706 can be considered a pressure receiving piston which pressurizes the brake fluid to be supplied to the brake devices 56 by receiving the operation force or the pressure of the brake fluid supplied to the input chamber R55. Accordingly, the master cylinder device 702 of the hydraulic brake system 700 is configured to realize the operation-force/high-pressure-source-pressure dependent pressurizing state at all times.

In this hydraulic brake system 700, master-cut valves 680, 682 are energized to be closed in the normal condition. Accordingly, the brake fluid is not supplied from the master cylinder device 702 to the brake devices 56 in the normal condition. Meanwhile, a pressure-intensifying open/close valve 686 is opened, thus the pressure-intensified brake fluid is supplied to the brake device 56 through a pressure intensifying communication passage 684. Accordingly, in the brake device 56, a state in which the hydraulic brake force with a magnitude dependent on the high-pressure-source pressure is generated is realized in the normal condition. Incidentally, the input piston 710 moves forward relative to the first pressurizing piston 706 by the brake operation, and then the springs 736, 738 generate the elastic reaction forces according to an amount of the forward movement. Therefore, a rearward bias force is applied to the input piston 710. That is, in the master cylinder device 702, a mechanism including the springs 736, 738 constitutes a reaction force applying mechanism which applies an operation reaction force against the brake operation to the input piston 710. Additionally, since the spring constants of the springs 736, 738 are different from each other as described above, the master cylinder device 702 is configured such that, as the operation amount of the brake pedal 70 increases, a ratio of increase of the operation reaction force increases.

In the large-brake-force-required condition, the master-cut valves 680, 682 are de-energized to be opened and the pressure-intensifying open/close valves 686FL, FR are de-energized to be closed in the hydraulic brake system 700. Therefore, the brake fluid is supplied to the brake devices 56FL, FR from the master cylinder device 702 in the operation-force/high-pressure-source-pressure dependent pressurizing state, and the supply of the brake fluid from the pressure adjusting valve device 100 is shut off. That is, in the brake devices 56FL, FR, a state in which the hydraulic brake force with a magnitude dependent on the high-pressure-source pressure plus a hydraulic brake force with a magnitude dependent on the operation force is generated is realized in the large-brake-force-required condition. Moreover, since the first pressurizing piston 706 can move forward in the large-brake-force-required condition, the inter-piston chamber R58 is hermetically closed as described above. Therefore, the brake operation force by the driver is transmitted to the first pressurizing piston 706 without moving forward the input piston 710 relative to the first pressurizing piston 706, that is, without generating an ineffective brake operation amount. Since the pressure of the brake fluids in the pressurizing chambers R3, R4 is transmitted to the input piston 710 in a state in which the hydraulic brake force with a magnitude dependent on the high-pressure-source pressure and the operation force, the driver can feel a rearward bias force generated by the pressure as the operation reaction force.

In a condition in which electric power is not supplied to the hydraulic brake system 700 due to an electric failure, each of the master-cut valves 680, 682 and the pressure-intensifying open/close valves 686FL, FR is de-energized to come into the same open/close state as in the large-brake-force-required condition. However, in a case in which the brake fluid is not supplied from the high pressure source device 58 to the master cylinder device 702 due to an electric failure, an "operation-force dependent pressurizing state", that is, a state in which the brake fluids in the pressurizing chambers R3, R4 are pressurized depending on only the operation force is realized in the master cylinder device 702. That is, in the brake devices 56FL, FR, a state in which the hydraulic brake force with a magnitude dependent on only the operation force is realized.

In the master cylinder device 702, the input piston 710 is not fitted to the first pressurizing piston 706 with any seal. Therefore, even when the first pressurizing piston 706 is moved by the pressure of the brake fluid in the input chamber R55, no force resulting from any friction force of any seal acts on the input piston 710. In addition, each of the high-pressure seals 746, 748 between the first pressurizing piston 706 and the housing 704 causes a comparatively large friction force upon a movement of the first pressurizing piston 706, whereas each of the seals 750, 752 between the input piston 710 and the housing 704 causes a comparatively small friction force upon a movement of the input piston 710. Therefore, in the master cylinder device 702, operational feeling in a brake operation is excellent. Especially in the operation-force dependent pressurizing state, it is possible to provide excellent operational feeling.

Seventh Embodiment

Figure 10:
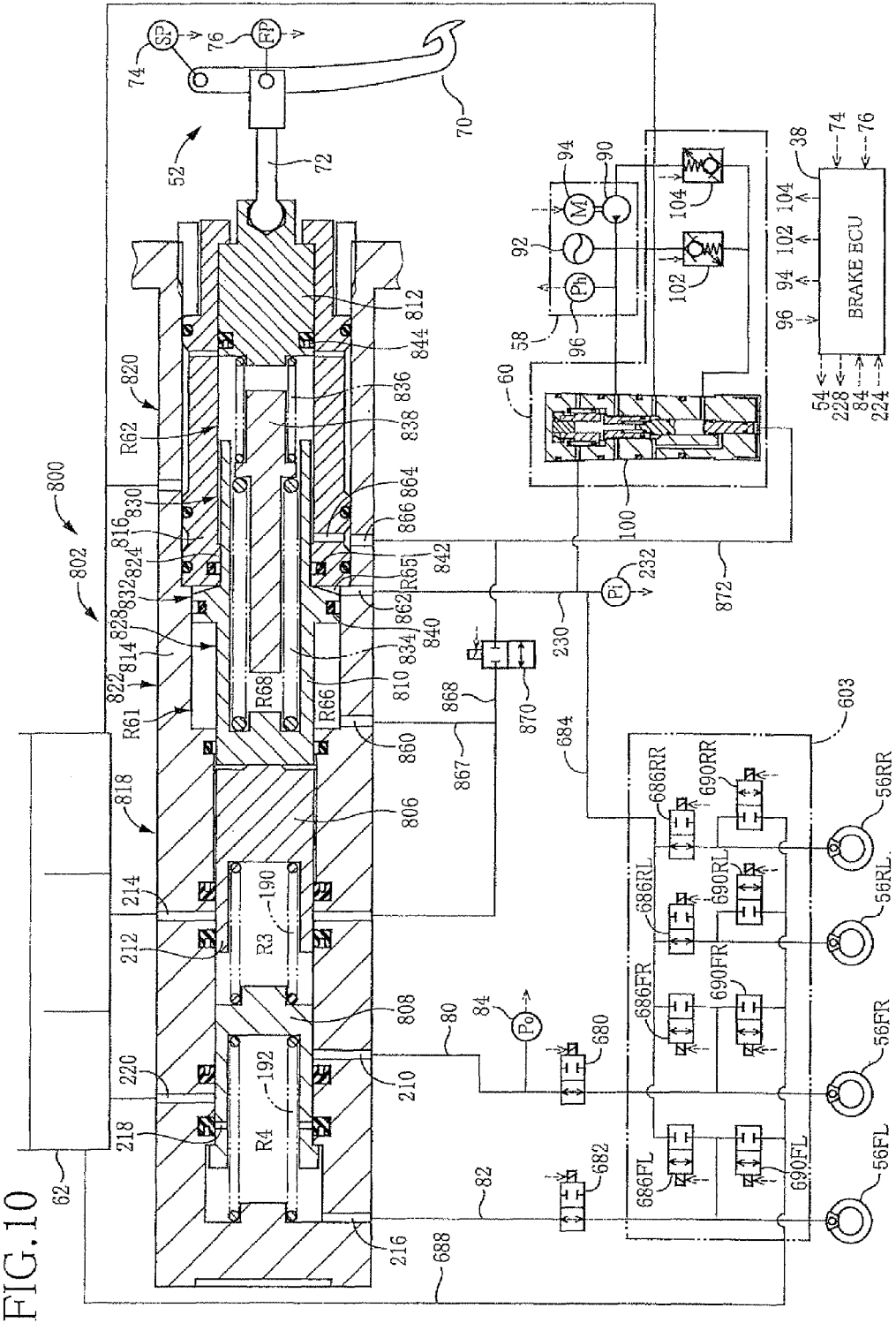
FIG. 10 is a view of a hydraulic brake system including the master cylinder device of a seventh embodiment.

FIG. 10 schematically represents a hydraulic brake system 800 of the seventh embodiment. The hydraulic brake system 800 has a master cylinder device 802 and an antilock device 603. The hydraulic brake system 800 generally has the same structure as any one of the hydraulic brake systems of the first through sixth embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 802 is categorized into the Master-Cut System Adoptable Type Master Cylinder Device, and has a housing 804 being a casing, a first pressurizing piston 806 and a second pressurizing piston 808 which pressurize the brake fluid to be supplied to the brake devices 56, an intermediate piston 810 which can move forward by the brake fluid introduced from the high pressure source device 58, and an input piston 812 to which an operation of the driver is inputted via the operation device 52.

The housing 804 mainly includes two members, specifically, a first housing member 814 and a second housing member 816. The first housing member 814 has a roughly hollow cylindrical shape whose front end is closed, and is sectioned into three portions having mutually different inner diameters, specifically, a front small-diameter portion 818 arranged in a front side and having a small inner diameter, a rear large-diameter portion 820 arranged in a rear side and having a large inner diameter, and an intermediate portion 822 arranged between the above two portions and having an inner diameter of a medium size between the above two inner diameters. The second housing member 816 has a roughly hollow cylindrical shape whose front end has an inner flange 824.

An interior of the housing 804 constructed thus is separated by the inner flange 824 of the second housing member 816 to define a front side chamber R61 located in a front side and a rear side chamber R62 located in a rear side. That is, the inner flange 824 serves as a partition portion separating the interior of the housing 804, and an inner periphery portion of the inner flange 824 serves as an opening through the partition portion.

Each of the first pressurizing piston 806 and the second pressurizing piston 808 has a hollow cylindrical shape whose rear end portion is closed, and is slidably fitted with seals in the small-inner-diameter portion 818 of the first housing member 814 in the front side chamber R61. The intermediate piston 810 includes a front side portion 828 having a hollow cylindrical shape whose front side is closed, a rear side portion 830 located in the rear of the front side portion 828 and having a hollow cylindrical shape, and an intermediate portion 832 located between the front side portion 828 and the rear side portion 830 and having a flange shape. In other words, the intermediate piston 810 has a blind hole which is formed inside the front side portion 828 and the rear side portion 830 and which is open rearward. The intermediate piston 810 is fitted in the housing 804 with seals such that the front side portion 828 contacts with the front small-diameter portion 818 of the first housing member 814, the intermediate portion 832 contacts with the intermediate portion 822 of the first housing member 814, and the rear side portion 830 contacts with the inner periphery portion of the inner flange 824 of the second housing member 816. That is, in the intermediate piston 810, the front side portion 828 and the intermediate portion 832 serves as a main body portion disposed in the front side chamber R61, and the rear side portion 830 serves as an extension portion extending through the inner flange 824 into the rear side chamber R62. In addition, the first pressurizing piston 806 and the intermediate piston 810 are disposed such that there is hardly a clearance between a rear end face of the first pressurizing piston 806 and a front end face of the intermediate piston 810 in no brake operation.

The input piston 812 has a roughly a pillar shape and is connected, at a rear end thereof, to the operation rod 72. the input piston 812 is fitted in the second housing member 816 with a seal. Additionally, between a bottom face of the rearward-opening blind hole of the intermediate piston 810 and a front end face of the input piston 812, two compression coil springs 834, 836 each of which generates an elastic reaction force in a direction of separating the intermediate piston 810 and the input piston 812 are disposed in series in the front-back direction. It is noted that the spring constant of the spring 836 is smaller than the spring constant of the spring 834. Additionally, between the springs 834, 836, a floating seat 838 is disposed while supported by them.

In the master cylinder device 802 constructed thus, between a rear end of the intermediate portion 832 of the intermediate piston 810 and the second housing member 816, there is defined a fluid chamber R65 into which the brake fluid from the high pressure source device 58 is inputted. This fluid chamber R65 is referred to as an "input chamber", where appropriate. It is noted that the input chamber R65 is illustrated in an almost squeezed state in FIG. 10. Additionally, between an inner circumferential face of the intermediate portion 822 of the first housing member 814 in front of the intermediate portion 832 and an outer circumferential face of the front side portion 828 of the intermediate piston 810, as described below, there is defined an annular fluid chamber R66 communicating with the reservoir 62. Hereinafter, this chamber is referred to as a "breathing chamber", where appropriate. Furthermore, between the bottom face of the rearward-open blind hole of the intermediate piston 810 and the input piston 812, there is formed an inter-piston chamber R68 across which the intermediate piston 810 and the input piston 812 face to each other.

In the master cylinder device 802 in which each of the chambers is defined thus, the input chamber R65 is defined by that the intermediate piston 810 contacts with the intermediate portion 822 of the first housing member 814 via a seal 840 embedded in an outer circumferential face of the intermediate portion 832 and contacts with an inner circumferential face of the second housing member 816 via a seal 842 embedded in the inner circumferential face. By the way, the input piston 812 slidably contacts with an inner circumferential face of the second housing member 816, and a seal 844 is embedded in an outer circumferential face of the input piston 812. It is noted that a high-pressure seal is employed as each of the seals 840, 842 but not employed as the seal 844.

Additionally, in the first housing member 814, there are provided a communication hole 860 whose one end is open to the breathing chamber R66 and whose other end is open to the exterior, and a communication hole 862 whose one end is open to the input chamber R65 and whose other end is open to the exterior. In the second housing member 816, there is provided a communication hole 864 whose one end is open to the inter-piston chamber R68. Additionally, in the first housing member 814, there is provided a communication hole 866 whose one end is open so as to face the other end of the communication hole 864 and whose other end is open to the exterior. That is, the inter-piston chamber R68 communicates with the exterior.

In the master cylinder device 802 in which the communication holes are formed thus, to the communication hole 862, an input pressure passage 230 whose one end is connected to the third fluid chamber 134 of the pressure adjusting valve device 100 is connected at the other end thereof. Additionally, a pressure intensifying communication passage 684 diverging from the input pressure passage 230 for supplying the pressure-adjusted brake fluid to the brake devices 56 is connected to the antilock device 603. To the communication hole 860, a low pressure passage 867 communicating with the reservoir 62 via the communication hole 214 is connected. That is, the breathing chamber R66 is maintained at the atmospheric pressure at all times. Additionally, to the communication hole 866, an external communication passage 868 diverging from the low pressure passage 867 is connected, and an electromagnetic open/close valve 870 which is a normally-closed valve is provided on the external communication passage 868. Moreover, a communication passage 872 diverging from between the end connected to the communication hole 866 and the open/close valve 870 in the external communication passage 868 is connected to the first fluid chamber of the pressure adjusting valve device 100 of the pressure-intensifying/reducing device 60. That is, in the hydraulic brake system 800, the pressure adjusting valve device 100 can be activated by utilizing, as the pilot pressure, not the master pressure but the pressure of the brake fluid in the inter-piston chamber R68.

<<Actuation of Hydraulic Brake System>>

In the hydraulic brake system 800, when the open/close valve 870 is opened, the input piston 812 can move forward according to an increase of the brake operation amount with the brake fluid in the inter-piston chamber R68 being flowed into the reservoir 62 through the communication holes 864, 866 and the external communication passage 868. Upon the forward movement, the elastic reaction forces by the springs 834, 836 increase, a forward bias force acts on the intermediate piston 810. That is, it is possible to move the first pressurizing piston 806 forward by the operation force. In addition, when the open/close valve 870 is closed, the inter-piston chamber R68 is hermetically closed, and the operation force is transmitted via a brake fluid in the inter-piston chamber R68 to the first pressurizing piston 806, whereby the first pressurizing piston 806 can be moved forward by the operation force. That is, in the master cylinder device 802, a mechanism including the external communication passage 868 and the open/close valve 870 constitutes an inter-piston-chamber hermetically closing mechanism which can hermetically close the inter-piston chamber R68. Also, this inter-piston-chamber hermetically closing mechanism can be considered as an input-piston-relative-forward-movement prohibiting mechanism which prohibits a relative forward movement of the input piston 812 relative to the intermediate piston 810. That is, the first pressurizing piston 806 can be considered a pressure receiving piston which pressurizes the brake fluid to be supplied to the brake devices 56 by receiving the operation force or the pressure of the brake fluid supplied to the input chamber R65. Accordingly, the master cylinder device 802 of the hydraulic brake system 800 is configured to realize the operation-force/high-pressure-source-pressure dependent pressurizing state at all times.

In this hydraulic brake system 800, master-cut valves 680, 682 are energized to be closed in the normal condition. Accordingly, the brake fluid is not supplied from the master cylinder device 802 to the brake device 58 in the normal condition. Meanwhile, the pressure-intensifying open/close valve 686 is opened, thus the pressure-intensified brake fluid is supplied to the brake device 58 through the pressure intensifying communication passage 684. Accordingly, in the brake device 58, a state in which the hydraulic brake force with a magnitude dependent on the high-pressure-source pressure is generated is realized in the normal condition. Incidentally, since the open/close valve 870 is energized to be opened in the normal condition, the input piston 812 moves forward relative to the intermediate piston 810 by the brake operation, and then the springs 834, 836 generate the elastic reaction forces according to an amount of the forward movement. Therefore, a rearward bias force is applied to the input piston 812. That is, in the master cylinder device 802, a mechanism including the springs 834, 836 constitutes a reaction force applying mechanism which applies an operation reaction force against the brake operation to the input piston 812. Additionally, since the spring constants of the springs 834, 836 are different from each other as described above, the master cylinder device 802 is configured such that, as the operation amount of the brake pedal 70 increases, a ratio of increase of the operation reaction force increases.

In the large-brake-force-required condition, the master-cut valves 680, 682 are de-energized to be opened and the pressure-intensifying open/close valves 686FL, FR are de-energized to be closed in the hydraulic brake system 800. Therefore, the brake fluid is supplied to the brake devices 56FL, FR from the master cylinder device 802 in the operation-force/ high-pressure-source-pressure dependent pressurizing state, and the supply of the brake fluid from the pressure adjusting valve device 100 is shut off. That is, in the brake devices 56FL, FR, a state in which the hydraulic brake force with a magnitude dependent on the high-pressure-source pressure plus a hydraulic brake force with a magnitude dependent on the operation force is generated is realized in the large-brake-force-required condition. In the large-brake-force-required condition, the open/close valve 870 is also de-energized to be closed, thereby hermetically closing the inter-piston chamber R68. Therefore, the brake operation force by the driver is transmitted to the intermediate piston 810 and the first pressurizing piston 806 without moving forward the input piston 812 relative to the first pressurizing piston 810, that is, without generating an ineffective brake operation amount. Since the pressure of the brake fluids in the pressurizing chambers R3, R4 is transmitted to the input piston 812 in the operation-force/high-pressure-source-pressure dependent pressurizing state, the driver can feel a rearward bias force generated by the pressure as the operation reaction force.

In a condition in which electric power is not supplied to the hydraulic brake system 800 due to an electric failure, each of the master-cut valves 680, 682, the pressure-intensifying open/close valves 686FL, FR, and the open/close valve 870 is de-energized to come into the same open/close state as in the large-brake-force-required condition. However, in a case in which the brake fluid is not supplied from the high pressure source device 58 to the master cylinder device 802 due to an electric failure, an "operation-force dependent pressurizing state", that is, a state in which the brake fluids in the pressurizing chambers R3, R4 are pressurized dependent on only the operation force is realized in the master cylinder device 802. That is, in the brake devices 56FL, FR, a state in which the hydraulic brake force with a magnitude dependent on only the operation force is realized. That is, in the hydraulic brake system 800, when an electric failure etc. occurs, the pressure adjusting valve device 100 can be activated by utilizing the pressure of the brake fluid in the inter-piston chamber R68 as the pilot pressure. Therefore, unlike utilizing, as the pilot pressure, the master pressure which is affected by a friction force etc. upon a movement of the first pressurizing piston 806, the activation of the pressure adjusting valve device 100 is comparatively favorable in an ability of following a change of brake operation.

In the master cylinder device 802, the input piston 812 is not fitted to the intermediate piston 810 with any seal. Therefore, even when the intermediate piston 810 is moved by the pressure of the brake fluid in the input chamber R65, no force resulting from any friction force of any seal acts on the input piston 812. In addition, each of the high-pressure seals 840, 842 between the intermediate piston 810 and the housing 804 causes a comparatively large friction force upon a movement of the intermediate piston 810, whereas the seal 844 between the input piston 812 and the housing 804 causes a comparatively small friction force upon a movement of the input piston 812. Therefore, in the master cylinder device 802, operational feeling in a brake operation is excellent. Especially in the operation-force dependent pressurizing state, it is possible to provide excellent operational feeling.

Eighth Embodiment

Figure 11:
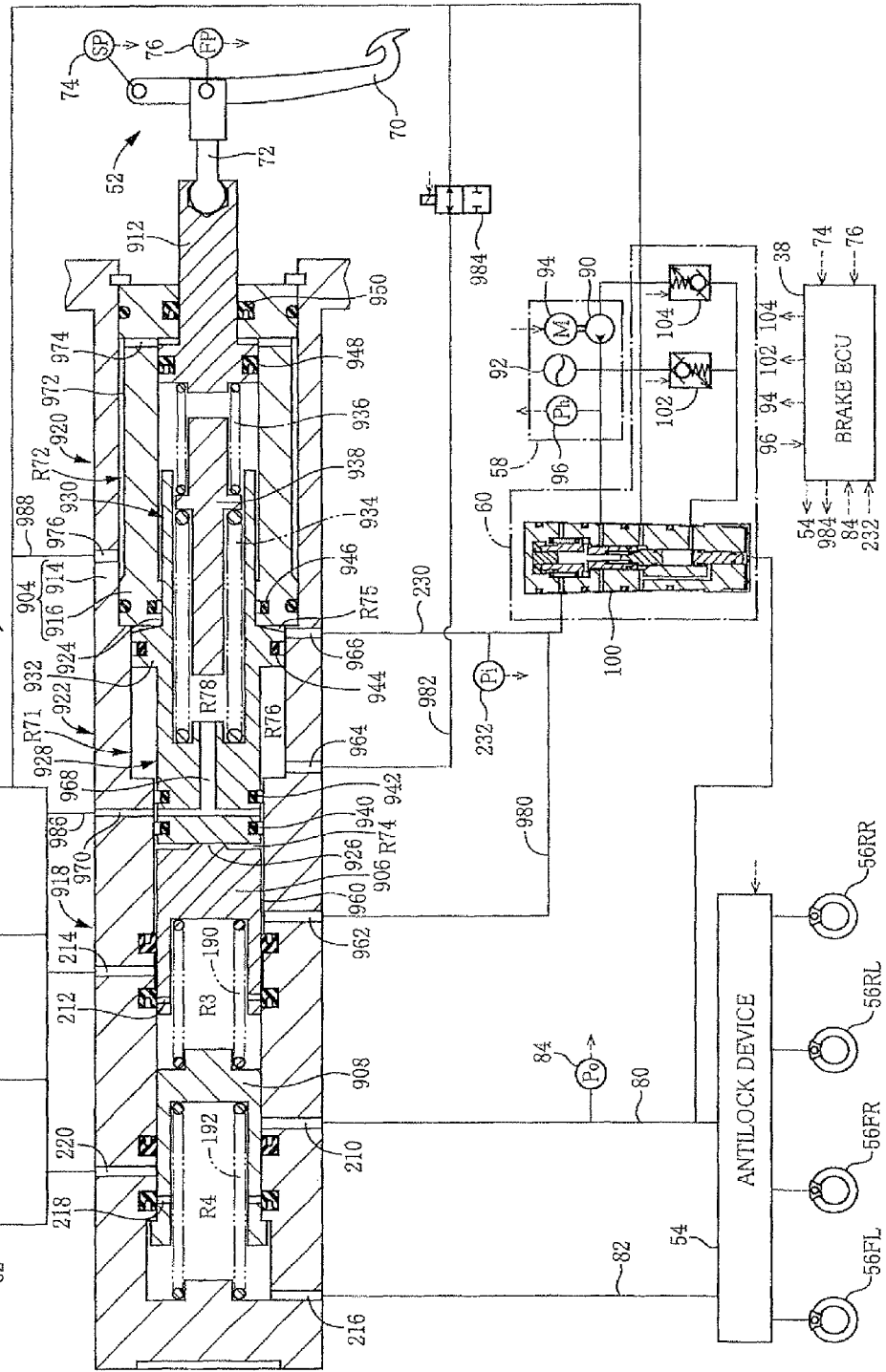
FIG. 11 is a view of a hydraulic brake system including the master cylinder device of a eighth embodiment.

FIG. 11 schematically represents a hydraulic brake system 900 of the eighth embodiment. The hydraulic brake system 900 has a master cylinder device 902 and an antilock device 54. The hydraulic brake system 900 generally has the same structure as any one of the hydraulic brake systems of the first through seventh embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 902 is categorized into the Pressure Receiving Piston Lock Type Master Cylinder Device, and has a housing 904 being a casing, a first pressurizing piston 906 and a second pressurizing piston 908 which pressurize the brake fluid to be supplied to the brake devices 56, an intermediate piston 910 which can move forward by the brake fluid introduced from the high pressure source device 58, and an input piston 912 to which an operation of the driver is inputted via the operation device 52.

The housing 904 mainly includes two members, specifically, a first housing member 914 and a second housing member 916. The first housing member 914 has a roughly hollow cylindrical shape whose front end is closed, and is sectioned into three portions having mutually different inner diameters, specifically, a front small-diameter portion 918 arranged in a front side and having a small inner diameter, a rear large-diameter portion 920 arranged in a rear side and having a large inner diameter, and an intermediate portion 922 arranged between the above two portions and having an inner diameter of a medium size between the above two inner diameters. The second housing member 916 has a roughly hollow cylindrical shape whose front end has an inner flange 924. The first housing member 914 and the second housing member 916 are united in a state in which a front end face of the second housing member 916 abuts on a stepping face between the intermediate portion 922 and the rear large-diameter portion 920 of the first housing member 914.

An interior of the housing 904 constructed thus is separated by the inner flange 924 of the second housing member 916 to define a front side chamber R71 located in a front side and a rear side chamber R72 located in a rear side. That is, the inner flange 924 serves as a partition portion separating the interior of the housing 904, and an inner periphery portion 924 serves as an opening through the partition portion.

Each of the first pressurizing piston 906 and the second pressurizing piston 908 has a hollow cylindrical shape whose rear end portion is closed, and is slidably fitted with seals in the small-inner-diameter portion 918 of the first housing member 914 in the front side chamber R71. The intermediate piston 910 roughly has a hollow cylindrical shape whose front end portion is closed, that is, a shape having a blind hole being open rearward, and is sectioned into a front side portion 928 arranged in a front side and a rear side portion 930 arranged in a rear side. In addition, a flange 932 is formed on a rear end of the front side portion 928. The intermediate piston 910 is fitted in the housing 904 with seals such that the front side portion 928 contacts with the front small-diameter portion 918 of the first housing member 914, the flange 932 contacts with the intermediate portion 922 of the first housing member 914, and the rear side portion 930 contacts with the inner periphery portion of the inner flange 924 of the second housing member 916. That is, in the intermediate piston 910, the front side portion 928 is considered a main body portion disposed in the front side chamber R71, while the rear side portion 930 can be considered an extension portion extending through the opening defined by the inner flange 924 into the rear side chamber R72. In addition, the first pressurizing piston 906 and the intermediate piston 910 are disposed such that a front end face of the intermediate piston 910 abuts on a rear end face of the first pressurizing piston 906 in no brake operation.

The input piston 912 has a roughly a solid cylindrical shape having a stepping portion due to a difference of an outer diameter thereof, and is connected, at a rear end thereof, to an operation rod 72. The input piston 912 is fitted in the rear side chamber R72, that is, the second housing member 916 with seals. Additionally, between a bottom face of the rearward-opening blind hole of the intermediate piston 910 and a front end face of the input piston 912, two compression coil springs 934, 936 each of which generates an elastic reaction force in a direction of separating the intermediate piston 910 and the input piston 912 are disposed in series in the front-back direction. It is noted that the spring constant of the spring 936 is smaller than the spring constant of the spring 934. Additionally, between the springs 934, 936, a floating seat 938 is disposed such that it is supported by them.

In the master cylinder device 902 constructed thus, between the rear end face of the first pressurizing portion 906 and the front end face of the intermediate piston 910, there is defined a fluid chamber R74 into which the brake fluid from the high pressure source device 58 is inputted. This fluid chamber R74 is referred to as a "first input chamber", where appropriate. Also, between a rear end of the front side portion 928 of the intermediate piston 910 and the inner flange 924 of the second housing member 916, there is defined a fluid chamber R75 into which the brake fluid from the high pressure source device 58 is inputted. This fluid chamber R75 is referred to as a "second input chamber", where appropriate. It is noted that each of the input chambers R74, R75 is illustrated in an almost squeezed state in FIG. 11. Additionally, between an inner circumferential face of the intermediate portion 922 of the first housing member 914 in front of the flange 932 and an outer circumferential face of the front side portion 928 of the intermediate piston 910, as described below, there is defined an annular fluid chamber R76 which opposes the second input chamber R75 with the flange 932 being interposed between the fluid chamber R76 and the second input chamber and which can communicate with the reservoir 62. Hereinafter, this chamber is referred to as an "opposing chamber", where appropriate. Additionally, in the intermediate piston 910, a pressurized area on which a pressure of a brake fluid in the first input chamber R74 acts, namely, an area of a front end face of the front side portion 928, and a pressurized area on which a pressure of a brake fluid in the second input chamber R75 acts, namely, an area of a rear end face of the flange 932 are equal. Furthermore, between the bottom face of the rearward-open blind hole of the intermediate piston 910 and a front end face of the input piston 912, there is formed an inter-piston chamber R78 across which the intermediate piston 910 and the input piston 912 face to each other.

In the master cylinder device 902 in which each of the chambers is defined thus, the intermediate piston 910 contacts with the front side portion 918 of the first housing member 914 via seals 940, 942 embedded in the front side portion 928. Additionally, the second input chamber R75 is defined by that the intermediate piston 910 contacts with the intermediate portion 922 of the first housing member 914 via a seal 944 embedded in an outer circumferential face of the flange 932 and contacts with an inner circumferential face of the inner flange 924 of the second housing member 916 via a seal 946 embedded in the inner circumferential face. In addition, the input piston 912 slidably contacts with an inner circumferential face of the second housing member 916. Therefore, a seal 948 is embedded in an outer circumferential face of the input piston 912, and a seal 950 is embedded in a rear end portion of the second housing member 916. It is noted that a high-pressure seal is employed as each of the seals 944, 946 but not employed as each of the seals 948, 950.

Between an outer circumferential face of the first pressurizing piston 906 and the inner circumferential face of the front small-diameter portion 918 of the first housing member 914, there is provided a fluid passage 960 having a certain cross section area through which the brake fluid can flow and connected to the first input chamber R74. In the first housing member 914, there is provided a communication hole 962 whose one end is open to the fluid passage 960 and whose other end is open to the exterior. That is, the first input chamber R74 communicates with the exterior. Additionally, in the first housing member 914, there are provided a communication hole 964 whose one end is open to the opposing chamber R76 and whose other end is open to the exterior, and a communication hole 966 whose one end is open to the second input chamber R75 and whose other end is open to the exterior. In the intermediate piston 910, there is provided a communication hole 968 whose one end is open to the inter-piston chamber R78 and whose other end is open between the seal 940 and the seal 942. Additionally, in the first housing member 914, there is provided a communication hole 970 whose one end is open so as to face the other end of the communication hole 968 and whose other end is open to the exterior. Accordingly, the inter-piston chamber R78 can communicate with the exterior. Since an outer diameter of a part of the second housing member 916 is slightly smaller than an inner diameter of the rear large-diameter portion 920 of the first housing member 914, there is defined a fluid passage 972 having a certain cross section area through which the brake fluid can flow. In the second housing member 916, there is provided a communication hole 974 whose one end is open to the fluid passage 972 and whose other end is open in the rear of the stepping portion of the input piston 912. In the first housing member 914, there is provided a communication hole 976 whose one end is open to the fluid passage 972 and whose other end is open to the exterior.

In the master cylinder device 902 in which the fluid passages and the communication holes are formed thus, to the communication hole 966, an input pressure passage 230 whose one end is connected to the third fluid chamber 134 of the pressure adjusting valve device 100 is connected at the other end thereof. Also, an input pressure passage 980 diverging from an input pressure passage 230 is connected to the communication hole 962. To the communication hole 964, a low pressure passage 982 communicating with the reservoir 62 is connected, and an electromagnetic open/close valve 984 which is a normally-opened valve is provided on the low pressure passage 982. Therefore, the opposing chamber R76 can communicate with the reservoir 62, thus a mechanism including the open/close valve 984 and the low pressure passage 982 constitutes a low-pressure-source communication mechanism which allows the opposing chamber R76 to communicate with the reservoir 62. Also, an external communication passage 986 communicating with the reservoir 62 is connected to the communication hole 970. Moreover, an external communication passage 988 communicating with the reservoir 62 is connected to the communication hole 976. Accordingly, a space in the rear of the stepping portion of the input piston 912 is maintained at the atmospheric pressure at all times <<Actuation of Hydraulic Brake System>>

As described above, in the intermediate piston 910, since the pressurized area on which the pressure of the brake fluid in the first input chamber R74 acts and the pressurized area on which the pressure of a brake fluid in the second input chamber R75 acts are almost equal, no movement of the intermediate piston 910, or a slight movement if any, occurs depending on the pressures of the brake fluids in the first input chamber R74 and the second input chamber R75. Additionally, in the normal condition, since the open/close valve 984 is closed to hermetically close the opposing chamber R76, a forward movement of the intermediate piston 910 is prohibited. When a brake operation is performed, the input piston 912 can move forward with the brake fluid in the inter-piston chamber R78 being flowed into the reservoir 62 through the communication holes 968, 970 and the external communication passage 986. That is, in the normal condition, a relative forward movement of the input piston 912 to the intermediate piston 910 is allowed. By the way, a mechanism including the springs 934, 936 serves as a reaction force applying mechanism which applies the operation reaction force to a driver by an increase of the elastic reaction force due to the relative forward movement. Additionally, since the spring constants of the springs 934, 936 are different from each other as described above, the master cylinder device 902 is configured such that, as the operation amount of the brake pedal 70 increases, a ratio of increase of the operation reaction force increases. Meanwhile, in the normal condition, the first pressurizing piston 906 is moved forward depending on the pressure of the brake fluid in the first pressurizing piston R74. That is, in the normal condition, a high-pressure-source-pressure dependent pressurizing state in which the brake fluid in the pressurizing chambers R3, R4 can be pressurized depending on only the pressure of the brake fluid in the first input chamber R74 is realized. So to say, in the master cylinder device 902, the high-pressure-source-pressure dependent pressurizing state is realized by fixing (locking) the intermediate piston 910.

In the large-brake-force-required condition, the open/close valve 984 is de-energized to be opened, thereby allowing the forward movement of the intermediate piston 910. Accordingly, the intermediate piston 910 can move forward by a force according to the pressure of the brake fluid supplied to the second input chamber R75. Since the intermediate piston 910 abuts on the first pressurizing piston 906, the intermediate piston 910 moves the pressurizing pistons 906, 908 forward to pressurize the brake fluid to be supplied to the brake devices 56. In addition, since a forward bias force acts on the intermediate piston 910 due to the elastic reaction forces by the springs 934, 936 on a brake operation, the intermediate piston 910 is moved by the operation force as well. That is, the pressurizing pistons 906, 908 can move forward depending on not only the pressure of the brake fluid in the second input chamber R75 but also the operation force, whereby the brake fluids in the pressurizing chambers R3, R4 are pressurized. Accordingly, in the master cylinder device 902, the operation-force/high-pressure-source-pressure dependent pressurizing state is realized in the large-brake-force-required condition. Therefore, the intermediate piston 910 can be considered a pressure receiving piston which pressurizes the brake fluid to be supplied to the brake devices 56 by receiving the operation force or the pressure of the brake fluid supplied to the second input chamber R75.

Additionally, the seal 942 disposed behind the communication hole 968 formed in the intermediate piston 910 is moved forward by the forward movement of the intermediate piston 910, and then goes beyond the opening of the communication hole 970 formed in the first housing member 914, whereby the communication between the communication hole 968 and the communication hole 970 is shut off. Accordingly, the inter-piston chamber R78 is hermetically closed, and then the operation force can be transmitted, via the brake fluid in the inter-piston chamber R78, to the first pressurizing piston 906. That is, in the master cylinder device 902, a mechanism including the communication holes 968, 970 constitutes an inter-piston-chamber hermetically closing mechanism which can hermetically close the inter-piston chamber R78. Also, this inter-piston-chamber hermetically closing mechanism can be considered as an input-piston-relative-forward-movement prohibiting mechanism which prohibits a relative forward movement of the input piston 912 relative to the intermediate piston 910. Therefore, the brake operation force by the driver is transmitted to the intermediate piston 910 and the first pressurizing piston 906 without generating an ineffective brake operation amount. Incidentally, in the operation-force/high-pressure-source-pressure dependent pressurizing state, since the pressure of the brake fluids in the pressurizing chambers R3, R4 is transmitted to the input piston 912, the driver can feel the rearward bias force generated by the pressure as the operation reaction force.

In a condition in which electric power is not supplied to the hydraulic brake system 900 due to an electric failure, since the open/close valve 984 is de-energized to be opened, the forward movement of the intermediate piston 910 is allowed as in the large-brake-force-required condition, whereby the pressurizing pistons 906, 908 can be moved forward by the operation force. That is, in the master cylinder device 902, it is possible to pressurize the brake fluids in the pressurizing chambers R3, R4 depending on only the operation force so as to supply the brake fluid to the brake devices 56FL, 56FR. That is, in the master cylinder device 902, the operation-force dependent pressurizing state is realized. Incidentally, when the pressure-intensified brake fluid is stored in the accumulator 92 of the high pressure source device 58, the pressure of the pressure-intensified brake fluid assists the pressurizing of the brake fluids in the pressurizing chambers R3, R4.

In the master cylinder device 902, the input piston 912 is not fitted to the intermediate piston 910 with any seal. Therefore, even when the intermediate piston 910 is moved by the pressure of the brake fluid in the second input chamber R75, no force resulting from any friction force of any seal acts on the input piston 912. In addition, each of the high-pressure seals 944, 946 between the intermediate piston 910 and the housing 904 causes a comparatively large friction force upon a movement of the intermediate piston 910, whereas each of the seals 948, 950 between the input piston 912 and the housing 904 causes a comparatively small friction force upon a movement of the input piston 912. Therefore, in the master cylinder device 902, operational feeling in a brake operation is excellent especially in the operation-force dependent pressurizing state. So it is possible to provide excellent operational feeling especially in the operation-force dependent pressurizing state.

Ninth Embodiment

Figure 12:
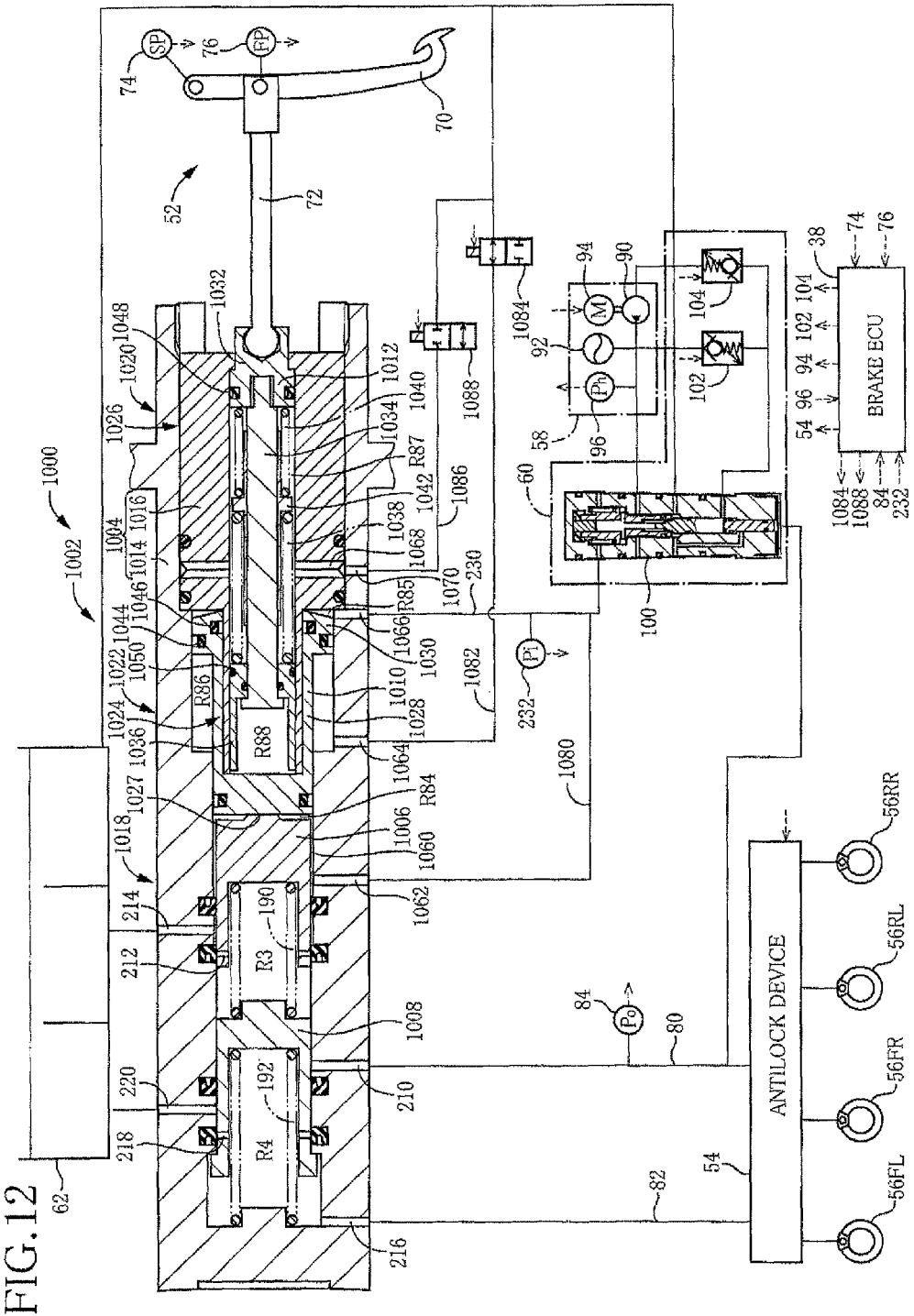
FIG. 12 is a view of a hydraulic brake system including the master cylinder device of a ninth embodiment.

FIG. 12 schematically represents a hydraulic brake system 1000 of the ninth embodiment. The hydraulic brake system 1000 has a master cylinder device 1002 and an antilock device 54. The hydraulic brake system 1000 generally has the same structure as any one of the hydraulic brake systems of the first through eighth embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 1002 is categorized into the Pressure Receiving Piston Lock Type Master Cylinder Device, and has a housing 1004 being a casing, a first pressurizing piston 1006 and a second pressurizing piston 1008 which pressurize the brake fluid to be supplied to the brake devices 56, an intermediate piston 1010 which can move forward by the brake fluid introduced from the high pressure source device 58, and an input piston 1012 to which an operation of the driver is inputted via the operation device 52.

The housing 1004 mainly includes two members, specifically, a first housing member 1014 and a second housing member 1016. The first housing member 1014 has a roughly hollow cylindrical shape whose front end is closed, and is sectioned into three portions having mutually different inner diameters, specifically, a small-diameter portion 1018 arranged in a front side and having a small inner diameter, a large-diameter portion 1020 arranged in a rear side and having a large inner diameter, and an intermediate portion 1022 arranged between the above two portions and having an inner diameter of a medium size between the above two inner diameters. The second housing member 1016 has a roughly hollow cylindrical shape, and is sectioned into two portions having mutually different outer diameters, specifically, a small-outer-diameter portion 1024 arranged in a front side and having a small inner diameter, and a large-outer-diameter portion 1026 arranged in a rear side and having a large inner diameter. The second housing member 1016 is united with the first housing member 1016 in a state in which the second housing member 1016 is inserted in the first housing member 1014 from the rear side.

In the housing 1004 constructed above, a front end portion of the large-outer-diameter portion 1026 of the second housing member 1016 serves an annular separation wall portion projecting to the inside in a radial direction, and the small-outer-diameter portion 1024 serves an inner cylindrical portion extending forward from an inner periphery of the separation wall portion, In other words, in the housing 1004, a partition portion separating an interior of the housing 1004 is formed by the small-outer-diameter portion 1024 and the large-outer-diameter portion 1026 of the second housing member 1016. Therefore, the interior of the housing 1004 is separated into a front side chamber R81 including a space outside the small-outer-diameter portion 1024 and a rear side chamber R82 including an inside space of the small-outer-diameter portion 1024. In addition, a front end of the small-outer-diameter portion 1024 serves as an opening formed in the partition portion.

Each of the first pressurizing piston 1006 and the second pressurizing piston 1008 has a hollow cylindrical shape whose rear end portion is closed, and is slidably fitted with seals in the small-inner-diameter portion 1018 of the first housing member 1014 in the front side chamber R81. The intermediate piston 1010 roughly has a hollow cylindrical shape whose front end portion is closed, that is, a shape having a blind hole being open rearward, and includes a main body portion 1028 having a hollow cylindrical shape. A flange 1030 is formed on an outer periphery of a rear end of the main body portion 1028. The intermediate piston 1010 is fitted with seals in the housing 1004 such that a front portion of the main body portion 1028 slidably contacts with the small-inner-diameter portion 1018 of the first housing member 1014, the flange 1030 slidably contacts with the intermediate portion 1022, and an inner circumferential portion of the main body portion 1028 slidably contacts with the small-outer-diameter portion 1024 of the second housing member 1016. That is, the intermediate piston 1010 is disposed such that the small-outer-diameter portion 1024 of the second housing member 1016 is inserted in the main body portion 1028, in other words, such that the main body portion 1028 is interposed between the intermediate portion 1022 of the first housing member 1014 and the small-outer-diameter portion 1024 of the second housing member 1016. So to speak, the intermediate portion 1022 of the first housing member 1014 can be considered to be an outer cylindrical portion of the housing 1004. In addition, the first pressurizing piston 1006 and the intermediate piston 1010 are disposed such that a front end face of the intermediate piston 1010 abuts on a rear end face of the first pressurizing piston 1006 in no brake operation.

The input piston 1012 includes a base end portion 1032 to which the operation rod 72 is connected, a rod portion 1034 screwed in the base end portion 1032 and extending forward from the base end portion 1032, and a movable portion 1036 slidably fitted to the rod portion 1034. In the input piston 1012, a rearward movement of the movable portion 1036 relative to the base end portion 1032, in other words, a shrink of the input piston 1012 is allowed. Additionally, between the base end portion 1032 and the movable portion 1036, two compression coil springs 1038, 1040 each of which generates an elastic reaction force for biasing the movable portion 1036 forward are disposed in series in the front-back direction. It is noted that the spring constant of the spring 1040 is smaller than the spring constant of the spring 1038. Additionally, between the springs 1038, 1040, a floating seat 1042 is disposed such that it is supported by them and the rod portion 1034 passes through the floating seat 1042. Incidentally, a flange is provided on an outer periphery of a front end portion of the rod portion 1034, and the flange prevents the movable portion 1036 from coming out forward from the rod portion 1034. The input piston 1012 is fitted with seals in an inside of the second housing member 1016 with the movable portion 1036 being inserted in the small-outer-diameter portion 1024 of the second housing member 1016. That is, the input piston 1012 is disposed such that the front side thereof is located in the main body portion 1028 of the intermediate piston 1010. Accordingly, in the master cylinder device 1002, since a part of the intermediate piston 1010 and a part of the input piston 1012 overlap with each other in the front-back direction, the entire length of the master cylinder device 1002 is comparatively short.

In the master cylinder device 1002 constructed thus, between the rear end face of the first pressurizing portion 1006 and the front end face of the intermediate piston 1010, there is defined a fluid chamber R84 into which the brake fluid from the high pressure source device 58 is inputted. This fluid chamber R84 is referred to as a "first input chamber", where appropriate. Also, between a rear end of the flange 1030 of the intermediate piston 1010 and a stepping face, which is formed between the small-outer-diameter portion 1024 and the large-outer-diameter portion 1026 of the second housing member 1016, there is defined another fluid chamber R85 into which the brake fluid from the high pressure source device 58 is inputted. This fluid chamber R85 is referred to as a "second input chamber", where appropriate. It is noted that each of the input chambers R84, R85 is illustrated in an almost squeezed state in FIG. 12. Additionally, between an inner circumferential face of the intermediate portion 1022 of the first housing member 1014 in front of the flange 1030 and an outer circumferential face of the front side portion 1028 of the intermediate piston 1010, as described below, there is defined an annular fluid chamber R86 which opposes the second input chamber with the flange 1030 being interposed between the fluid chamber R86 and the second input chamber and which can communicate with the reservoir 62. Hereinafter, this chamber is referred to as an "opposing chamber", where appropriate. Additionally, in the intermediate piston 1010, a pressurized area on which a pressure of a brake fluid in the first input chamber R84 acts, namely, an area of a front end face of the front side portion 1028, and a pressurized area on which a pressure of a brake fluid in the second input chamber R85 acts, namely, an area of a rear end face of the flange 1030 are equal. Moreover, inside the input piston 1012, a fluid chamber (hereinafter, referred to as an "internal chamber", where appropriate) R87 for allowing a shrink of the input piston 1012 is defined between the base end portion 1032 and the movable portion 1036. Furthermore, between the bottom face of the rearward-open blind hole of the intermediate piston 1010 and a forward-facing face of the input piston 1012, there is formed an inter-piston chamber R88 across which the intermediate piston 1010 and the input piston 1012 face to each other.

In the master cylinder device 1002 in which each of the chambers is defined thus, the second input chamber R85 is defined by that the intermediate piston 1010 contacts with an inner circumferential face of the intermediate portion 1022 of the first housing member 1014 via a seal 1044 embedded in an outer circumferential face of the flange 1030 and contacts with an outer circumferential face of the small-outer-diameter portion 1024 of the second housing member 1016 via a seal 1046 embedded in an inner circumferential face of the main body portion 1028. In addition, the input piston 1012 slidably contacts with the inner circumferential face of the second housing member 1016. Therefore, a seal 1048 is embedded in an outer circumferential face of the base end portion 1032, and a seal 1050 is embedded in an outer circumferential face of the movable portion 1036. It is noted that a high-pressure seal is employed as each of the seals 1044, 1046 but not employed as each of the seals 1048, 1050.

Between an outer circumferential face of the first pressurizing piston 1006 and an inner circumferential face of the small-inner-diameter portion of the first housing member 1014, there is provided a fluid passage 1060 having a certain cross section area through which the brake fluid can flow and connected to the first input chamber R84. In the first housing member 1014, there is provided a communication hole 1062 whose one end is open to the fluid passage 1060 and whose other end is open to the exterior. That is, the first input chamber R84 communicates with the exterior. Additionally, in the first housing member 1014, there are provided a communication hole 1064 whose one end is open to the opposing chamber R86 and whose other end is open to the exterior, and a communication hole 1066 whose one end is open to the second input chamber R85 and whose other end is open to the exterior. In the second housing member 1016, there is provided a communication hole 1068 whose one end is open to the internal chamber R87. Additionally, in the first housing member 1014, there is provided a communication hole 1070 whose one end is open so as to face the other end of the communication hole 1068 and whose other end is open to the exterior. That is, the internal chamber R87 communicates with the exterior.

In the master cylinder device 1002 in which the fluid passages and the communication holes are formed thus, to the communication hole 1066, an input pressure passage 230 whose one end is connected to the third fluid chamber 134 of the pressure adjusting valve device 100 is connected at the other end thereof. Also, an input pressure passage 1080 diverging from an input pressure passage 230 is connected to the communication hole 1062. To the communication hole 1064, a low pressure passage 1082 communicating with the reservoir 62 is connected, and an electromagnetic open/close valve 1084 which is a normally-opened valve is provided on the low pressure passage 1082. Therefore, the opposing chamber R86 can communicate with the reservoir 62, thus a mechanism including the open/close valve 1084 and the low pressure passage 1082 constitutes a low-pressure-source communication mechanism which allows the opposing chamber R86 to communicate with the reservoir 62. Additionally, to the communication hole 1070, an external communication passage 1086 communicating with the reservoir 62 is connected, and an electromagnetic open/close valve 1088 which is a normally-closed valve is provided on the external communication passage 1086.

<<Actuation of Hydraulic Brake System>>

As described above, in the intermediate piston 1010, since the pressurized area on which the pressure of the brake fluid in the first input chamber R84 acts and the pressurized area on which the pressure of a brake fluid in the second input chamber R85 acts are almost equal, no movement of the intermediate piston 1010, or a slight movement if any, occurs depending on the pressures of the brake fluids in the first input chamber R84 and the second input chamber R85. Additionally, in the normal condition, since the open/close valve 1084 is closed to hermetically close the opposing chamber R86, a forward movement of the intermediate piston 1010 is prohibited. However, in the normal condition, the open/close valve 1088 is opened, whereby the internal chamber R87 communicates with the reservoir 62. Therefore, when a brake operation is performed, the base end portion 1032 and the rod portion 1034 of the input piston 1012 can move forward with the brake fluid in the internal chamber R87 being flowed into the reservoir 62. Accordingly, in the normal condition, a relative forward movement of the input piston 1012 to the intermediate piston 1010 is allowed. Meanwhile, in the normal condition, the first pressurizing piston 1006 is moved forward depending on the pressure of the brake fluid in the first pressurizing piston R84. That is, in the normal condition, a high-pressure-source-pressure dependent pressurizing state in which the brake fluid in the pressurizing chambers R3, R4 can be pressurized depending on only the pressure of the brake fluid in the first input chamber R84 is realized. In this state, even though the rod portion 1034 of the input piston 1012 moves forward, a volume of the brake fluid in the inter-piston chamber R88 cannot change. Therefore, the movable portion 1036 moves rearward by a degree corresponding to the forward movement of the rod portion 1034. Consequently, the elastic reaction forces of the springs 1038, 1040 increase, whereby a driver can feel an increase of the operation reaction force against the increase of the brake operation amount by the driver. That is, a mechanism including the springs 1038, 1040 serves as a reaction force applying mechanism which applies the operation reaction force to a driver. Additionally, since the spring constants of the springs 1038, 1040 are different from each other as described above, the master cylinder device 1002 is configured such that, as the operation amount of the brake pedal 70 increases, a ratio of increase of the operation reaction force increases.

In the large-brake-force-required condition, the open/close valve 1084 is de-energized to be opened, thereby allowing the forward movement of the intermediate piston 1010 in the hydraulic brake system 1000. Accordingly, the intermediate piston 1010 can move forward by a force according to the pressure of the brake fluid in the second input chamber R85. Since the intermediate piston 1010 abuts on the first pressurizing piston 1006, the intermediate piston 1010 moves the pressurizing pistons 1006, 1008 forward to pressurize the brake fluid to be supplied to the brake devices 56. In addition, since a pressure of the brake fluid in the inter-piston chamber R88 increases due to the elastic reaction forces by the springs 1038, 1040, a forward bias force acts on the intermediate piston 1010. Accordingly, the intermediate piston 1010 is moved by the operation force as well. That is, the pressurizing pistons 1006, 1008 can move forward depending on not only the pressure of the brake fluid in the second input chamber R85 but also the operation force, whereby the brake fluids in the pressurizing chambers R3, R4 are pressurized. Accordingly, in the master cylinder device 1002, the operation-force/high-pressure-source-pressure dependent pressurizing state is realized in the large-brake-force-required condition. Therefore, the intermediate piston 1010 can be considered a pressure receiving piston which pressurizes the brake fluid to be supplied to the brake devices 56 by receiving the operation force or the pressure of the brake fluid supplied to the second input chamber R85.

In the large-brake-force-required condition, the open/close valve 1088 is also de-energized to be closed. Accordingly, the internal chamber R87 is hermetically closed, the operation force can be transmitted, via the brake fluid in the internal chamber R87, to the first pressurizing piston 1006. That is, in the master cylinder device 1002, a mechanism including the external communication passage 1086 and the open/close valve 1088 constitutes an input-piston-relative-forward-movement prohibiting mechanism which prohibits the relative forward movement of the input piston 1012 to the intermediate piston 1010. Therefore, the brake operation force by the driver is transmitted to the intermediate piston 1010 and the first pressurizing piston 1006 without generating an ineffective brake operation amount. Incidentally, in the operation-force/high-pressure-source-pressure dependent pressurizing state, since the pressure of the brake fluids in the pressurizing chambers R3, R4 is transmitted to the input piston 1012, the driver can feel the rearward bias force generated by the pressure as the operation reaction force.

In a condition in which electric power is not supplied to the hydraulic brake system 1000 due to an electric failure, since the open/close valve 1084 is de-energized to be opened, the forward movement of the intermediate piston 1010 is allowed as in the large-brake-force-required condition, whereby the pressurizing pistons 1006, 1008 can be moved forward by the operation force. That is, in the master cylinder device 1002, it is possible to pressurize the brake fluids in the pressurizing chambers R3, R4 depending on only the operation force so as to supply the brake fluid to the brake devices 56FL, 56FR. That is, in the master cylinder device 1002, the operation-force dependent pressurizing state is realized. Additionally, in an electric failure, the open/close valve 1088 is de-energized to be closed, thus the internal chamber R87 is hermetically closed. Therefore, the brake operation force by the driver is transmitted to the pressurizing pistons 1006, 1008 without generating an ineffective brake operation amount.

In the master cylinder device 1002, the input piston 1012 is not fitted to the intermediate piston 1010 with any seal. Therefore, even when the intermediate piston 1010 is moved by the pressure of the brake fluid in the second input chamber R85, no force resulting from any friction force of any seal acts on the input piston 1012. In addition, each of the high-pressure seals 1044, 1046 between the intermediate piston 1010 and the housing 1004 causes a comparatively large friction force upon a movement of the intermediate piston 1010, whereas each of the seals 1048, 1050 between the input piston 1012 and the housing 1004 causes a comparatively small friction force upon a movement of the input piston 1012. Therefore, in the master cylinder device 1002, operational feeling in a brake operation is excellent. Especially in the operation-force dependent pressurizing state, it is possible to provide excellent operational feeling.

Tenth Embodiment

Figure 13:
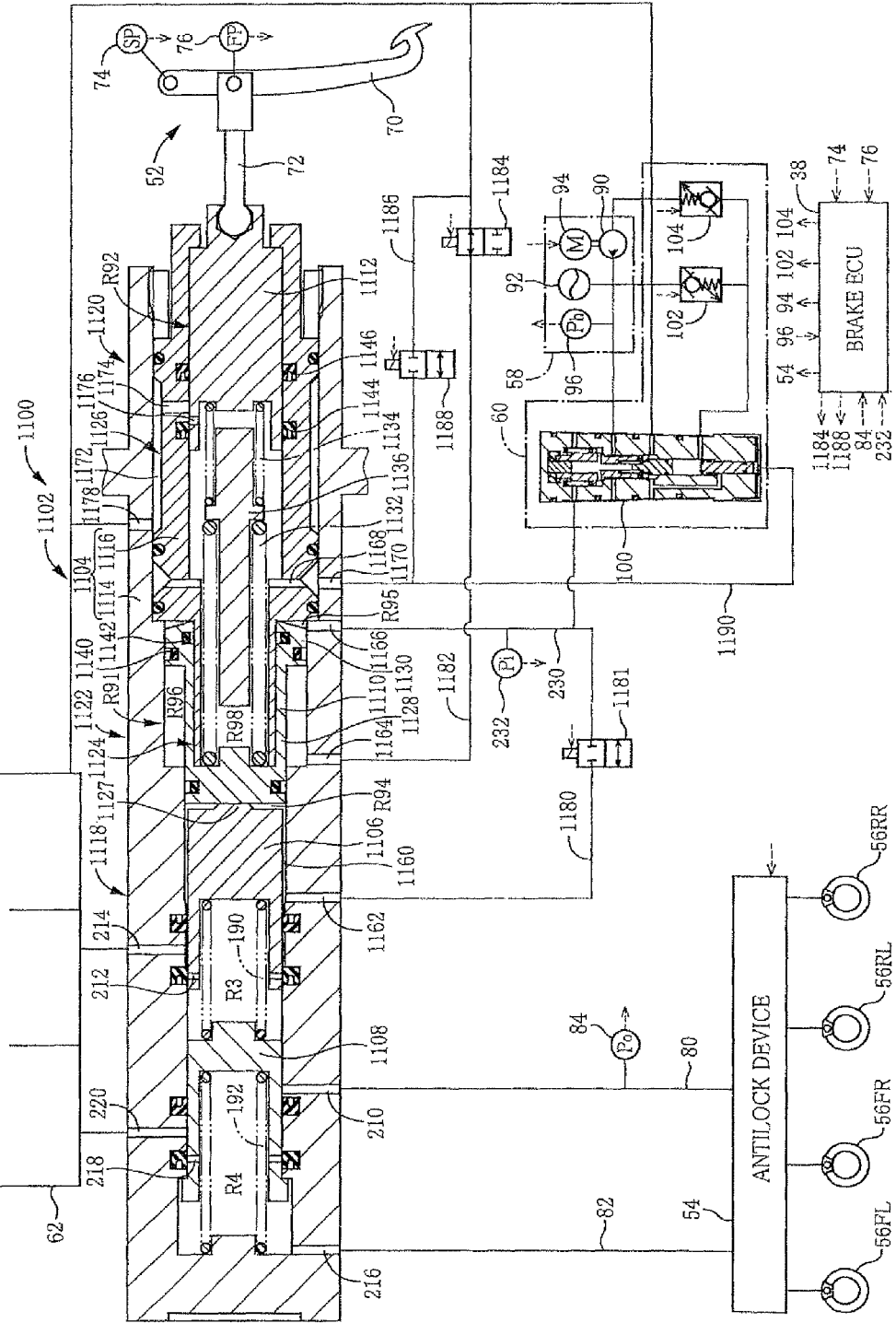
FIG. 13 is a view of a hydraulic brake system including the master cylinder device of a tenth embodiment.

FIG. 13 schematically represents a hydraulic brake system 1100 of the tenth embodiment. The hydraulic brake system 1100 has a master cylinder device 1102 and an antilock device 54. The hydraulic brake system 1100 generally has the same structure as any one of the hydraulic brake systems of the first through ninth embodiments. In the following description, with consideration for abbreviating the explanation, different construction and actuation from the hydraulic brake systems will be described but the same construction and actuation as the hydraulic brake systems are omitted.

<<Structure of Master Cylinder Device>>

The master cylinder device 1102 is categorized into the Pressure Receiving Piston Lock Type Master Cylinder Device, and has a housing 1104 being a casing, a first pressurizing piston 1106 and a second pressurizing piston 1108 which pressurize the brake fluid to be supplied to the brake devices 56, an intermediate piston 1110 which can move forward by the brake fluid introduced from the high pressure source device 58, and an input piston 1112 to which an operation of the driver is inputted via the operation device 52.

The housing 1104 mainly includes two members, specifically, a first housing member 1114 and a second housing member 1116. The first housing member 1114 has a roughly hollow cylindrical shape whose front end is closed, and is sectioned into three portions having mutually different inner diameters, specifically, a small-inner-diameter portion 1118 arranged in a front side and having a small inner diameter, a large-inner-diameter portion 1120 arranged in a rear side and having a large inner diameter, and an intermediate portion 1122 arranged between the above two portions and having an inner diameter of a medium size between the above two inner diameters. The second housing member 1116 has a roughly hollow cylindrical shape, and is sectioned into two portions having mutually different outer diameters, specifically, a small-outer-diameter portion 1124 arranged in a front side and having a small inner diameter, and a large-outer-diameter portion 1126 arranged in a rear side and having a large inner diameter.

In the housing 1104 constructed above, a front end portion of the large-outer-diameter portion 1126 of the second housing member 1116 serves an annular separation wall portion projecting to the inside in a radial direction, and the small-outer-diameter portion 1124 serves an inner cylindrical portion extending forward from an inner periphery of the separation wall portion, In other words, in the housing 1104, a partition portion separating an interior of the housing 1104 is formed by the small-outer-diameter portion 1124 and the large-outer-diameter portion 1126 of the second housing member 1116. Therefore, the interior of the housing 1104 is separated into a front side chamber R91 including a space outside the small-outer-diameter portion 1124 and a rear side chamber R92 including an inside space of the small-outer-diameter portion 1124. In addition, a front end of the small-outer-diameter portion 1124 serves as an opening formed in the partition portion.

Each of the first pressurizing piston 1106 and the second pressurizing piston 1108 has a hollow cylindrical shape whose rear end portion is closed, and is slidably fitted with seals in the small-inner-diameter portion 1118 of the first housing member 1114 in the front side chamber R91. The intermediate piston 1110 roughly has a hollow cylindrical shape whose front end portion is closed, that is, a shape having a blind hole being open rearward, and includes a main body portion 1128 having a hollow cylindrical shape. A flange 1130 is formed on an outer periphery of a rear end of the main body portion 1128. The intermediate piston 1110 is fitted with seals in the housing 1104 such that a front portion of the main body portion 1128 slidably contacts with the small-inner-diameter portion 1118 of the first housing member, the flange 1130 slidably contacts with the intermediate portion 1122, and an inner circumferential portion of the main body portion 1128 slidably contacts with the small-outer-diameter portion 1124 of the second housing member 1116. That is, the intermediate piston 1110 is disposed such that the small-outer-diameter portion 1124 of the second housing member 1116 is inserted in the main body portion 1128, in other words, such that the main body portion 1128 is interposed between the intermediate portion 1122 of the first housing member 1114 and the small-outer-diameter portion 1124 of the second housing member 1116. So to speak, the intermediate portion 1122 of the first housing member 1114 can be considered to be an outer cylindrical portion of the housing 1104. In addition, the first pressurizing piston 1106 and the intermediate piston 1110 are disposed such that a front end face of the intermediate piston 1110 abuts on a rear end face of the first pressurizing piston 1106 in no brake operation.

The input piston 1112 has a roughly a hollow cylindrical shape and is connected, at a rear end thereof, to the operation rod 72. The input piston 1112 is fitted in the second housing member 1116 with seals. Additionally, between a bottom face of the rearward-opening blind hole of the intermediate piston 1110 and a front end face of the input piston 1112, two compression coil springs 1132, 1134 each of which generates an elastic reaction force in a direction of separating the intermediate piston 1110 and the input piston 1112 are disposed in series in the front-back direction. It is noted that the spring constant of the spring 1134 is smaller than the spring constant of the spring 1132. Additionally, between the springs 1132, 1134, a floating seat 1136 is disposed such that it is supported by them.

In the master cylinder device 1102 constructed thus, between a rear end face of the first pressurizing portion 1106 and a front end face of the intermediate piston 1110, there is defined a fluid chamber R94 into which the brake fluid from the high pressure source device 58 is inputted. This fluid chamber R94 is referred to as a "first input chamber", where appropriate. Also, between a rear end of the flange 1130 of the intermediate piston 1110 and a stepping face formed between the small-outer-diameter portion 1124 and the large-outer-diameter portion 1126 of the second housing member 1116, there is defined another fluid chamber R95 into which the brake fluid from the high pressure source device 58 is inputted. This fluid chamber R95 is referred to as a "second input chamber", where appropriate. It is noted that each of the input chambers R94, R95 is illustrated in an almost squeezed state in FIG. 13. Additionally, between an inner circumferential face of the intermediate portion 1122 of the first housing member 1114 in front of the flange 1130 and an outer circumferential face of the main body portion 1128 of the intermediate piston 1110, as described below, there is defined an annular fluid chamber R96 which opposes the second input chamber R95 with the flange 1130 being interposed between the fluid chamber R96 and the second input chamber and which can communicate with the reservoir 62. Hereinafter, this chamber is referred to as an "opposing chamber", where appropriate. Additionally, in the intermediate piston 1110, a pressurized area on which a pressure of a brake fluid in the first input chamber R94 acts, namely, an area of a front end face of the front side portion 1128, and a pressurized area on which a pressure of a brake fluid in the second input chamber R95 acts, namely, an area of a rear end face of the flange 1130 are equal.

In the master cylinder device 1102 in which each of the chambers is defined thus, the second input chamber R85 is defined by that the intermediate piston 1110 contacts with an inner circumferential face of the intermediate portion 1122 of the first housing member 1114 via a seal 1140 embedded in an outer circumferential face of the flange 1130 and contacts with an outer circumferential face of the small-outer-diameter portion 1124 of the second housing member 1116 via a seal 1142 embedded in an inner circumferential face of the main body portion 1128. By the way, the input piston 1112 slidably contacts with an inner circumferential face of the second housing member 1116, and seals 1144, 1146 are embedded in an inner circumferential face of a large-outer-diameter portion 1126 of the second housing member 1116. It is noted that a high-pressure seal is employed as each of the seals 1140, 1142 but not employed as each of the seals 1144, 1146.

Between an outer circumferential face of the first pressurizing piston 1106 and an inner circumferential face of the small diameter portion of the first housing member 1114, there is provided a fluid passage 1160 having a certain cross section area through which the brake fluid can flow and connected to the first input chamber R94. In the first housing member 1114, there is provided a communication hole 1162 whose one end is open to the fluid passage 1160 and whose other end is open to the exterior. That is, the first input chamber R94 communicates with the exterior. Additionally, in the first housing member 1114, there are provided a communication hole 1164 whose one end is open to the opposing chamber R96 and whose other end is open to the exterior, and a communication hole 1166 whose one end is open to the second input chamber R95 and whose other end is open to the exterior. In the second housing member 1116, there is provided a communication hole 1168 whose one end is open to the inter-piston chamber R98. Additionally, in the first housing member 1114, there is provided a communication hole 1170 whose one end is open so as to face the other end of the communication hole 1168 and whose other end is open to the exterior. That is, the inter-piston chamber R98 communicates with the exterior. Since an outer diameter of a part of the second housing member 1116 is slightly smaller than an inner diameter of the rear large-diameter portion 1120 of the first housing member 1114, there is defined a fluid passage 1172 having a certain cross section area through which the brake fluid can flow. In the second housing member 1116, there is provided a communication hole 1174 whose one end is open to the fluid passage 1172 and whose other end is open between the seals 1144, 1146 embedded on an inner circumferential face of the second housing member 1116. In the first housing member 1112, there is provided a communication hole 1176 whose one end is open so as to face the other end of the communication hole 1174 and whose other end is open to the inter-piston chamber R98. In the first housing member 1114, there is provided a communication hole 1178 whose one end is open to the fluid passage 1172 and whose other end is open to the exterior. Accordingly, the inter-piston chamber R98 can communicate with the exterior through the fluid passage 1172 and the communication holes 1170, 1174, 1176, 1178.

In the master cylinder device 1102 in which the fluid passages and the communication holes are formed thus, to the communication hole 1166, an input pressure passage 230 whose one end is connected to the third fluid chamber 134 of the pressure adjusting valve device 110 is connected at the other end thereof. Also, an input pressure passage 1180 diverging from an input pressure passage 230 is connected to the communication hole 1162. In addition, an electromagnetic open/close valve 1181 which is a normally-closed valve is provided on the external communication passage 1180. To the communication hole 1164, a low pressure passage 1182 communicating with the reservoir 62 is connected, and an electromagnetic open/close valve 1184 which is a normally-opened valve is provided on the low pressure passage 1182. Therefore, the opposing chamber R96 can communicate with the reservoir 62, thus a mechanism including the open/close valve 1184 and the low pressure passage 1182 constitutes a low-pressure-source communication mechanism which allows the opposing chamber R96 to communicate with the reservoir 62. Additionally, to the communication hole 1170, an external communication passage 1186 communicating with the reservoir 62 is connected, and an electromagnetic open/close valve 1188 which is a normally-closed valve is provided on the external communication passage 1186. Moreover, a communication passage 1190 diverging from between the end connected to the communication hole 1170 and the open/close valve 1188 in the external communication passage 1186 is connected to the first fluid chamber of the pressure adjusting valve device 100 of the pressure-intensifying/reducing device 60. That is, in the hydraulic brake system 1100, the pressure adjusting valve device 100 can be activated by utilizing, as the pilot pressure, not the master pressure but the pressure of the brake fluid in the inter-piston chamber R98.

<<Actuation of Hydraulic Brake System>>

In the normal condition, since the open/close valve 1181 is opened, the brake fluid is supplied from the pressure adjusting valve device 100 to the second input chamber as well as the first input chamber. As described above, in the intermediate piston 1110, since the pressurized area on which the pressure of the brake fluid in the first input chamber R94 acts and the pressurized area on which the pressure of a brake fluid in the second input chamber R95 acts are almost equal, no movement of the intermediate piston 1110, or a slight movement if any, occurs depending on the pressures of the brake fluids in the first input chamber R94 and the second input chamber R95. Additionally, in the normal condition, since the open/close valve 1184 is closed to hermetically close the opposing chamber R96, a forward movement of the intermediate piston 1110 is prohibited. Moreover, in the normal condition, the open/close valve 1188 is opened, whereby the inter-piston chamber R9 communicates with the reservoir 62. Therefore, when a brake operation is performed, the input piston 1112 can move forward with the brake fluid in the inter-piston chamber R98 being flowed into the reservoir 62. Accordingly, in the normal condition, a relative forward movement of the input piston 1112 to the intermediate piston 1110 is allowed. By the way, a mechanism including the springs 1132, 1134 serves as a reaction force applying mechanism which applies the operation reaction force to a driver by an increase of the elastic reaction force due to the relative forward movement. Additionally, since the spring constants of the springs 1132, 1134 are different from each other as described above, the master cylinder device 1102 is configured such that, as the operation amount of the brake pedal 70 increases, a ratio of increase of the operation reaction force increases. On the other hand, the first pressurizing piston 1106 is moved forward depending on the pressure of the brake fluid in the first pressurizing piston R94. That is, in the normal condition, a high-pressure-source-pressure dependent pressurizing state in which the brake fluid in the pressurizing chambers R3, R4 can be pressurized depending on only the pressure of the brake fluid in the first input chamber R94 is realized.

In the large-brake-force-required condition, the open/close valve 1184 is opened, thereby allowing the forward movement of the intermediate piston 1110 in the hydraulic brake system 1100. Accordingly, the intermediate piston 1110 can move forward by a force according to the pressure of the brake fluid in the second input chamber R95. Since the intermediate piston 1110 abuts on the first pressurizing piston 1106, the intermediate piston 1110 moves the pressurizing pistons 1006, 1008 forward to pressurize the brake fluid to be supplied to the brake devices 56. In addition, since a forward bias force acts on the intermediate piston 1110 due to the elastic reaction forces by the springs 1132, 1134, the intermediate piston 1110 is moved by the operation force as well. That is, the pressurizing pistons 1106, 1108 can move forward depending on not only the pressure of the brake fluid in the second input chamber R95 but also the operation force, whereby the brake fluids in the pressurizing chambers R3, R4 are pressurized. Accordingly, in the master cylinder device 1102, the operation-force/high-pressure-source-pressure dependent pressurizing state is realized in the large-brake-force-required condition. Therefore, the intermediate piston 1110 can be considered a pressure receiving piston which pressurizes the brake fluid to be supplied to the brake devices 56 by receiving the operation force or the pressure of the brake fluid supplied to the second input chamber R95.

In the large-brake-force-required condition, the open/close valve 1188 is closed. Accordingly, the inter-piston chamber R98 is hermetically closed, the operation force can be transmitted, via the brake fluid in the inter-piston chamber R98, to the first pressurizing piston 1106. That is, in the master cylinder device 1102, a mechanism including the external communication passage 1186 and the open/close valve 1188 constitutes an inter-piston-chamber hermetically closing mechanism which can hermetically close the inter-piston chamber R98. Also, this inter-piston-chamber hermetically closing mechanism can be considered as an input-piston-relative-forward-movement prohibiting mechanism which prohibits a relative forward movement of the input piston 1112 relative to the intermediate piston 1110. In the large-brake-force-required condition, the open/close valve 1181 is closed to hermetically close the first input chamber. Therefore, the brake fluids in the pressurizing chambers R3, R4 can be pressurized while the intermediate piston 1010 does not abut on the first pressurizing piston 1006. Therefore, owing to the closing of the open/close valve 1188 and the closing of the open/close valve 1181, the brake operation force by the driver is transmitted to the intermediate piston 1110 and the first pressurizing piston 1106 without generating an ineffective brake operation amount. Incidentally, in the operation-force/high-pressure-source-pressure dependent pressurizing state, since the pressure of the brake fluids in the pressurizing chambers R3, R4 is transmitted to the input piston 1112, the driver can feel the rearward bias force generated by the pressure as the operation reaction force.

In a condition in which electric power is not supplied to the hydraulic brake system 1100 due to an electric failure, since the open/close valve 1184 is de-energized to be opened, the forward movement of the intermediate piston 1010 is allowed as in the large-brake-force-required condition, whereby the pressurizing pistons 1106, 1108 can be moved forward by the operation force. That is, in the master cylinder device 1102, it is possible to pressurize the brake fluids in the pressurizing chambers R3, R4 depending on only the operation force so as to supply the brake fluid to the brake devices 56FL, 56FR. That is, in the master cylinder device 1102, the operation-force dependent pressurizing state is realized. Additionally, in an electric failure, the open/close valve 1188 is de-energized to be closed, thus the inter-piston chamber R98 is hermetically closed. Therefore, the brake operation force by the driver is transmitted to the pressurizing pistons 1106, 1108 without generating an ineffective brake operation amount. In addition, in the hydraulic brake system 1100, when an electric failure etc. occurs, the pressure adjusting valve device 100 can be activated by utilizing the pressure of the brake fluid in the inter-piston chamber R98 as the pilot pressure. Therefore, unlike utilizing, as the pilot pressure, the master pressure which is affected by a friction force etc. upon a movement of the intermediate piston 1110, the activation of the pressure adjusting valve device 100 is comparatively favorable in an ability of following a change of brake operation.

In the master cylinder device 1102, the input piston 1112 is not fitted to the intermediate piston 1110 with any seal. Therefore, even when the intermediate piston 1110 is moved by the pressure of the brake fluid in the second input chamber R95, no force resulting from any friction force of any seal acts on the input piston 1112. In addition, each of the high-pressure seals 1140, 1142 between the intermediate piston 1110 and the housing 1104 causes a comparatively large friction force upon a movement of the intermediate piston 1110, whereas each of the seals 1144, 1146 between the input piston 1112 and the housing 1104 causes a comparatively small friction force upon a movement of the input piston 1112. Therefore, in the master cylinder device 1102, operational feeling in a brake operation is excellent. Especially in the operation-force dependent pressurizing state, it is possible to provide excellent operational feeling.

REFERENCE SIGNS LIST

40: hydraulic brake system 50: master cylinder device 56: brake device 58: high pressure source device (high pressure source) 60: pressure-intensifying/reducing device (pressure adjusting device) 62: reservoir (low pressure source) 70: brake pedal (brake operation member) 90: hydraulic pump 92: accumulator 100: pressure adjusting valve device (pilot-pressure-dependent pressure reducing mechanism) 150: housing 152: first pressurizing piston (pressure receiving piston) 156: input piston 164: third housing member (partition portion) 178: through hole (opening) 180: main body portion 182: extension portion 184: flange 234: external communication passage (inter-chamber communication passage, low-pressure-source communication mechanism for the opposing and inter-piston chambers) 238: electromagnetic open/close valve (low-pressure-source communication mechanism for the opposing and inter-piston chambers) 250: reaction force generating device (reaction force applying mechanism) 256: compression coil spring (elastic-reaction-force applying mechanism for the fluid storage chamber) R1: front side chamber R2: rear side chamber R3: first pressurizing chamber (pressurizing chamber) R5: input chamber R6: opposing chamber R8: inter-piston chamber R9: fluid storage chamber 300: hydraulic brake system 302: master cylinder device 304: housing 306: first pressurizing piston (pressure receiving piston) 310: input piston 316: third housing member (partition portion) 326: through hole (opening) 330: main body portion 332: extension portion 334: flange 342: compression coil spring (elastic-reaction-force applying mechanism for the input piston) 380: internal communication passage (inter-chamber communication passage) 382: external communication passage (low-pressure-source communication mechanism for the opposing and inter-piston chambers) 384: electric open/close valve (low-pressure-source communication mechanism for the opposing and inter-piston chambers) 388: external communication passage (input-piston-shrink prohibiting mechanism) 390: electromagnetic open/close valve (input-piston-shrink prohibiting mechanism) R11: front side chamber R12: rear side chamber R15: input chamber R16: opposing chamber R18: inter-piston chamber 400: hydraulic brake system 402: master cylinder device 404:

housing 406: first pressurizing piston (pressure receiving piston) 410: input piston 418: front side portion (partition portion, inner cylindrical portion) 422: intermediate portion (partition portion, separation wall portion) 428: main body portion 430: cylindrical portion 432: flange 440: compression coil spring (elastic-reaction-force applying mechanism for the input piston) 442: compression coil spring (elastic-reaction-force applying mechanism for the input piston) 460: communication passage (inter-chamber communication passage) 464: clearance (inter-chamber communication passage) R21: front side chamber R22: rear side chamber R25: input chamber R26: opposing chamber R28: inter-piston chamber 500: hydraulic brake system 502: master cylinder device 504: housing 506: first pressurizing piston (pressure receiving piston) 510: input piston 520: inner flange (partition portion) 522: through hole (opening) 526: main body portion 528: extension portion 530: flange 544: seal (inter-piston-chamber hermetically closing mechanism) 574: communication hole (inter-piston-chamber hermetically closing mechanism) 576: communication hole (inter-piston-chamber hermetically closing mechanism) 584: external communication passage (inter-chamber communication passage, low-pressure-source communication mechanism for the opposing and inter-piston chambers) 586: electromagnetic open/close valve (low-pressure-source communication mechanism for the opposing and inter-piston chambers, inter-piston-chamber hermetically closing mechanism) 588: external communication passage (low-pressure-source communication mechanism for the opposing and inter-piston chambers) 590: electromagnetic open/close valve (low-pressure-source communication mechanism for the opposing and inter-piston chambers, low-pressure-source communication mechanism for the opposing chamber) R31: front side chamber R32: rear side chamber R35: input chamber R36: opposing chamber R38: inter-piston chamber 600: hydraulic brake system 602: master cylinder device 604: housing 606: first pressurizing piston 610: pressure receiving piston 612: input piston 624: small-outer-diameter portion (partition portion, inner cylindrical portion) 626: large-outer-diameter portion (partition portion, separation wall portion) 628: cylindrical portion R41: front side chamber R42: rear side chamber R45: input chamber R48: inter-piston chamber 700: hydraulic brake system 702: master cylinder device 704: housing 706: first pressurizing piston (pressure receiving piston) 710: input piston 722: front side portion (partition portion, separation wall portion) 730: main body portion 734: cylindrical portion 736: compression coil spring (reaction force applying mechanism) 738: compression coil spring (reaction force applying mechanism) 744: seal (inter-chamber communication passage) 750: seal (inter-piston-chamber hermetically closing mechanism) 760: communication hole (inter-piston-chamber hermetically closing mechanism) 762: communication hole (inter-piston-chamber hermetically closing mechanism) 764: communication hole (inter-piston-chamber hermetically closing mechanism) 766: communication hole (inter-piston-chamber hermetically closing mechanism) R51: front side chamber R52: rear side chamber R55: input chamber R57: internal chamber R58: inter-piston chamber 800: hydraulic brake system 802: master cylinder device 804: housing 806: first pressurizing piston 810: pressure receiving piston 812: input piston 824: inner cylindrical portion (partition portion) 826: front side portion (main body portion) 830: rear side portion (extension portion) 834: compression coil spring (reaction force applying mechanism) 836: compression coil spring (reaction force applying mechanism) 868: external communication passage (inter-chamber communication passage) 870: electromagnetic open/close valve (inter-chamber communication passage) R61: front side chamber R62: rear side chamber R65: input chamber R68: inter-piston chamber 900: hydraulic brake system 902: master cylinder device 904: housing 906: first pressurizing piston 910: pressure receiving piston 912: input piston 924: inner cylindrical portion (partition portion) 928: front side portion (main body portion) 930: rear side portion (extension portion) 932: flange 934: compression coil spring (reaction force applying mechanism) 936: compression coil spring (reaction force applying mechanism) 942: seal (inter-piston-chamber hermetically closing mechanism) 982: external communication passage (low-pressure-source communication mechanism) 984: electromagnetic open/close valve (low-pressure-source communication mechanism) R71: front side chamber R72: rear side chamber R74: first input chamber R75: second input chamber R76: opposing chamber R78: inter-piston chamber 1000: hydraulic brake system 1002: master cylinder device 1004: housing 1006: first pressurizing piston 1010: pressure receiving piston 1012: input piston 1024: small-outer-diameter portion (partition portion, inner cylindrical portion) 1026: large-outer-diameter portion (partition portion, inner cylindrical portion) 1028: main body portion 1030: flange 1038: compression coil spring (reaction force applying mechanism) 1040: compression coil spring (reaction force applying mechanism) 1082: external communication passage (low-pressure-source communication mechanism) 1084: electromagnetic open/close valve (low-pressure-source communication mechanism) 1086: external communication passage (input-piston-relative-forward-movement prohibiting mechanism) 1088: electromagnetic open/close valve (input-piston-relative-forward-movement prohibiting mechanism) R81: front side chamber R82: rear side chamber R84: first input chamber R85: second input chamber R86: opposing chamber R88: inter-piston chamber 1100: hydraulic brake system 1102: master cylinder device 1104: housing 1106: first pressurizing piston 1110: pressure receiving piston 1112: input piston 1124: small-outer-diameter portion (partition portion, inner cylindrical portion) 1126: large-outer-diameter portion (partition portion, inner cylindrical portion) 1128: main body portion 1130: flange 1132: compression coil spring (reaction force applying mechanism) 1134: compression coil spring (reaction force applying mechanism) 1182: external communication passage (low-pressure-source communication mechanism) 1184: electromagnetic open/close valve (low-pressure-source communication mechanism) 1186: external communication passage (inter-piston-chamber hermetically closing mechanism, input-piston-relative-forward-movement prohibiting mechanism) 1088: electromagnetic open/close valve (inter-piston-chamber hermetically closing mechanism, input-piston-relative-forward-movement prohibiting mechanism) R91: front side chamber R92: rear side chamber R94: first input chamber R95: second input chamber R96: opposing chamber R98: inter-piston chamber

The invention claimed is:

1. A master cylinder device for supplying a pressurized brake fluid to a brake device provided in a wheel, comprising:
a housing whose front side end is closed and which includes a partition portion separating an interior of the housing into a front side chamber and a rear side chamber and having an opening through the partition portion;
a pressure receiving piston which includes (a) a main body portion having a flange on a rear end thereof and disposed in the front side chamber, and (b) an extension portion extending from the main body portion through the opening of the partition portion into the rear side chamber, the pressure receiving piston being moved forward by receiving a force for pressurizing the brake fluid to be supplied to the brake device; and an input piston which is disposed in the rear side chamber, which is connected to a brake operation member disposed behind the housing, and which can move forward by an operation force applied to the brake operation member, wherein the main body portion of the pressure receiving piston is fitted, at the flange and a portion in front of the flange, in the housing with respective seals therebetween and the extension portion of the pressure receiving piston is fitted in the partition portion of the housing with a seal, whereby: a pressurizing chamber in which the brake fluid to be supplied to the brake device is pressurized by a forward movement of the pressure receiving piston is defined in front of the main body portion of the pressure receiving piston; an input chamber into which a brake fluid from a high pressure source is introduced is defined between a rear end of the main body portion and the partition portion; and an opposing chamber which opposes the input chamber with the flange being interposed between the opposing chamber and the input chamber is defined around the main body portion, wherein the input piston is fitted in the housing with a seal, whereby, between the input piston and the pressure receiving piston, there is defined an inter-piston chamber such that a rear end of the extension portion and the input piston face to each other in a state in which any seal is not present between the input piston and the pressure receiving piston, wherein an inter-chamber communication passage which allows a communication between the opposing chamber and the inter-piston chamber is provided, and a pressurized area of the pressure receiving piston on which a pressure of a brake fluid in the opposing chamber acts and a pressurized area of the pressure receiving piston on which a pressure of a brake fluid in the inter-piston chamber acts are equal, and wherein the master cylinder device further comprises a reaction force applying mechanism which allows a forward movement of the input piston relative to the housing by the operation force, and which applies, to the input piston, a reaction force against the forward movement and with a magnitude according to an amount of the forward movement, as an operation reaction force against an operation of the brake operation member.

2. The master cylinder device according to claim 1, wherein one of a front side portion of the input piston and a rear side portion of the extension portion of the pressure receiving piston is formed into a hollow cylindrical shape, and the other of them is inserted in the one of them.

3. The master cylinder device according to claim 1, wherein the reaction force applying mechanism includes a fluid storage chamber communicating with the opposing chamber and the inter-piston chamber, and an elastic-reaction-force applying mechanism for the fluid storage chamber which allows an increase of a volume of the fluid storage chamber according to a decrease of a total volume of the opposing chamber and the inter-piston chamber, and which applies an elastic reaction force with a magnitude according to an amount of the increase of the volume to a brake fluid in the fluid storage chamber.

4. The master cylinder device according to claim 1, wherein the reaction force applying mechanism includes an elastic-reaction-force applying mechanism for the input piston which allows a front end portion of the input piston defining the inter-piston chamber to recede relative to another portion connected to the brake operation member, thereby allowing the input piston to shrink, and which applies an elastic reaction force with a magnitude according to an amount of the shrink of the input piston.

5. The master cylinder device according to claim 1, wherein a front end portion of the input piston defining the inter-piston chamber is allowed to recede relative to another portion connected to the brake operation member, whereby the input piston is allowed to shrink, and wherein the master cylinder device further comprises an input-piston-shrink prohibiting mechanism which prohibits the shrink of the input piston.

6. The master cylinder device according to claim 1, wherein the master cylinder device comprises a low-pressure-source communication mechanism for the opposing and inter-piston chambers which allows the opposing chamber and the inter-piston chamber to communicate with a low pressure source.

7. The master cylinder device according to claim 1, wherein the master cylinder device comprises a low-pressure-source communication mechanism for the opposing chamber which allows the opposing chamber to communicate with a low pressure source, and an inter-piston-chamber hermetically closing mechanism which hermetically closes the inter-piston chamber.

8. A hydraulic brake system, comprising:
the master cylinder device according to claim 1; and
a pressure adjusting device which adjusts a pressure of a brake fluid to be introduced from the high pressure source device to the input chambers of the master cylinder device.

9. The hydraulic brake system according to claim 8, wherein the pressure adjusting device is configured to be controlled to reduce the pressure of the brake fluid supplied from the high pressure source to a pressure according to the control, and configured to supply the pressure-reduced brake fluid to the master cylinder device, and wherein the pressure adjusting device includes a pilot-pressure-dependent pressure reducing mechanism which utilizes, as a pilot pressure, any one of a pressure of the brake fluid in the pressurizing chamber, a pressure of the brake fluid in the opposing chamber, and a pressure of the brake fluid in the inter-piston chamber, and which reduces the pressure of the brake fluid supplied from the high pressure source device to a pressure according to the pilot pressure.

10. A master cylinder device for supplying a pressurized brake fluid to a brake device provided in a wheel, comprising:
a housing whose front side end is closed and which includes a partition portion separating an interior of the housing into a front side chamber and a rear side chamber and having an opening through the partition portion;
a pressure receiving piston which includes (a) a main body portion having a flange on a rear end thereof and disposed in the front side chamber and (b) an extension portion extending from the main body portion through the opening of the partition portion into the rear side chamber, the pressure receiving piston being moved forward by receiving a force for pressurizing the brake fluid to be supplied to the brake device;
a pressurizing piston disposed in the front side chamber and in front of the pressure receiving piston; and
an input piston which is disposed in the rear side chamber, which is connected to a brake operation member disposed behind the housing, and which is moved forward by an operation force applied to the brake operation member, wherein the pressurizing piston is fitted in the housing with a seal, the main body portion of the pressure receiving piston is fitted, at the flange and a portion in front of the flange, in the housing with respective seals therebetween, and the extension portion of the pressure receiving piston is fitted in the partition portion with a seal, whereby: a pressurizing chamber in which the brake fluid to be supplied to the brake device is pressurized by a forward movement of the pressurizing piston is defined in front of the pressurizing piston; a first input chamber into which a brake fluid from a high pressure source is introduced is defined between the main body portion of the pressure receiving piston and the pressurizing piston; a second input chamber into which the brake fluid from the high pressure source is introduced is defined between a rear end of the main body portion of the pressure receiving piston and the partition portion; and an opposing chamber which opposes the second input chamber with the flange being interposed between the opposing and second input chambers is defined around the main body portion of the pressure receiving piston, wherein the input piston is fitted in the housing with a seal, whereby, between the input piston and the pressure receiving piston, there is defined an inter-piston chamber such that a rear end of the extension portion and the input piston face to each other in a state in which any seal is not present between the input piston and the pressure receiving piston, wherein the master cylinder device is configured such that a pressurized area of the pressure receiving piston on which a pressure of the brake fluid in the first input chamber acts and a pressurized area of the pressure receiving piston on which a pressure of the brake fluid in the second input chamber acts are equal, and such that, when the respective brake fluids are introduced from the high pressure source into the first input chamber and the second input chamber with the opposing chamber being hermetically closed, a forward movement of the pressure receiving piston is prohibited and the brake fluid in the pressurizing chamber is pressurized by the forward movement of the pressurizing piston, and wherein the master cylinder device further comprises a reaction force applying mechanism which is configured to allow a relative forward movement of the input piston relative to the pressure receiving piston by the operation force in a state in which a decrease of a volume of the inter-piston chamber is allowed, and which is configured to apply to the pressure receiving piston and the input piston a reaction force against the relative forward movement and with a magnitude according to an amount of the relative forward movement such that the reaction force acts as an operation reaction force against an operation of the brake operation member.

\* \* \* \* \*